(12) United States Patent
Mortada et al.

(10) Patent No.: US 12,411,080 B2
(45) Date of Patent: Sep. 9, 2025

(54) ON-LINE COMPENSATION OF INSTRUMENTAL RESPONSE DRIFT IN MINIATURIZED SPECTROMETERS

(71) Applicant: Si-Ware Systems, Cairo (EG)

(72) Inventors: Bassem Mortada, Cairo (EG); Yasser M. Sabry, Cairo (EG); Samir Abozyd, Tanta (EG)

(73) Assignee: SI-WARE SYSTEMS, Cairo (EG)

( * ) Notice: Subject to any disclaimer, the term of this patent is extended or adjusted under 35 U.S.C. 154(b) by 236 days.

(21) Appl. No.: 17/989,317

(22) Filed: Nov. 17, 2022

(65) Prior Publication Data

US 2023/0152216 A1    May 18, 2023

Related U.S. Application Data

(60) Provisional application No. 63/281,042, filed on Nov. 18, 2021.

(51) Int. Cl.
  *G01N 21/31* (2006.01)
(52) U.S. Cl.
  CPC ..... *G01N 21/31* (2013.01); *G01N 2201/0231* (2013.01); *G01N 2201/1211* (2013.01)
(58) Field of Classification Search
  CPC ........... G01N 21/31; G01N 2201/0231; G01N 2201/1211
  See application file for complete search history.

(56) References Cited

U.S. PATENT DOCUMENTS

| 5,227,986 A | * | 7/1993 | Yokota | G01J 3/28 702/22 |
| 5,420,877 A | * | 5/1995 | Sandstrom | H01S 3/13 372/20 |

(Continued)

FOREIGN PATENT DOCUMENTS

| DE | 10-2008054056 A1 | 5/2010 | |
| DE | 102014013848 A1 * | 3/2016 | G01J 3/00 |

(Continued)

OTHER PUBLICATIONS

PCT/US2022/050469. International Search Report & Written Opinion (Apr. 3, 2023), 15 pages.

(Continued)

*Primary Examiner* — Michelle M Iacoletti
*Assistant Examiner* — Jarreas Underwood
(74) *Attorney, Agent, or Firm* — Loza & Loza, LLP; Holly L. Rudnick

(57) ABSTRACT

Aspects relate to on-line compensation of instrumental drifts in miniaturized spectrometers due to variations in environmental conditions and due to other sources of instrumental drift. The spectrometer may include a light modulator, a detector, and a processor. The spectrometer may further include a sensor configured to obtain a value of a condition contributing to instrumental drifts in the spectrometer. The processor may be configured to extract a set of correction parameters from a correction matrix associating a plurality of sets of correction parameters with sensor values based on the value and to apply the set of correction parameters to an output of the detector to produce a corrected spectrum of a sample under test. The correction matrix may be generated for the spectrometer or may be based on a global correction matrix fitted to the spectrometer.

23 Claims, 39 Drawing Sheets

(56) References Cited

U.S. PATENT DOCUMENTS

| | | | | |
|---|---|---|---|---|
| 5,530,551 | A * | 6/1996 | Cantrall | G01B 11/105 356/394 |
| 7,839,502 | B2 * | 11/2010 | Lukas | G01J 3/28 356/326 |
| 8,989,511 | B1 * | 3/2015 | Leary | G02B 21/008 382/256 |
| 10,996,108 | B2 * | 5/2021 | Nagai | G01J 3/28 |
| 2004/0204800 | A1 * | 10/2004 | Honda | B60W 50/00 701/1 |
| 2010/0064773 | A1 * | 3/2010 | Meredith | G01M 3/047 73/40 |
| 2011/0255075 | A1 * | 10/2011 | Kerstan | G01J 3/28 356/72 |
| 2015/0005601 | A1 * | 1/2015 | Hoss | A61B 5/1473 600/347 |
| 2019/0154656 | A1 * | 5/2019 | Bae | G01N 21/65 |
| 2019/0301939 | A1 * | 10/2019 | Medhat | G01J 3/021 |
| 2021/0025755 | A1 * | 1/2021 | Knobbe | G01J 3/0286 |
| 2022/0107265 | A1 * | 4/2022 | Gussakovsky | G01N 21/255 |
| 2022/0390279 | A1 * | 12/2022 | Peters | G01J 3/28 |
| 2023/0131902 | A1 * | 4/2023 | Daruwalla | B81B 7/02 257/414 |
| 2024/0110833 | A1 * | 4/2024 | Watanabe | G01M 11/0285 |

FOREIGN PATENT DOCUMENTS

| | | | |
|---|---|---|---|
| DE | 10-2019134456 A1 | 6/2021 | |
| DE | 10-2019219945 A1 | 6/2021 | |
| EP | 1319176 B1 * | 10/2005 | A61B 5/0075 |
| JP | S61213650 A2 | 9/1986 | |
| WO | 0225233 A2 | 3/2002 | |

OTHER PUBLICATIONS

Griffiths, P.R., et al., "Fourier Transform Infrared Spectrometry". NewYork: Wiley, 2007.

M. Ebermann, et al., "Tunable MEMS Fabry-Pérot filters for infrared microspectrometers: a review", MOEMS and Miniaturized Systems XV, 2016. Available: 10.1117/12.2209288, URL: http://proceedings.spiedigitallibrary.org/ (Mar. 23, 2016).

A. Akujarvi, et al., "MOEMS FPI sensors for NIR-MIR microspectrometer applications", MOEMS and Miniaturized Systems XV, 2016. Available: 10.1117/12.2214710, URL: http://proceedings.spiedigitallibrary.org/ (Mar. 21, 2016).

S. Kong, et al., "Infrared micro-spectrometer based on a diffraction grating", Sensors and Actuators A: Physical, vol. 92, No. 1-3, pp. 88-95, 2001. Available: 10.1016/s0924-4247(01)00544-1.

H. Andersen, et al., "Comparison of noise sources in dual- and single-beam Fourier-transform near-infrared spectrometry", Applied Optics, vol. 44, No. 29, p. 6167, 2005. Available: 10.1364/ao.44. 006167.

K. Linga, "Design fabrication and characterization of high performance in GaAs/InP focal plane array in the 1-2.6 μm wavelength region", 1997.

T. Saito, "Spectral Properties of Semiconductor Photodiodes", Advances in Photodiodes, 2011.

A. Coatings and E. Inc., "Anti-Reflection (AR) Coatings | Edmund Optics", Edmundoptics.com, 2021. [Online]. URL: https://www.edmundoptics.com/knowledge-center/application-notes/lasers/anti-reflection-coatings/ (Dec. 29, 2022).

G. Barbarino, et al., "Silicon Photo Multipliers Detectors Operating in Geiger Regime: an Unlimited Device for Future Applications", Photodiodes—World Activities in 2011, 2011. Available: 10.5772/21521 [Accessed Jun. 11, 2021].

M. Saidin, et al., "Transmission Properties of Lithium Nobate and Fused Quartz as Acousto Optic Material", J. Fiz. UTM, vol. 2, 2007.

D. Arteev, et al., "Investigation of Statistical Broadening in InGaN Alloys", Journal of Physics: Conference Series, vol. 1135, p. 012050, 2018. Available: 10.1088/1742-6596/1135/1/012050 (Dec. 21, 2018).

S. Kahmann, et al., "Hot carrier solar cells and the potential of perovskites for breaking the Shockley-Queisser limit", Journal of Materials Chemistry C, vol. 7, No. 9, pp. 2471-2486, 2019. Available: 10.1039/c8tc04641g.

X. Zhou, et al., "An InGaAlAs—InGaAs Two-Color Photodetector for Ratio Thermometry", IEEE Transactions on Electron Devices, vol. 61, No. 3, pp. 838-843, 2014.

S. Yurtseven, et al., "Investigation of Enviromental Effects on the Normalized Spectral Responsivity of an InGaAs Detector", 2019 IEEE International Symposium on Medical Measurements and Applications (MeMeA), 2019.

K. Stock, et al., "Spectral characterization of InGaAs trap detectors and photodiodes used as transfer standards", Metrologia, vol. 37, No. 5, pp. 449-452, 2000.

A. Rogalski "Quantum well photoconductors in infrared detector technology", Journal of Applied Physics, vol. 93, No. 3, pp. 4355-4391, 2003. Available: 10.1063/1.1558224 (Aug. 31, 2014).

M. Zhu, et al., "Temperature Drift Compensation for High-G MEMS Accelerometer Based on RBF NN Improved Method", Applied Sciences, vol. 9, No. 4, p. 695, 2019.

J. Gao, et al., "Temperature characteristics and error compensation for quartz flexible accelerometer", International Journal of Automation and Computing, vol. 12, No. 5, pp. 540-550, 2015.

R. Olbrycht, et al., "New approach to thermal drift correction in microbolometer thermal cameras", Quantitative InfraRed Thermography Journal, vol. 12, No. 2, pp. 184-195, 2015. Available: 10.1080/17686733.2015.1055675.

O. Riou, et al., "Non uniformity correction and thermal drift compensation of thermal infrared camera", Proc. of SPIE vol. 5405 (2004).

Z. Zhang, et al., "Baseline correction using adaptive iteratively reweighted penalized least squares", The Analyst, vol. 135, No. 5, p. 1138, 2010. Available: 10.1039/b922045c.

V. Ban, et al., "Characterization of process-induced defects in 2.6-μm InGaAs photodiodes", Physical Concepts and Materials for Novel Optoelectronic Device ApplicationsII, 1993. Available: 10.1117/12.162766.

J. Ma, et al., "Design and performance analysis of extended wavelength InGaAs near-infrared photodetectors", Japanese Journal of Applied Physics, vol. 54, No. 10, p. 104301, 2015. Available: 10.7567/jap.54.104301.

Krzysztof B. Bec, et al., "Miniaturized NIR Spectroscopy in Food Analysis and Quality Control: Promises, Challenges, and Perspectives", https://doi.org/10.3390/foods11101465, Foods 2022, 11, 1465, 1-53.

O.V. Moskovkin, "Temperature Correction of the Spectral Response of a Photodiode", Instruments and Experimental Techniques, vol. 44, No. 1, 2001, 123-125.

Paul J. Bowyer, et al., "Analyzing and Correcting Spectrometer Temperature Sensitivity", Journal of Magnetic Resonance 152, 2001, 234-246.

Saber G. R. Salim, et al., "Temperature and nonlinearity corrections for a a photodiode array spectrometer used in the field", Applied Optics, vol. 50, No. 6, 2011, 866-875.

Ling Li, et al., "Temperature correction method for commercial CCD array spectrometers used in spectral radiometry measurement", IP Conf. Series: Journal of Physics: Con. Series 972, 2018, 1-6.

Zhiping He, et al., "Measurement and Correction Model for Temperature Dependence of an Acousto-Optic Tunable Filter (AOTF) Infrared Spectrometer for Lunar Surface Detection", Applied Spectroscopy, vol. 74, 2020, 81-87.

* cited by examiner

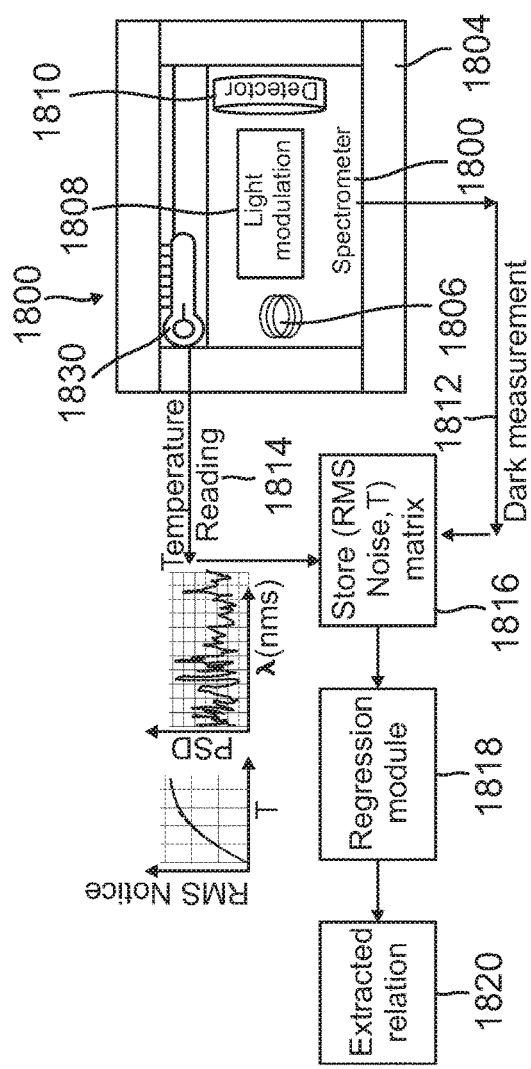
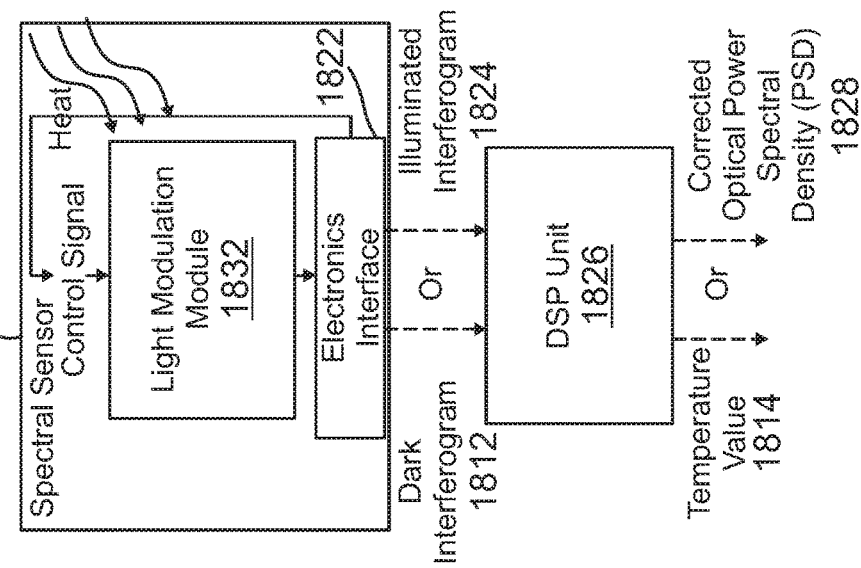
FIG. 18A
FIG. 18B

ON-LINE COMPENSATION OF INSTRUMENTAL RESPONSE DRIFT IN MINIATURIZED SPECTROMETERS

PRIORITY CLAIM

This application claims priority to and the benefit of Provisional Application No. 63/281,042, filed in the U.S. Patent and Trademark Office on Nov. 18, 2021, the entire content of which is incorporated herein by reference as if fully set forth below in its entirety and for all applicable purposes.

TECHNICAL FIELD

The technology discussed below relates generally to spectrometers, and in particular to self-correction of spectral errors due to instrumental response drifts.

BACKGROUND

A spectrometer measures a single-beam spectrum (e.g., a power spectral density (PSD)). The intensity of the single-beam spectrum is proportional to the power of the radiation reaching the detector. In spectrometry, absorbance of a sample is its fingerprint, which is used in spectral processing operations to enable material identification, along with quantitative and qualitative analysis. However, absorbance is not measured in one step. Instead, it is extracted from the measured spectrum in presence of a sample with respect to a background (BG) spectrum measurement with no sample in the light path, to account for the instrumental transfer function.

Typically, the background measurement is acquired, in the case of transmittance, by measuring the spectrum of a light beam without placing any sample in the light pass. While in diffuse reflection, a reference material with 95% or higher reflectance and approximately a flat response across the spectral range of interest, is used to obtain a background measurement. This methodology enables the compensation of instrumental response on condition of having the same instrumental drift between the background measurement and sample measurement. However, instrumental response may change with environmental conditions, and as a result, satisfying this criterion may be difficult. For example, background measurements may need to be taken more frequently or even before each sample measurement. This consumes time and effort and sometimes is not possible.

Traditionally, spectroscopists have developed algorithms to post-process the spectrometry data to decrease the negative impact of instrumental errors on the useful information. The effect of environmental conditions on instrumental response has also been studied to predict how frequently the background measurement should be taken. Additionally, models may be generated for these effects and then used to compensate for the instrumental errors, thus decreasing the background measurement repetition. Although these approaches are effective and widely used, each involves a post-processing process, which is application dependent and time consuming. Additionally, these processes need a specialist in spectroscopy to conduct them, and even with the oversight of a specialist may lead to errors in the results.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In an example, a spectrometer is disclosed including a light modulator optically coupled to receive input light and to produce modulated light based on the input light, a detector optically coupled to detect the modulated light in presence of a sample and to produce an output based on the modulated light, a sensor configured to obtain a value of a condition contributing to instrumental drifts in the spectrometer, a memory configured to store a correction matrix associating a plurality of sets of correction parameters with sensor values, and a processor coupled to the detector and configured to extract a set of correction parameters of the plurality of sets of correction parameters from the correction matrix based on the value. The processor can further be configured to process the output of the detector based on the set of correction parameters to produce a corrected spectrum of the sample.

These and other aspects of the disclosure will become more fully understood upon a review of the detailed description, which follows. Other aspects, features, and examples of the present disclosure will become apparent to those of ordinary skill in the art, upon reviewing the following description of specific, exemplary aspects of the present disclosure in conjunction with the accompanying figures. While features of the present disclosure may be discussed relative to certain examples and figures below, all examples of the present disclosure can include one or more of the features discussed herein. In other words, while one or more examples may be discussed as having certain features, one or more of such features may also be used in accordance with the various examples of the disclosure discussed herein. In similar fashion, while exemplary aspects may be discussed below as device, system, or method aspects, it should be understood that such exemplary aspects can be implemented in various devices, systems, and methods.

BRIEF DESCRIPTION OF THE DRAWINGS

FIGS. 18A and 18B are diagrams illustrating another example of of a spectrometer employing the detector as a temperature sensor to be used for the correction of thermal drift according to some aspects.

DETAILED DESCRIPTION

Figure 1:
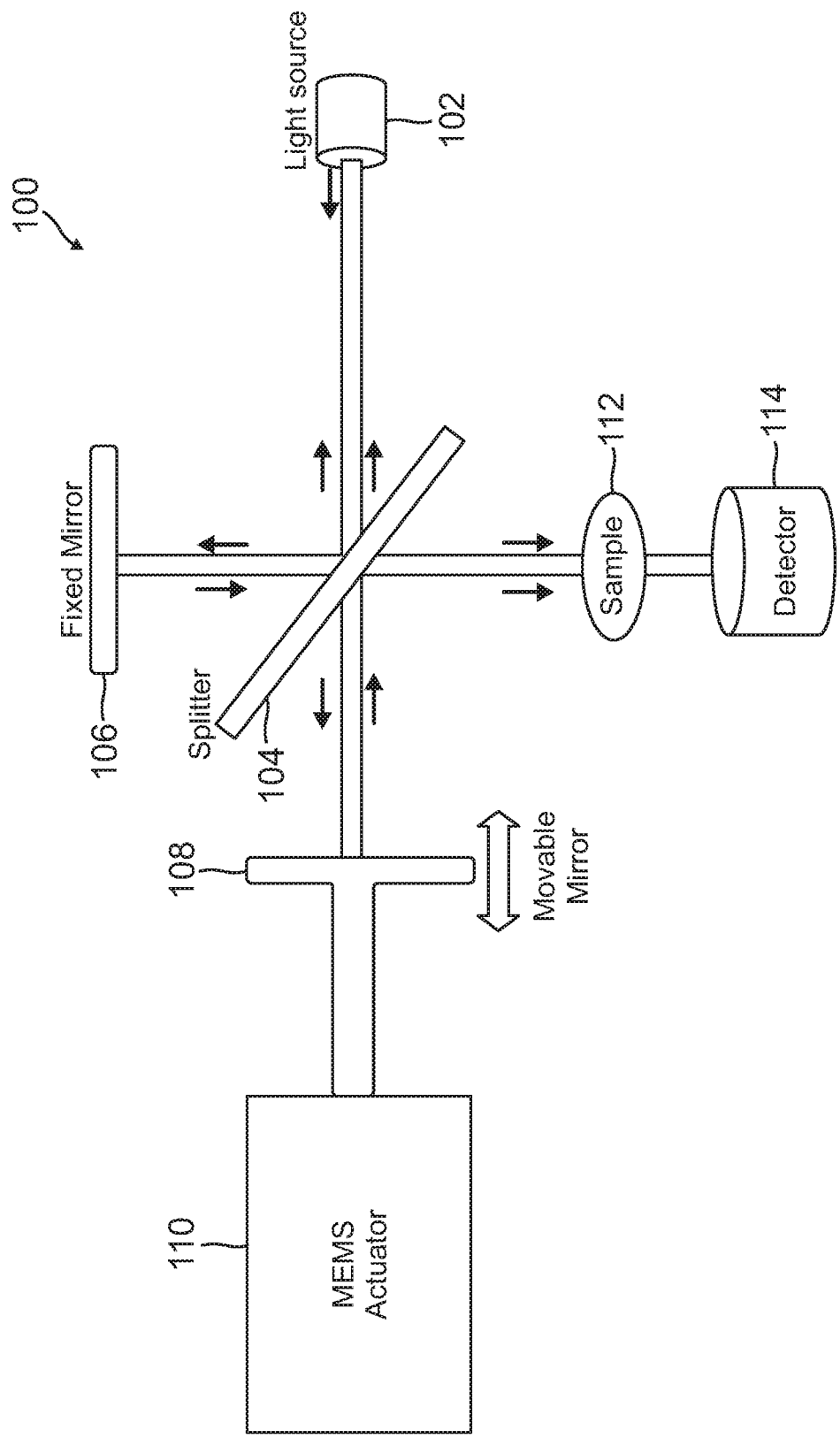
FIG. 1 is a diagram illustrating an example of a spectrometer according to some aspects

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to on-line compensation of instrumental drifts in miniaturized spectrometers due to variations in environmental conditions, including thermal (temperature) drift and humidity drift, and due to other sources of instrumental drift, such as light source inefficiency and optical misalignment. A spectrometer may include a light modulator (e.g., an FT-IR interferometer, Fabry-Perot interferometer, diffraction grating, etc.), a detector, and a processor. The processor may be configured to apply a correction matrix to an output of the detector to produce a corrected spectrum of a sample under test. For example, the processor may be configured to extract a set of correction parameters from the correction matrix and apply the set of correction parameters to the output of the detector (e.g., a measured spectrum of a sample) to compensate for instrumental drifts in the spectrometer. The spectrometer may further include a sensor configured to obtain a value (e.g., a real-time value during operation of the spectrometer) of a condition contributing to instrumental drifts in the spectrometer. The processor may then extract the set of correction parameters based on the value. As indicated above, the value may represent an environmental condition (e.g., thermal drift or humidity drift) or other condition (e.g., light source inefficiency or optical misalignment). The correction matrix may be generated during production of the spectrometer or may be based on a global correction matrix fitted to the spectrometer.

In an example, to compensate for temperature variations, temperature sensing can be performed with the aid of a separate temperature sensor, a temperature sensor embedded in the control/detection electronics, or the photodetector may be exploited to sense the temperature based on the relation between the detector bandgap and the temperature. Temperature sensing can be performed during generation of the correction matrix or during application of the correction matrix to an output of the detector. In some examples, a heat source may be used to raise the temperature during the correction matrix generation process. The heat source can be an external heat source, such as an oven or temperature chamber, or self-heating of the spectrometer device itself, which can be due to the light source of the spectrometer or the heat generated by the electronic components, such as current driver low-dropout regulators (LDOs), analog-to-digital converters (ADCs), or processor chips.

During application of the correction matrix to a detector output, a feedback system uses the temperature reading (e.g., temperature value) to correct the measured spectrum using a set of correction parameters (e.g., a pre-calibrated correction function) based on the measured temperature. The pre-calibrated correction function can be generated from a direct fitting algorithm, a decomposition algorithm, or the drift physical governing equations can be fed to a machine learning algorithm along with spectrometry raw data to create an adaptive correction model for the correction matrix. In some examples, the correction matrix can adapt automatically to each spectrometer unit. Updated correction matrices taking into account the aging effect over time can be extracted and fed back to spectrometer units through a cloud-based interface.

FIG. 1 is a diagram illustrating an example of a spectrometer 100 according to some aspects. The spectrometer 100 may be, for example, a Fourier Transform infrared (FTIR) spectrometer that exploits light interference and Fourier transform to calculate the spectral content of an infrared light beam. In the example shown in FIG. 1, the spectrometer 100 is a Michelson FTIR interferometer.

FTIR spectrometers measure a single-beam spectrum (power spectral density (PSD)), where the intensity of the single-beam spectrum is proportional to the power of the radiation reaching the detector. In order to measure the absorbance of a sample 112, the background spectrum (i.e., the single-beam spectrum in absence of a sample) may first be measured to compensate for the instrument transfer function. The single-beam spectrum of light transmitted or reflected from the sample 112 may then be measured. The absorbance of the sample 112 may be calculated from the transmittance, reflectance, or trans-reflectance of the sample 112, the former being illustrated. For example, the absorbance of the sample 112 may be calculated as the ratio of the spectrum of transmitted light, reflected light, or trans-reflected light from the sample to the background spectrum.

The FT-IR spectrometer 100 includes a fixed mirror 106, a moveable mirror 108, a beam splitter 104, and a detector 114 (e.g., a photodetector). A light source 102 associated with the spectrometer 100 is configured to emit an input beam and to direct the input beam towards the beam splitter 104. The light source 102 may include, for example, a laser source, one or more wideband thermal radiation sources, or a quantum source with an array of light emitting devices that cover the wavelength range of interest.

The beam splitter 104 is configured to split the input beam into two beams. One beam is reflected off of the fixed mirror 106 back towards the beam splitter 104, while the other beam is reflected off of the moveable mirror 108 back towards the beam splitter 104. The moveable mirror 108 may be coupled to an actuator 110 to displace the movable mirror 108 to the desired position for reflection of the beam. An optical path length difference (OPD) is then created between the reflected beams that is substantially equal to twice the mirror 108 displacement. In some examples, the actuator 110 may include a micro-electro-mechanical systems (MEMS) actuator, a thermal actuator, or other type of actuator.

The reflected beams interfere at the beam splitter 104 to produce an output light beam, allowing the temporal coherence of the light to be measured at each different Optical Path Difference (OPD) offered by the moveable mirror 108. The signal corresponding to the output light beam may be detected and measured by the detector 114 at many discrete positions of the moveable mirror 108 to produce an interferogram. In some examples, the detector 114 may include a detector array or a single pixel detector. The interferogram data verses the OPD may then be input to a processor (not shown, for simplicity). The spectrum may then be retrieved, for example, using a Fourier transform carried out by the processor.

In some examples, the spectrometer 100 may be implemented as a MEMS interferometer (e.g., a MEMS chip). For example, the MEMS chip may be attached to a printed circuit board (PCB) that may include, for example, one or more processors, memory devices, buses, and/or other components. As used herein, the term MEMS refers to an actuator, a sensor, or the integration of sensors, actuators and electronics on a common silicon substrate through microfabrication technology to build a functional system. Microelectronics are typically fabricated using an integrated circuit (IC) process, while the micromechanical components are fabricated using compatible micromachining processes that selectively etch away parts of the silicon wafer or add new structural layers to form the mechanical and electro-mechanical components. One example of a MEMS element is a micro-optical component having a dielectric or metallized surface working in a reflection or refraction mode. Other examples of MEMS elements include actuators, detector grooves and fiber grooves.

In some examples, the MEMS interferometer (FT-IR spectrometer 100) may be fabricated using a Deep Reactive Ion Etching (DRIE) process on a Silicon On Insulator (SOI) wafer in order to produce the micro-optical components and other MEMS elements that are able to process free-space optical beams propagating parallel to the SOI substrate. For example, the electro-mechanical designs may be printed on masks and the masks may be used to pattern the design over the silicon or SOI wafer by photolithography. The patterns may then be etched (e.g., by DRIE) using batch processes, and the resulting chips (e.g., MEMS chip) may be diced and packaged (e.g., attached to the PCB).

In some examples, the beam splitter 104 may be a silicon/air interface beam splitter (e.g., a half-plane beam splitter) positioned at an angle (e.g., 45 degrees) from the input beam. The input beam may then be split into two beams L1 and L2, where L1 propagates in air towards the moveable mirror 108 and L2 propagates in silicon towards the fixed mirror 106. Here, L1 originates from the partial reflection of the input beam from the half-plane beam splitter 104, and thus has a reflection angle equal to the beam incidence angle. L2 originates from the partial transmission of the input beam through the half-plane beam splitter 104 and propagates in silicon at an angle determined by Snell's Law. In some examples, the fixed and moveable mirrors 106 and 108 are metallic mirrors, where selective metallization (e.g., using a shadow mask during a metallization step) is used to protect the beam splitter 104. In other examples, the mirrors 106 and 108 are vertical Bragg mirrors that can be realized using, for example, DRIE.

In some examples, the MEMS actuator 110 may be an electrostatic actuator formed of a comb drive and spring. For example, by applying a voltage to the comb drive, a potential difference results across the actuator 110, which induces a capacitance therein, causing a driving force to be generated as well as a restoring force from the spring, thereby causing a displacement of moveable mirror 108 to the desired position for reflection of the beam back towards the beam splitter 104.

Figure 2:
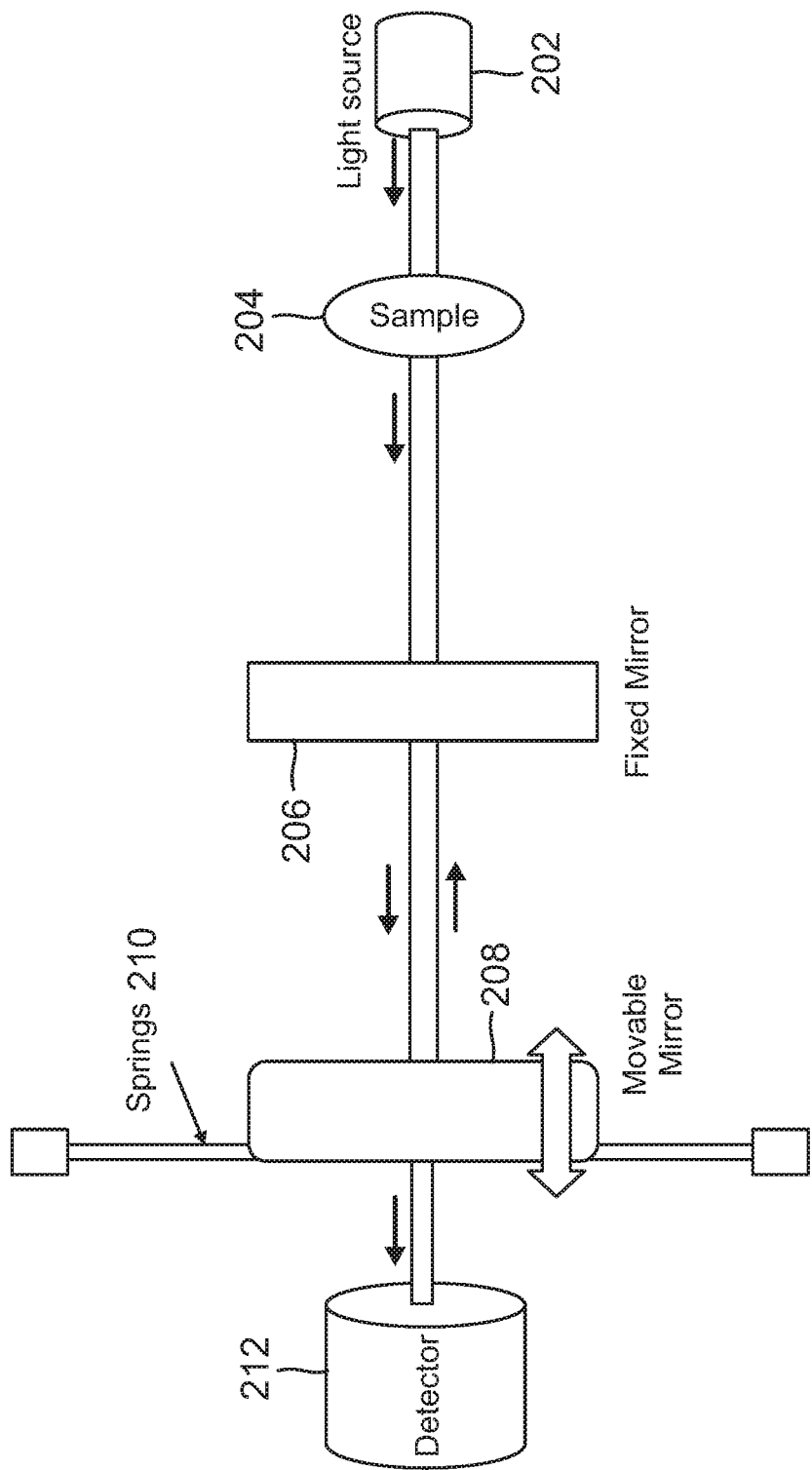
FIG. 2 is a diagram illustrating another example of a spectrometer according to some aspect.

FIG. 2 is a diagram illustrating another example of a spectrometer 200 according to some aspects. The spectrometer 200 may be, for example, a Fabry-Perot spectrometer that includes a fixed mirror 206, a moveable mirror 208, and a detector 212 (e.g., a photodetector). A light source 202 associated with the spectrometer 200 is configured to emit an input beam and to direct the input beam towards the fixed mirror 206. The light source 202 may include, for example, a laser source, one or more wideband thermal radiation sources, or a quantum source with an array of light emitting devices that cover the wavelength range of interest.

For light trapped in a Fabry-Pérot cavity formed between the fixed mirror 206 and the movable mirror 208, maximum transmission occurs when the optical path difference between each transmitted beam is equal to one complete cycle. This phenomenon can be used to create a tuneable light filter, which can be used as a spectrometer, as shown in FIG. 2. According to the phase shift equation, the wavelength of maximum transmission is given by:

$$\lambda_{max}=2n_r d^*\cos(\theta) \quad (1)$$

where $n_r$ is the refractive index of the cavity, d is the distance between the two mirrors 206 and 208 and $\theta$ is the incidence angle. If d changes as a result of motion of the movable mirror 208 using, for example, springs 210, $\lambda_{max}$ will change, thus forming a spectrometer. By measuring the light intensity using the photodetector 212 and measuring d, the relative intensity of each wavelength can be calculated.

As with the FT-IR spectrometer 100 shown in FIG. 1, a single-beam spectrum (power spectral density (PSD)) may be obtained using the Fabry-Perot spectrometer 200 shown in FIG. 2, where the intensity of the single-beam spectrum is proportional to the power of the radiation reaching the detector 212. In order to measure the absorbance of a sample 204, the background spectrum (i.e., the single-beam spectrum in absence of a sample) may first be measured to compensate for the instrument transfer function. The single-beam spectrum of light transmitted or reflected from the sample 204, the former being illustrated, may then be measured.

Figure 3:
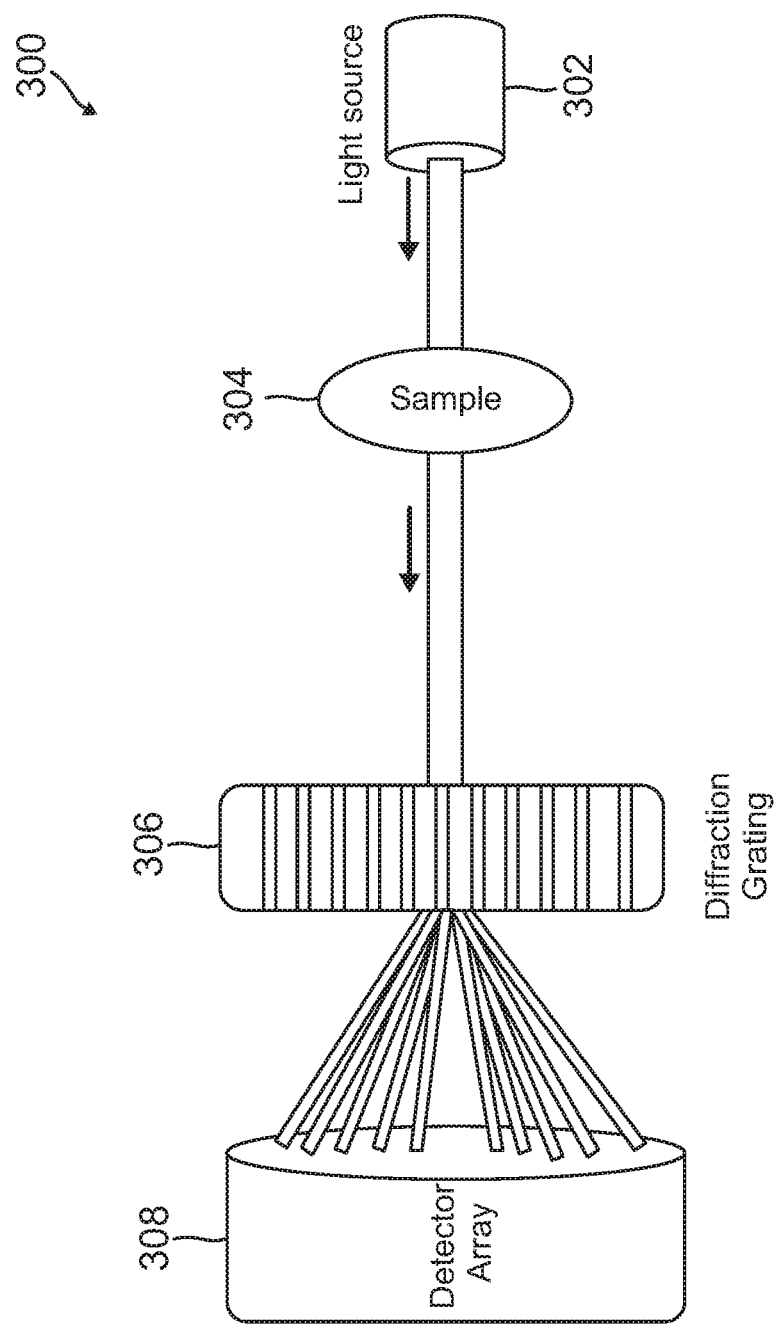
FIG. 3 is a diagram illustrating another example of a spectrometer according to some aspects.

FIG. 3 is a diagram illustrating another example of a spectrometer 300 according to some aspects. The spectrometer 300 may be, for example, a diffraction grating spectrometer that includes a diffraction grating 306 and a detector 308 (e.g., a photodetector). A light source 302 associated with the spectrometer 300 is configured to emit an input beam and to direct the input beam towards the diffraction grating 306. The light source 302 may include, for example, a laser source, one or more wideband thermal radiation sources, or a quantum source with an array of light emitting devices that cover the wavelength range of interest.

Diffraction grating spectrometers 300, such as the one shown in FIG. 3, exploit the diffraction to analyze light content at different angles, according to the equation $$d \sin(\theta_m)=m\lambda \quad (2)$$

where d is the periodicity of the grating, $\theta_m$ is the angle of diffracted beam and m is the order of diffraction. By measuring light intensity at each position on the detector 308, relative intensity for each wavelength point can be calculated. In some examples, the detector 308 may be a multi-pixel detector, as shown in FIG. 3, to detect the different intensity of light on every point on the detector 308 and convert that to an image that can then be processed to produce the light spectrum. In other examples, a single detector can be used. However, a movable mirror or slit may be needed to direct each wavelength separately to the detector.

The resulting light spectrum produced by the diffraction grating spectrometer 300 corresponds to a power spectral density (PSD), where the intensity of the spectrum is proportional to the power of the radiation reaching the detector 308 at each point. In order to measure the absorbance of a sample 304, the background spectrum (i.e., the spectrum in absence of a sample) may first be measured to compensate for the instrument transfer function. The spectrum of light transmitted or reflected from the sample 304, the former being illustrated, may then be measured.

Temperature variations can cause a change in instrument response including interferometer, optics, and photodetector response, which can be challenging to overcome even with post-processing of data. Stabilizing the temperature is one solution; however temperature stabilization may not be possible, especially in miniaturized spectrometers, as this affects size, power consumption, and possibility of sealing. The photodetector is considered as the main source of thermal drifts in spectrometers, such as the spectrometers shown in FIGS. 1-3.

Figure 4:
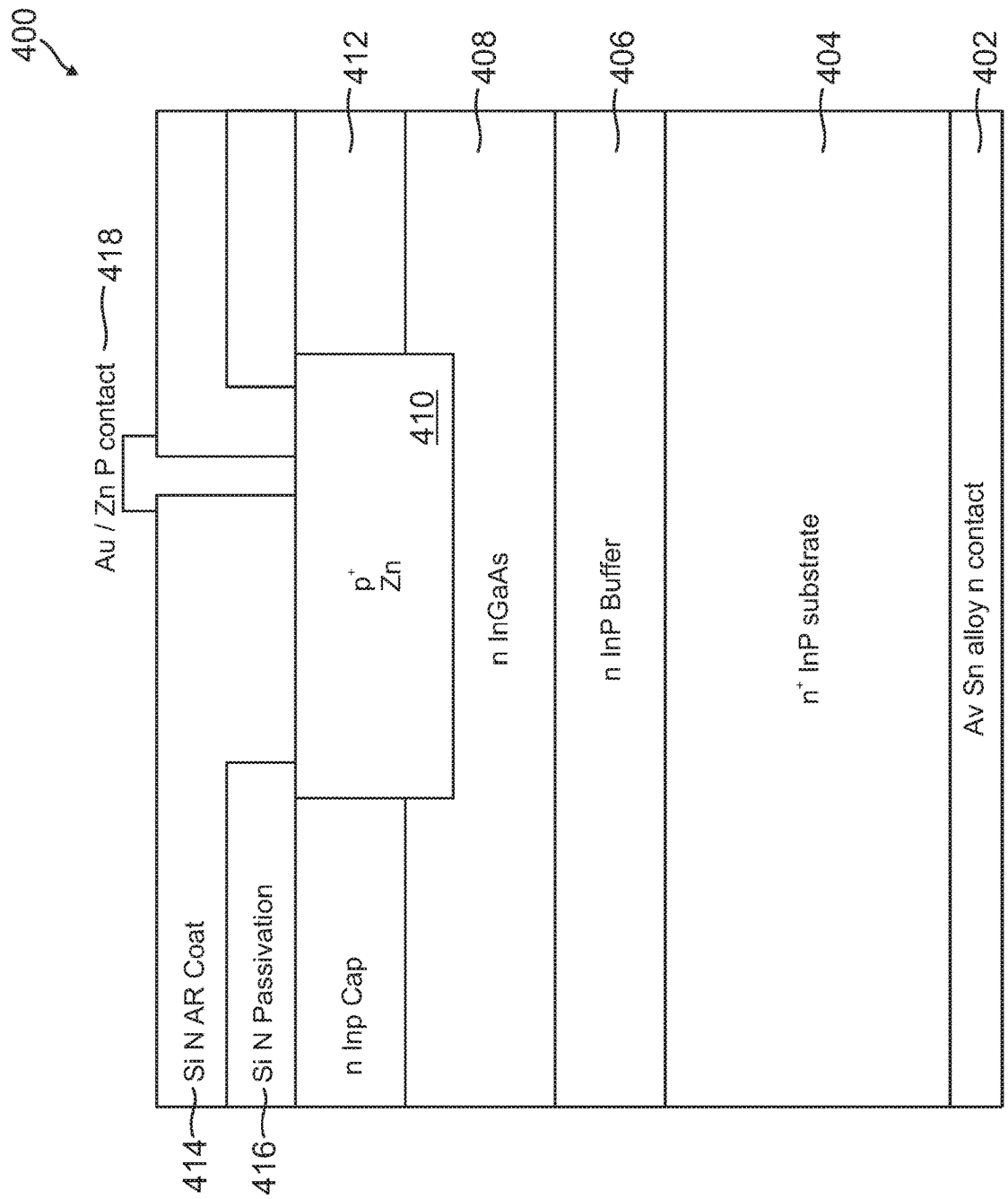
FIG. 4 is a diagram illustrating an example of a photodiode, which may be used in a photodetector of a spectrometer according to some aspects.

FIG. 4 is a diagram illustrating an example of a photodiode 400, which may be used in a photodetector of a spectrometer according to some aspects. The photodiode 400 shown in FIG. 4 is a PIN photodiode that includes five main layers. The first layer is the substrate 404 that carries the photodiode's other layers and acts as the N region of the PIN photodiode 400. The second layer is a buffer layer 406 that prevents the migration of defects and impurities from the substrate 404 to the active layer. The buffer layer 406 also serves as a matching layer to decrease the lattice mismatch between the active layer and the substrate 404. Lattice mismatch can cause dislocation defects that increase the dark current and decrease the shunt resistance of the photodiode. The third layer is the intrinsic I active layer 408 where light is converted to electric current. The fourth layer is the cap layer 410/412 that includes the P region. The cap layer 410/412 should be built from a high bandgap material relative to the active layer 408 to prevent the surface recombination of photo-generated carriers. For example, if the cap layer 410/412 has a small bandgap, photons may be able to generate carriers in the cap layer 410/412; hence, these photons will be absorbed and will not reach the active layer 408. Moreover, these photo-generated carriers on the cap layer 410/412 may be lost as they may recombine quickly due to the high doping in the cap layer 410/412. The last layer is a dielectric layer 414/416 that serves as a passivation, protective, and antireflection coating layer. Contacts 402 and 418 may be present on either side of the PIN photodiode 400.

Figure 5A:
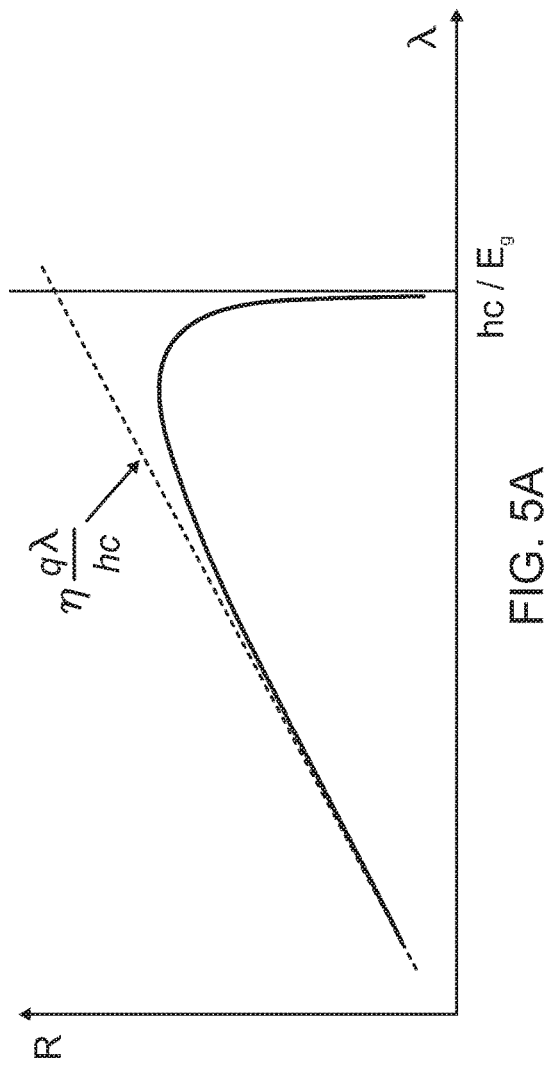
FIG. 5A is a graph illustrating ideal responsivity for photodiodes with constant quantum efficiency according to some aspects.

Quantum efficiency η of a photodiode, such as the PIN photodiode shown in FIG. 4, is defined as the number of generated electrons due to electron-photon interaction, divided by the number of incident photons on the photodiode. Responsivity S of the photodiode is defined as the photodiode output electric power divided by the incident light radiant power. Therefore, quantum efficiency and responsivity are linked by the following equation:

$$S = \frac{e\eta\lambda}{hc} \approx \eta * \frac{\lambda(\text{nm})}{1240} \quad (3)$$

where e is the electron charge, c is the speed of light, λ is the wavelength, and h is the plank's constant. Therefore, if η is constant, the responsivity should be linear with wavelength. FIG. 5A is a graph illustrating ideal responsivity for photodiodes with constant quantum efficiency η.

Figure 5B:
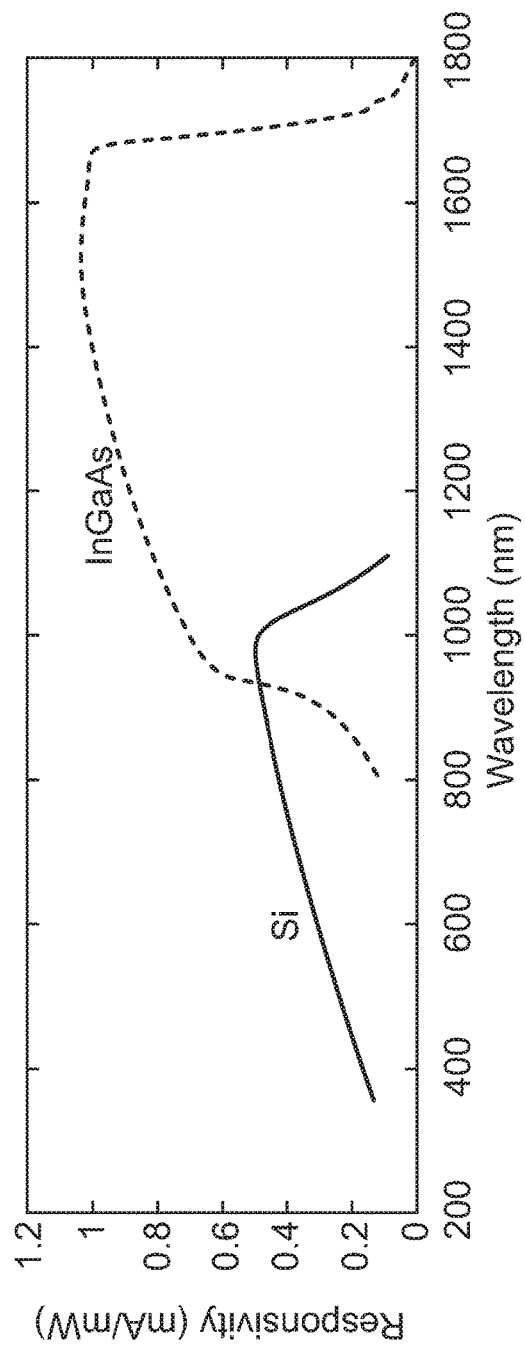
FIG. 5B is a graph illustrating typical responsivities of silicon (Si) and InGaAs photodiodes according to some aspects.

However, for practical photodiode applications, n may not be constant. FIG. 5B is a graph illustrating typical responsivities of silicon (Si) and InGaAs photodiodes. FIG. 5B shows the deviation of responsivity from the linear behaviour for typical semiconductor photodetectors shown in FIG. 5A. On the right side of each responsivity curve, the responsivity decreases sharply to reach zero at the longer wavelengths when the photon energy is smaller than the bandgap, while the left side of each responsivity curve also deviates from the expected linear behaviour.

The responsivity η may also be defined as the total photon flux divided by the total electrons flux as follows:

$$\eta = \frac{\phi_{incident\ photons}}{\phi_{generated\ electrons}} \quad (4)$$

The generated electrons can be calculated from the following equation:

$$\phi_{generated\ electrons} = \phi_{incident\ photons} * (1-R) * e^{-a_c d_c} * (1-e^{-a_a d_a}) * \xi \quad (5)$$

where R is the reflection of photons from the top surface of the photo-diode, $a_c$ and $d_c$ are the absorption coefficient and the thickness of the cap layer respectively, $a_a$ and $d_a$, are the absorption coefficient and the thickness of the active layer respectively and ξ is the fraction of absorbed photons in the active layer that leads to generation of useful electron flux. From the previous two equations, $$\eta = (1-R) * e^{-a_c d_c} * (1-e^{-a_a d_a}) * \xi \quad (6)$$

Each term in Equation (6) has a contribution to the behaviour of the photodiode. In some examples, it may be desirable to decrease R to the minimum value possible. This may be done with the aid of the passivation layer, which is designed to act as an AR coating. For example, a typical AR coating may be able to decrease reflection to less than 0.5%. However, every AR coating has a bandwidth (BW). Outside the BW, reflection starts to increase, hence, quantum efficiency decreases. Thus, one reason behind the responsivity deviation from the linear behaviour is the non-constant reflection along the whole spectrum.

The term $(1-e^{-a_a d_a})$ describes the absorption that happens in the active layer. In some examples, this term may be made as big as possible (close to 1) since the absorption of photons in the active layer is the process that leads to electrons generation. The absorption coefficient for some semiconductor materials used in the manufacturing of photodiodes may sharply increase when the photon energy exceeds the band-gap energy, especially the direct band-gap materials. This high absorption is due to the interband transition, which is the electron transition between valence and conduction bands. Indeed, electro-photon generation is an interband transition from valence to conduction band. Therefore, the responsivity of the detector approaches zero for high wavelengths when photon energy is less than the band gap. This corresponds to the cut-off wavelength of the detector $$\lambda_c = \frac{hc}{E_g}.$$

The absorption coefficient for a direct band gap transition is related to the energy gap by the following relation:

$$a \propto (h\nu - E_g)^m \quad (7)$$

where m is a material dependent parameter and it is equal to ½ in many materials, while the indirect band transition absorption coefficient is given by:

$$a \propto (h\nu - E_g^{ind} + h\Omega)^2 \quad (8)$$

By inspecting the InGaAs responsivity curve in FIG. 5B, it can be noticed that at cut-off wavelength, responsivity experiences a sharp decay. However, it is not instantaneous as expected. The curve shows that there are some electrons generated even to the right of cut-off wavelength where no interband transition occurs and where absorption should be equal to zero. This is because of two reasons, the Urbach tail and thermal absorption.

The Urbach tail is the representation of the non-abrupt decay of absorption beyond the cut-off wavelength. It is due to statistical broadening of the band gap energy. For example, band gap energy is not a sharp constant in every place of the material, instead, it has some sort of statistical distribution. This is due to the defects in the crystalline structure. Moreover, the change of the composition of alloy materials from place to place may cause this broadening. For example, alloy materials are deposited using epitaxial growth, which may have some variations that lead to this broadening. The Urbach tail is described by the following exponential empirical equation:

$$a = a_v * e^{h\nu/E_v} \quad (9)$$

where $a_v$ and $E_v$ are empirical constants that depend on the material and the fabrication process. Thermal absorption also leads to some absorption beyond the cut-off wavelength. However, its effect is weak compared to the Urbach tail. Thermal absorption can happen due to interband transition, exciton absorption below bandgap, or phonon absorption. By combining the aforementioned equations of absorption in direct and indirect band gap transitions, it can be deduced that absorption is increasing for the wavelengths shorter than the cut-off. This means that quantum efficiency should increase and the responsivity should be higher than expected by the linear model. However, the opposite happens. As can be seen in FIG. 5B, the InGaAs curve shows that the responsivity reaches a maximum value then decays faster than expected. Moreover, below a specific wavelength (about 0.97 µm), it decays exponentially.

The first decay is related to the term $\xi$ in the quantum efficiency equation. This term describes how many of the generated electrons will lead to useful electric current. For example, not all generated electrons may participate in the electric current, because some of them recombine before they reach the electrodes, and $\xi$ decreases for shorter wavelengths because of hot carriers' effect. When electrons have higher energy than the bandgap, they can reach a higher position in the conduction band. However, this position is not stable; hence, they lose this excess energy gradually as phonons to reach the bandgap energy. This leads to a faster recombination rate of these hot electrons due to phonons assisted recombination. Furthermore, these hot electrons suffer from a higher rate of surface traps capturing, because their high energy enables them to hit the surface on a higher rate.

The last term in the quantum efficiency equation $e^{-a_c d_c}$ is the reason behind the exponential decay in responsivity that starts at the wavelength about 0.97 µm in the InGaAs responsivity curve in FIG. 5B. This term describes the absorption in the cap layer, where $a_c$ is the absorption coefficient of the cap layer and $d_c$ is its thickness. For example, the cap layer 412 in the InGaAs photodiode shown in FIG. 4 is made of InP, a material with a cut-off wavelength of 0.97 µm (this cut-off wavelength changes depending on the cap layer martial). Before the cut-off, $a_c$ is negligible and the cap layer is transparent, but after reaching the cut-off, $a_c$ rockets up and much of the light intensity is absorbed. Absorption in the cap layer does not create electric current, because the cap layer is highly p doped, hence, the generated electrons recombine very fast. This absorption may be decreased by decreasing the thickness $d_c$ of the cap layer; however, decreasing it lower than a certain value affects the reliability of the photodetector.

As previously described, a minimum amount of photon energy, equal to the bandgap energy, is needed to raise the electron to the conduction band. Therefore, it is not possible for photons with wavelengths longer than a specific value, $\lambda_{cut-off}$, to cause electron generation. However, the bandgap of most semiconductor materials decreases with temperature according to the equation:

$$E_{bg} = E_{bg0} - \frac{\alpha T^2}{T + \beta} \quad (10)$$

where $\alpha$ and $\beta$ are fitting parameters that depend on the material. This effect is caused by the increase in lattice constant or interatomic spacing due to the increase in atoms' vibration caused by thermal energy. The increase in interatomic spacing decreases the attractive force applied on electrons by an atoms' nuclei; hence, the band-gap energy decreases.

Figure 6:
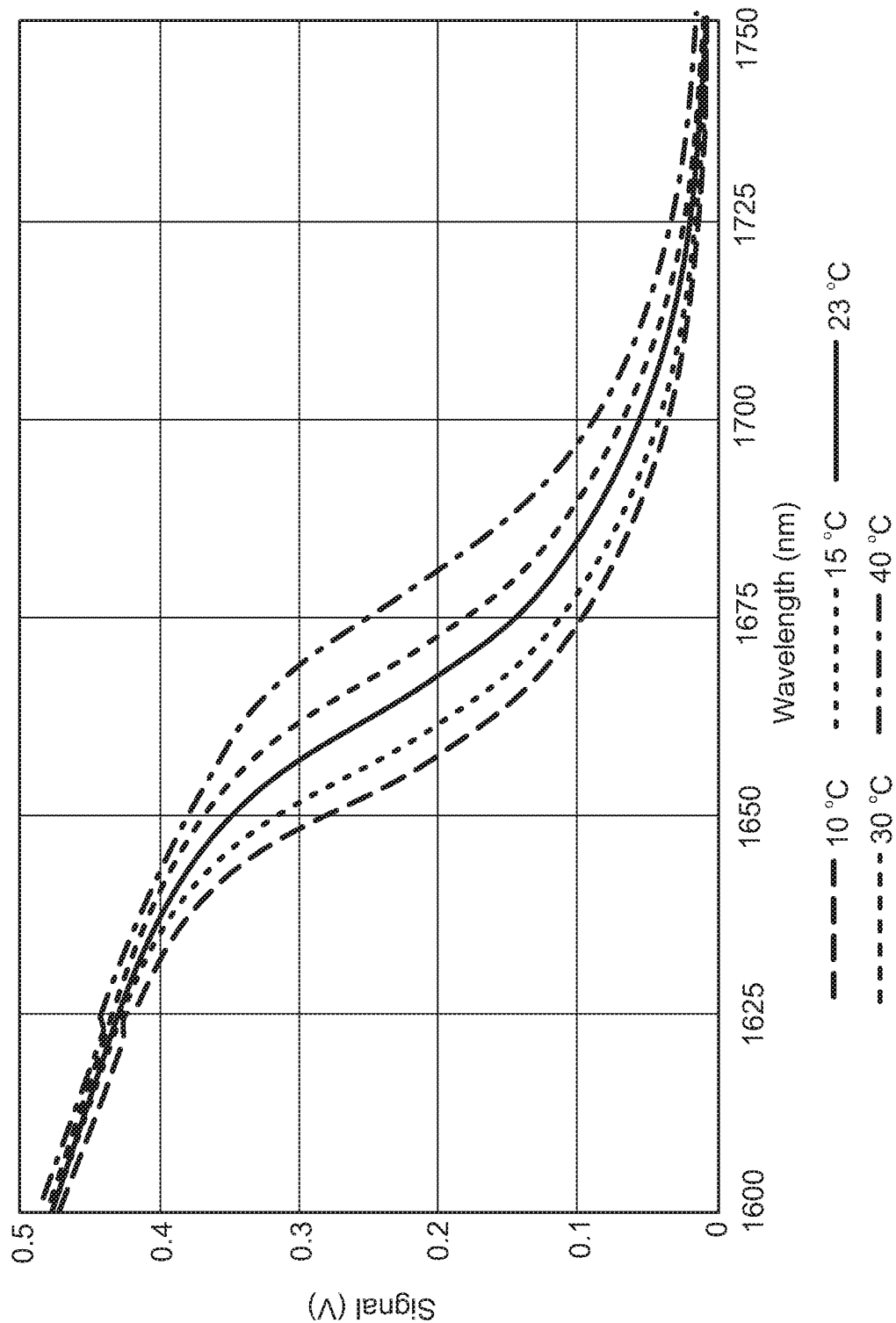
FIG. 6 is a graph illustrating the shift in cut-off wavelength with temperature for a semiconductor photodiode according to some aspects.

FIG. 6 is a graph illustrating the shift in cut-off wavelength with temperature for a semiconductor photodiode according to some aspects. As shown in FIG. 6, the cut-off wavelength of photodetectors shifts to higher wavelengths, as a result of the reduction in band gap energy with temperature.

Figure 7:
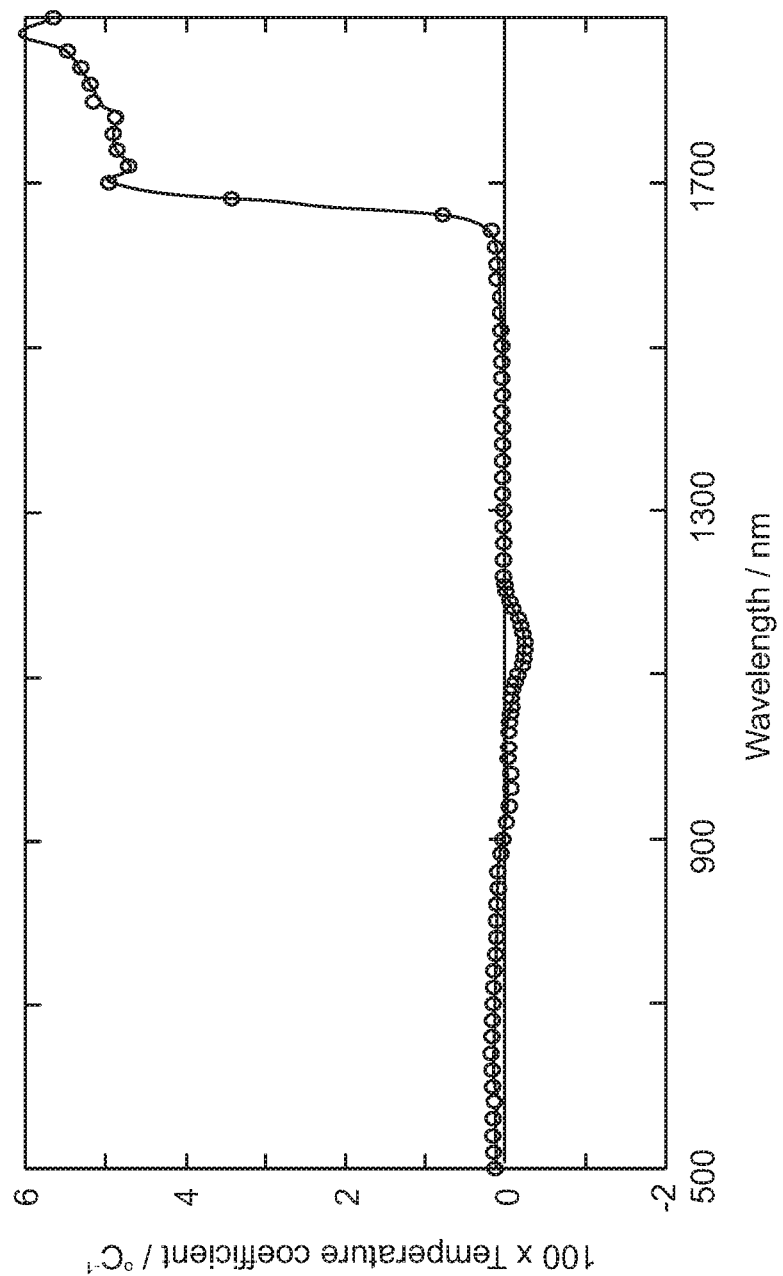
FIG. 7 is a graph illustrating the spectral temperature coefficient of the responsivity of a photodiode according to some aspects.

FIG. 7 is a graph illustrating the spectral temperature coefficient of the responsivity of a photodiode according to some aspects. As can be seen in FIG. 7, the temperature coefficient versus wavelength can be divided into two regions. The strong positive increase at the right side (right region) of the graph is due to the previously explained shift in cut-off to higher wavelengths with increasing temperature. The left region, which has a negative temperature coefficient, is due to the increase of absorption in the cap layer. Typically, the cap layer cut-off is located in the middle of the spectrum. This is the aforementioned reason behind the sharp decrease in responsivity of the photodiode at short wavelengths (e.g., because the cap layer which has a higher bandgap can absorb those photons as they have enough energy to generate electrons in the cap layer). Increasing temperature reduces the penetration depth of light. Thus, less light can reach the active layer and is absorbed in the cap layer. Moreover, the dip feature that appears in the middle of the graph shown in FIG. 7 is due to the shift of the cap layer cut-off. For example, as the temperature increases, the cap layer bandgap decreases; hence, photons with longer wavelengths can generate electrons in the cap layer, and as a consequence, some of them are absorbed in the cap layer. The position of the dip in the spectrum depends on the cap layer material cut-off wavelength.

Thermal drift affects all photodetectors whether they are photodiodes, such as InGaAs, InAs and Si, or photoconductors, such as PbSe, PbS and HgCdTe.

Figure 8:
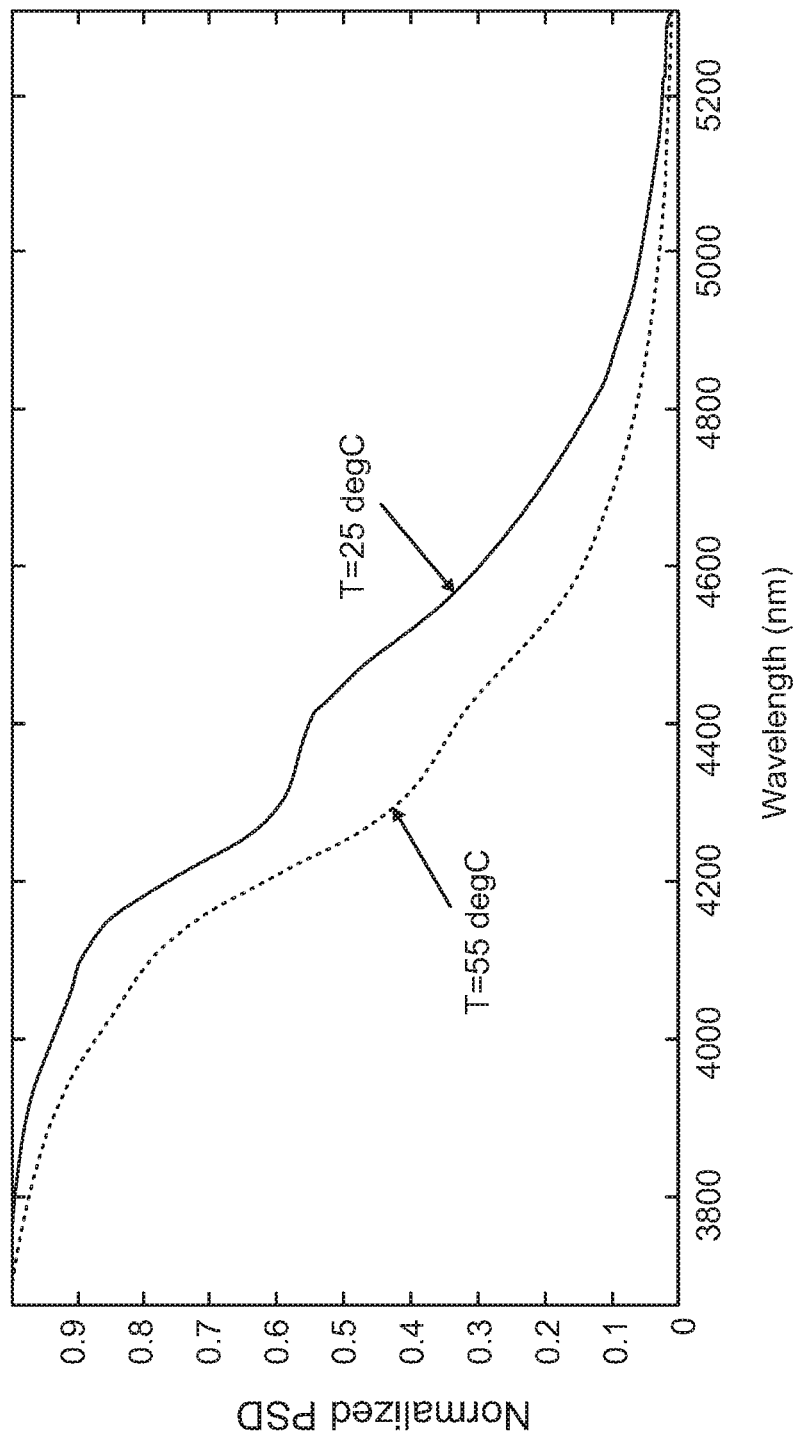
FIG. 8 is a graph illustrating the shift in the cut-off wavelength with temperature for a semiconductor photoconductive detector according to some aspects.

Photoconductive detectors generally suffer from higher thermal drifts. FIG. 8 is a graph illustrating the shift in the cut-off wavelength with temperature for a semiconductor photoconductive detector (e.g., an MIR PbSe photoconductive photodetector) according to some aspects. Since the bandgap of this material increases with temperature, the cut-off wavelength decreases with temperature.

To enable on-line compensation for instrumental response change causes, including temperature drift, humidity drift, light source inefficiency, optical misalignment and other suitable causes, a spectrometer may be configured with a correction matrix including a plurality of sets of correction parameters (e.g., correction functions). The correction matrix may be generated during assembly line production of the spectrometer or may be based on a global (e.g., average) correction matrix applicable to a plurality of spectrometers.

Figure 9:
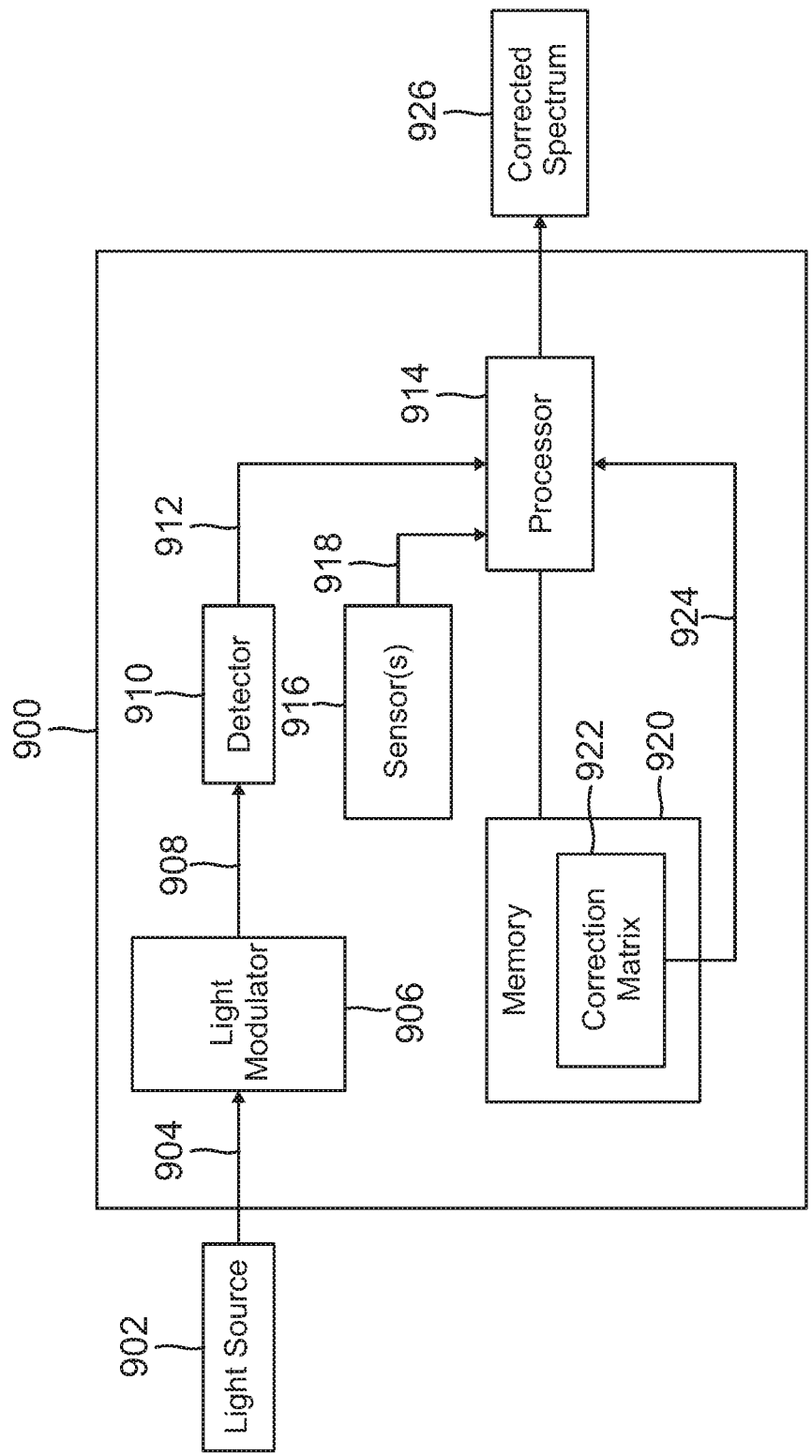
FIG. 9 is a diagram illustrating an example of a spectrometer configured for on-line compensation of instrumental drift according to some aspects.

FIG. 9 is a diagram illustrating an example of a spectrometer 900 configured for on-line compensation of instrumental drift according to some aspects. The spectrometer 900 includes a light modulator 906, a detector 910, and a processor 914. The light modulator 906 may use a spectroscopic technique, including, but not limited to, direct absorption spectroscopy, indirect absorption spectroscopy, such as photo-acoustic spectroscopy, photo-thermal spectroscopy, or Raman spectroscopy. In some examples, the light modulator 906 may include a diffraction element, a Michelson interferometer, a Fabry-Perot cavity, a spatial light modulator, or a birefringent device. For example, the light modulator may include a MEMS interference device. The detector 910 may correspond to, for example, to a photodetector. A light source 902 may further be coupled to or incorporated within the spectrometer 900 (the former being illustrated). The light source 902 may include, for example, a laser source, one or more wideband thermal radiation sources, or a quantum source with an array of light emitting devices that cover the wavelength range of interest.

The processor 914 may include a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor 914 may be coupled to a memory, such as memory 920. The memory 920 may be a single memory device, a plurality of memory devices, and/or embedded circuitry of the processor 914. Such a memory device may be a read-only memory, random access memory, volatile memory, non-volatile memory, static memory, dynamic memory, flash memory, cache memory, and/or any device that stores digital information, including instructions (e.g., code) that may be executed by the processor 914.

The memory 920 may further store a correction matrix 922. The correction matrix 922 may include a plurality of sets of correction parameters (e.g., correction functions) that may be utilized to provide on-line compensation of spectrum measurements. For example, the correction matrix 922 may provide on-line compensation due to variations in environmental conditions, including thermal (temperature) drift and humidity drift, and due to other sources of instrumental drift, such as light source inefficiency and optical misalignment. In some examples, the correction matrix 922 may include a plurality of correction matrices, each configured to provide on-line compensation due to a different condition. For example, the correction matrix 922 may include a temperature drift correction matrix and a humidity drift correction matrix. As another example, the correction matrix 922 may include a temperature drift correction matrix, a humidity drift correction matrix, and a light source inefficiency correction matrix. Any combination of correction matrices is within the scope of the present disclosure.

The correction matrix 922 may be locally generated for the spectrometer 900 or based on a cloud-based (global) correction matrix applicable to a plurality of spectrometers. In some examples, the correction matrix 922 may be continuously or periodically updated via a machine learning (ML) or artificial intelligence (AI) engine, which may include a local AI/ML engine and/or a cloud-based AI/ML engine. In some examples, the spectrometer 900 may further include other circuitry, such as control circuitry configured to control the light modulator 906 and light source(s) 902, powering circuitry configured to provide power to the various components of the spectrometer 900, communication circuitry (e.g., Wi-Fi, Bluetooth, cellular, etc.) configured to enable wireless communication with the spectrometer 900 (e.g., for cloud-based AI applications), and/or other suitable circuitry.

The spectrometer 900 may further include one or more sensor(s) 916, each configured to obtain a respective value 918 of a condition contributing to instrumental drifts in the spectrometer 900. The sensor 916 may be a separate sensor (e.g., separate from the light modulator 906, detector 910 and processor 914), a sensor embedded in or coupled to the light modulator 906, control/detection electronics, light source, or other component of the spectrometer 900, or may be realized as an algorithm that may be executed by the processor 914 to sense the value 918 based on a relation between the detector output and the condition being sensed. Examples of values include, but are not limited to, temperature values, humidity values, light source efficiency values, and optical misalignment values.

In an example operation, the light source 902 may be configured to generate input light 904 and to direct the input light to the light modulator 906. For example, the input light 904 may be directed to the light modulator 906 via an optical fiber and/or one or more optical elements (e.g., mirrors and/or focusing lenses). The light modulator 906 may be configured to produce modulated light 908 based on the input light 904 and to direct the modulated light 908 towards the detector 910 to produce an output 912. For example, the modulated light 908 may be directed to the detector 910 via an optical fiber and/or one or more optical elements (e.g., mirrors and/or focusing lenses). In examples in which the light modulator 906 is a FT-IR interferometer or Fabry-Perot interferometer, the modulated light 908 may correspond to interference beams produced over time with an OPD between beams. The output 912 of the detector 910 may then correspond to an interferogram. In examples in which the light modulator 906 is a diffraction grating, the modulated light 908 may correspond to diffracted light across a plurality of wavelengths. The output 912 of the detector 910 may then correspond to an image representing the light intensity at each wavelength point on the detector 910.

The output 912 of the detector 910 may then be input to the processor 914 to produce a sample spectrum of a sample under test (not shown). For example, the processor 914 may apply a Fourier transform of the interferogram data produced by the detector and the OPD in the light modulator 906 to produce the spectrum. The processor 914 may further be configured to correct the sample spectrum based on instrumental response drifts in the spectrometer 900 to produce a corrected spectrum 926. The processor 914 may be configured to receive from the one or more sensor(s) 916 respective values 918 of one or more conditions measured by the sensor(s) 916 contributing to the instrumental drifts. The processor 914 may further be configured to access the memory 920 to retrieve a respective set of correction parameters 924 from the correction matrix 922 based on each received value 918. The processor 914 may then be configured to apply the set(s) of correction parameters 924 to the sample spectrum to produce the corrected spectrum 926.

Figure 10:
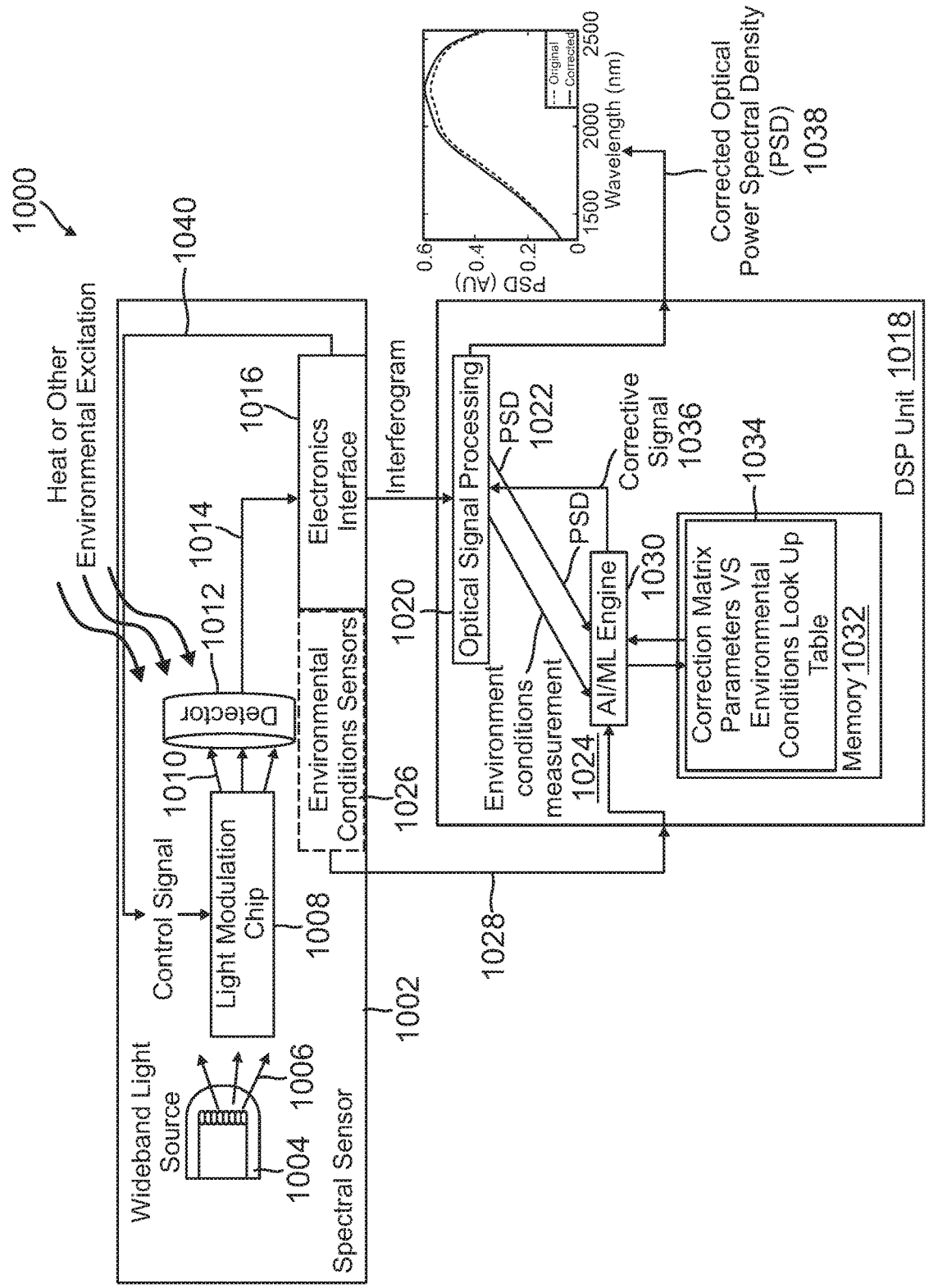
FIG. 10 is a diagram illustrating another example of a spectrometer configured for on-line compensation of instrumental drift according to some aspects.

FIG. 10 is a diagram illustrating another example of a spectrometer 1000 configured for on-line compensation of instrumental drift according to some aspects. The spectrometer 1000 includes a spectral sensor 1002 and a digital signal processing (DSP) unit 1018. The spectral sensor 1002 includes a light source 1004 (e.g., a wideband light source), a light modulator chip 1008 (e.g., a light modulator), a detector 1012 (e.g., a photodetector), and an electronics interface 1016.

The light modulator 1008 may use a spectroscopic technique, including, but not limited to, direct absorption spectroscopy, indirect absorption spectroscopy, such as photoacoustic spectroscopy, photo-thermal spectroscopy, or Raman spectroscopy. In some examples, the light modulator 906 may include a diffraction element, a Michelson interferometer, a Fabry-Perot cavity, a spatial light modulator, or a birefringent device. For example, the light modulator may include a MEMS interference device. The electronics interface 1016 may include the control circuitry to control the light modulator 1008 and light source 1004. For example, the electronics interface 1016 may be configured to provide a control signal 1040 to the light modulation chip 1008 to control operation of the light modulator. In addition, the electronics interface 1016 provides an electrical connection to the DSP unit 1018.

The spectral sensor 1002 may further include one or more environmental conditions sensor(s) 1026, each configured to obtain a respective value 1028 of a condition contributing to instrumental drifts in the spectral sensor 1002. In some examples, the environmental conditions sensor 1026 may be a separate sensor (e.g., separate from the light source 1004, the light modulator 1008, and the detector 1012 or may be a sensor embedded in or coupled to the light modulator 1008, electronics interface 1016, light source 1004, or other component of the spectral sensor 1002. Examples of values 1028 include, but are not limited to, temperature values, humidity values, light source efficiency values, and optical misalignment values.

The DSP unit 1018 includes an optical signal processing unit 1020, an artificial intelligence (AI)/machine learning (ML) engine 1030, and a memory 1032. The optical signal processing unit 1020 may include a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The memory 1032 may be a single memory device or a plurality of memory devices. Such a memory device may be a read-only memory, random access memory, volatile memory, non-volatile memory, static memory, dynamic memory, flash memory, cache memory, and/or any device that stores digital information, including instructions (e.g., code) that may be executed by the optical signal processing unit 1020.

The memory 1032 may further store a correction matrix 1034. The correction matrix 1034 may include a look up table of sets of correction parameters (e.g., correction functions) verses environmental conditions (or other conditions). For example, the sets of correction parameters in the correction matrix 1034 may provide on-line compensation due to variations in environmental conditions, including thermal (temperature) drift and humidity drift, and due to other sources of instrumental drift, such as light source inefficiency and optical misalignment. In some examples, the correction matrix 1034 may include a plurality of correction matrices, each configured to provide on-line compensation due to a different condition.

In the example shown in FIG. 10, the correction matrix 1034 may be generated and/or updated using the AI/ML engine 1030. The AI/ML engine 1030 may fully reside in hardware and/or software on the spectrometer 1000 or may be implemented using a cloud-based AI/ML engine. In this example, a local AI/ML engine 1030 residing in hardware and/or software on the spectrometer may be in communication with (e.g., wireless communication) the cloud-based AI/ML engine. For example, the cloud-based AI/ML engine may provide access to one or more cloud-based correction matrices that may be downloaded into the memory 1032 and adapted (e.g., updated) for the spectrometer 1000 by the AI/ML engine 1030. For example, the AI/ML engine 1030 may use the output (e.g., values 1028) obtained by one or more environmental sensors 1026 at each sample measurement, along with the sample spectrum (e.g., power spectral density (PSD)) of each sample measurement to update the correction matrix 1034. As another example, instead of having a dedicated environmental conditions sensor 1026 on the spectral sensor, the sensor value (e.g., an environment conditions measurement 1024) may be obtained by the optical signal processing unit 1020 during processing of the PSD 1022. The environment conditions measurement 1024, together with the PSD 1022 may be input to the AI/ML engine 1030 to update the correction matrix 1034. In some examples, the DSP unit 1018 may include circuitry configured to execute the AI/ML engine 1030 (e.g., software or instructions for performing ML functions). In other examples, the DSP unit 1018 may include dedicated ML circuitry (e.g., one or more application specific integrated circuits (ASICs)) configured to perform one or more functions of the AI/ML engine 1030.

In an example operation, the light source 1004 may be configured to generate input light 1006 and to direct the input light to the light modulator 1008. For example, the input light 1006 may be directed to the light modulator 1008 via an optical fiber and/or one or more optical elements (e.g., mirrors and/or focusing lenses). The light modulator 1008 may be configured to produce modulated light 1010 based on the input light 1006 and to direct the modulated light 1010 towards the detector 1012 to produce an output 1014. For example, the modulated light 1010 may be directed to the detector 1012 via an optical fiber and/or one or more optical elements (e.g., mirrors and/or focusing lenses). In examples in which the light modulator 1008 is a FT-IR interferometer or Fabry-Perot interferometer, the modulated light 1010 may correspond to interference beams produced over time with an OPD between beams. The output 1014 of the detector 1012 may then correspond to an interferogram. In examples in which the light modulator 1008 is a diffraction grating, the modulated light 1010 may correspond to diffracted light across a plurality of wavelengths. The output 1014 of the detector 1012 may then correspond to an image representing the light intensity at each wavelength point on the detector 1012.

The output 1014 of the detector 1012 may then be output from the electronics interface 1016 to the DSP unit 1018. The optical signal processing unit 1020 within the DSP unit 1018 may process the output 1014 of the detector 1012 to produce a sample spectrum (e.g., a PSD) of a sample under test (not shown). For example, the optical signal processing unit 1020 may transform the interferogram 1014 provided by the detector 1012 to a PSD using a Fast Fourier transform (FFT). The optical signal processing unit 1020 may further be configured to correct the sample spectrum based on instrumental response drifts in the spectral sensor 1002 to produce a corrected spectrum (e.g., corrected optical PSD) 1038. For example, the optical signal processing unit 1020 may be configured to receive from the AI/ML engine 1030 a set of correction parameters (e.g., a correction signal) 1036 to be applied to the PSD to produce the corrected PSD 1038. In an example, the AI/ML engine 1030 may receive from one or more environmental conditions sensor(s) 1026 and/or from the optical signal processing unit 1020, respective values 1028 and/or 1024 of one or more conditions measured by the sensor(s) 1026 and/or optical signal processing unit 1020 contributing to the instrumental drifts. The AI/ML engine 1030 may further be configured to access the memory 1032 to retrieve a respective set of correction parameters 1036 from the correction matrix 1034 based on each received value 1028/1024. The optical signal processing unit 1020 may then be configured to apply the set(s) of correction parameters 1036 to the sample spectrum (PSD) to produce the corrected spectrum (corrected PSD) 1038.

In some examples, the correction matrix may be a temperature correction matrix that is based on the wavelength cut-off of the detector (e.g., detector 1012). The cut-off of photodetectors responsivity shifts with temperature. For example, in InGaAs detectors, the shift takes place due to heat-assisted electron generation. There is an approximately linear relation between temperature and the wavelength at 10% of the power spectral density (PSD) maximum value, denoted as $\lambda_{10\%\ PSDmax}$, of a spectrometer that includes an InGaAs photodetector.

Figure 11B:
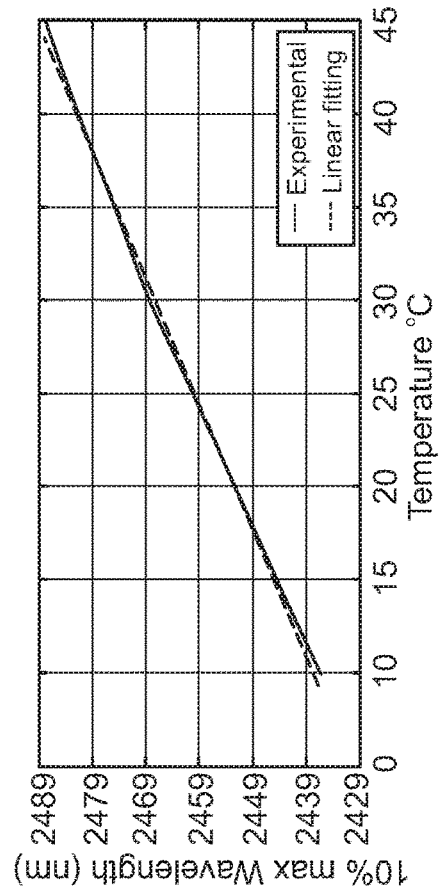
FIGS. 11A and 11B are diagrams illustrating the relation between temperature and wavelength according to some aspects.
Figure 11A:
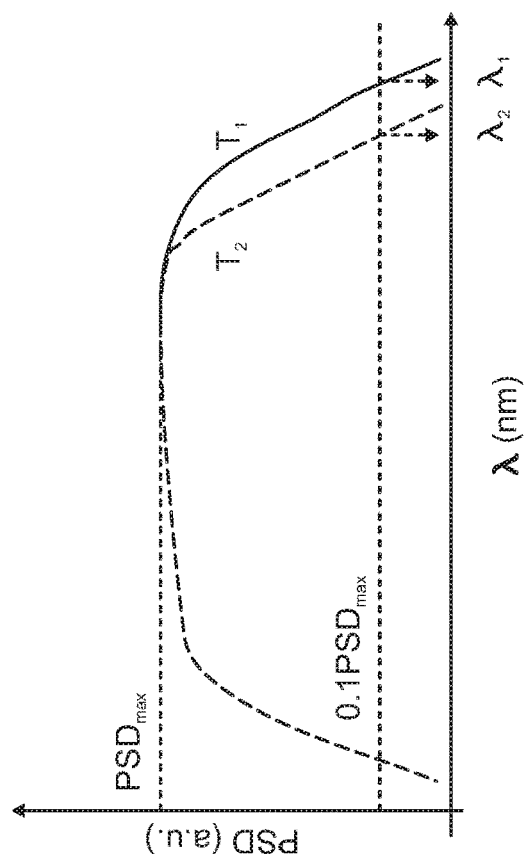

FIGS. 11A and 11B are diagrams illustrating the relation between temperature and wavelength according to some aspects. FIG. 11A illustrates the PSD of the spectrometer at two different temperatures and the corresponding extracted 10% wavelengths. The relation may be described by the equation:

$$T = A * \lambda_{10\% \ PSDmax} + C \quad (11)$$

Furthermore, as shown in FIG. 11B, the slope A is nearly constant for the same type of detector, while C can be changing from spectrometer unit to spectrometer unit. Higher order polynomials can be used as well to increase the accuracy if needed. In principle any criteria rather than the 10% wavelength can be used to define a threshold for the calculations of the shift.

In some examples, the detector cut-off may be utilized in generating the correction matrix by extracting the change in temperature T from the change in the cut-off wavelength. In other examples, the temperature T may be measured using a dedicated temperature sensor. In the former case, in order to discern the temperature, the parameter C or other higher order polynomial fitting parameters can be calibrated for each spectrometer unit using a single calibration measurement at room temperature.

Figure 12:
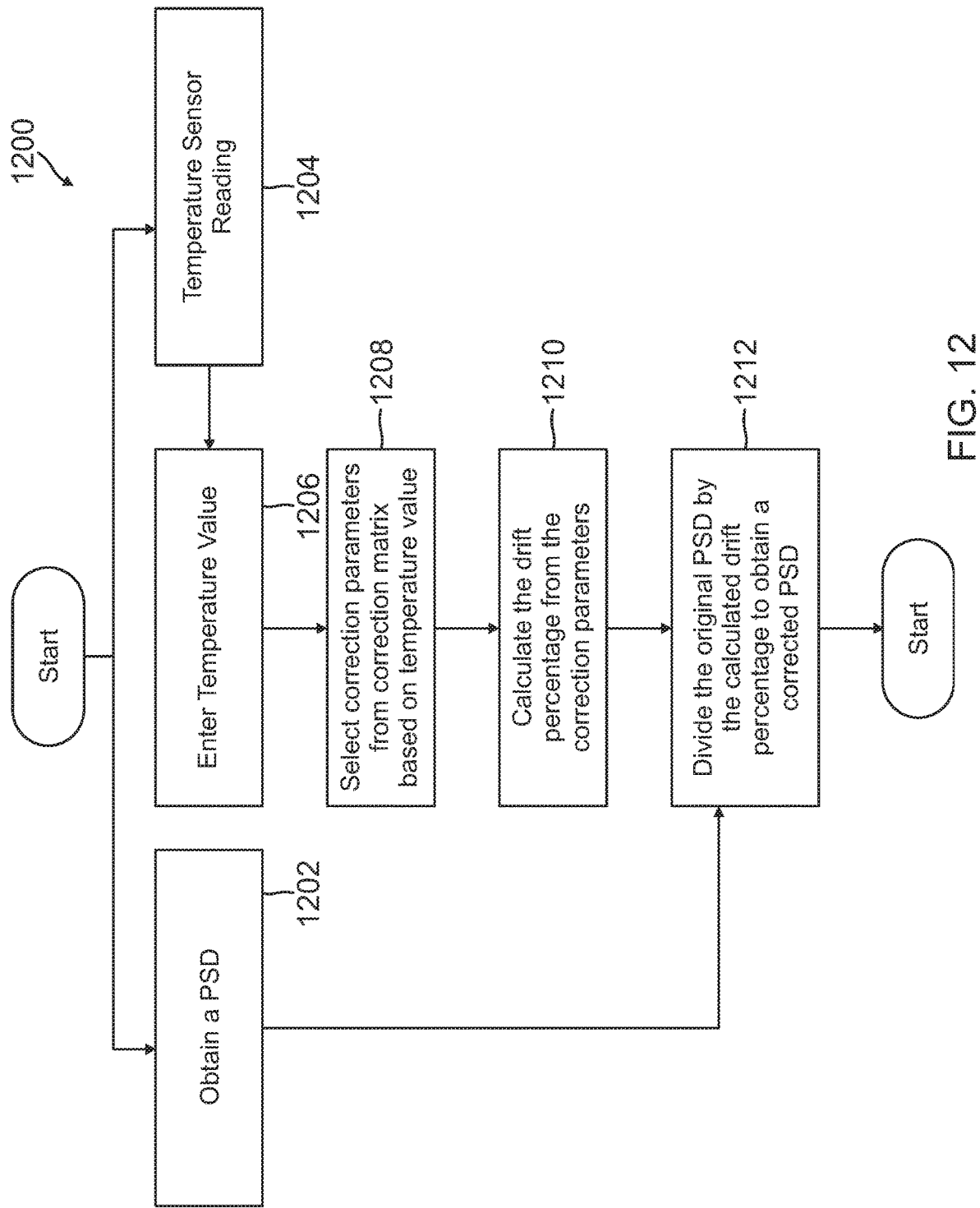
FIG. 12 is a flow chart illustrating a process for on-line compensation of temperature drifts in a spectrometer according to some aspects.

FIG. 12 is a flow chart illustrating a process for on-line compensation of temperature drifts in a spectrometer according to some aspects. As described below, some or all illustrated features may be omitted in a particular implementation within the scope of the present disclosure, and some illustrated features may not be required for implementation of all examples. In some examples, the process may be performed by a processor, processing unit, or processing system of a spectrometer, or by any suitable means for carrying out the described functions.

At block 1202, the processor may obtain a PSD based on an output of a detector of a spectrometer. At block 1204, the processor may obtain a temperature sensor reading. For example, the temperature sensor reading may be a temperature value provided by a dedicated temperature sensor within the spectrometer. As another example, the temperature sensor reading (indicated as a change in temperature) may be extracted by the processor based on a change in the cut-off wavelength of the spectrometer. At block 1206, the processor may enter the temperature value into an algorithm executed by the processor for correcting the PSD.

At block 1208, the processor may select a set of correction parameters from a stored correction matrix based on the temperature value. The selected set of correction parameters may indicate a correction function to be applied to the PSD. For example, at 1210, the processor may calculate a drift percentage (e.g., a percentage of drift of the PSD) from the correction parameters. At 1212, the processor may divide the original PSD obtained at block 1202 by the calculated drift percentage to obtain a corrected PSD.

Figure 13:
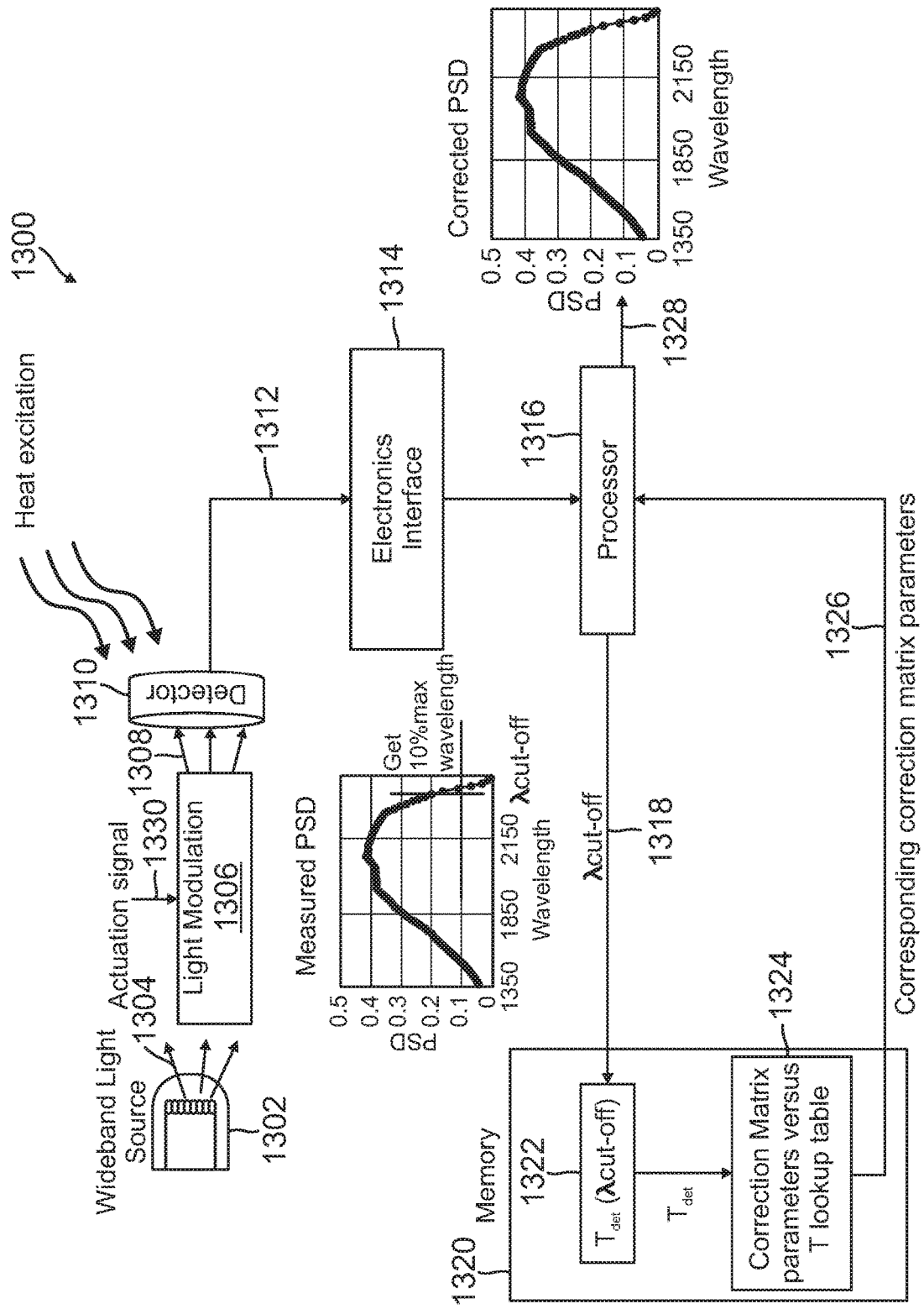
FIG. 13 is a diagram illustrating an example of a spectrometer employing the detector as a temperature sensor to be used for the correction of thermal drift according to some aspects.

FIG. 13 is a diagram illustrating an example of a spectrometer 1300 employing the detector as a temperature sensor to be used for the correction of thermal drift according to some aspects. The spectrometer 1300 includes a light source 1302 (e.g., a wideband light source), a light modulator 1306, a detector 1310, an electronics interface 1314, a processor 1316 and a memory 1320. The light modulator 1306 may use a spectroscopic technique, including, but not limited to, direct absorption spectroscopy, indirect absorption spectroscopy, such as photo-acoustic spectroscopy, photo-thermal spectroscopy, or Raman spectroscopy. In some examples, the light modulator 1306 may include a diffraction element, a Michelson interferometer, a Fabry-Perot cavity, a spatial light modulator, or a birefringent device. For example, the light modulator may include a MEMS interference device. The detector 1310 may correspond to, for example, to a photodetector. The memory 1320 may further store a correction matrix 1324. The correction matrix 1324 may include a look up table of sets of correction parameters (e.g., correction functions) verses temperature (T).

Thermal drift in the spectrometer 1300 may occur, for example, due to heat excitation raising the temperature of the detector 1310 during operation. The heat source can be the environmental conditions or heat generated internally in the spectrometer 1300 during operation. By using a wideband light source 1302 to direct input light 1304 to the light modulator 1306 and applying a normal actuation signal 1330 to the light modulator 1306 to produce modulated light 1308 based on the input light 1304, a PSD can be generated by the processor 1316 from the detector output 1312 versus wavelength. For example, in the case of FT-IR, the light modulator 1306 may be an interferometer and the detector output may be the interferogram signal versus the interferometer mirror motion (OPD). By applying FFT, the PSD may be obtained. An analog-to-digital converter (ADC) may be used to digitize the detector output.

The processor 1316 can extract the cut-off wavelength 1318 from the PSD curve and feed the cut-off wavelength 1318 to the memory 1320. Based on the stored relation between the temperature and the cut-off wavelength, which can be a simple linear relation as mentioned before, the processor 1316 can extract the temperature 1322 and feed the temperature 1322 to the correction matrix 1324 stored in the memory 1320. Based on the temperature 1322, the processor 1316 can select the set of correction parameters 1326 from the correction matrix 1324 (e.g., from a look-up table), which is fed back to the processor 1316. The processor 1316 can then use the previously obtained PSD and the set of correction parameters 1326 to obtain a new PSD 1328 that is corrected from the temperature drift.

Figure 14:
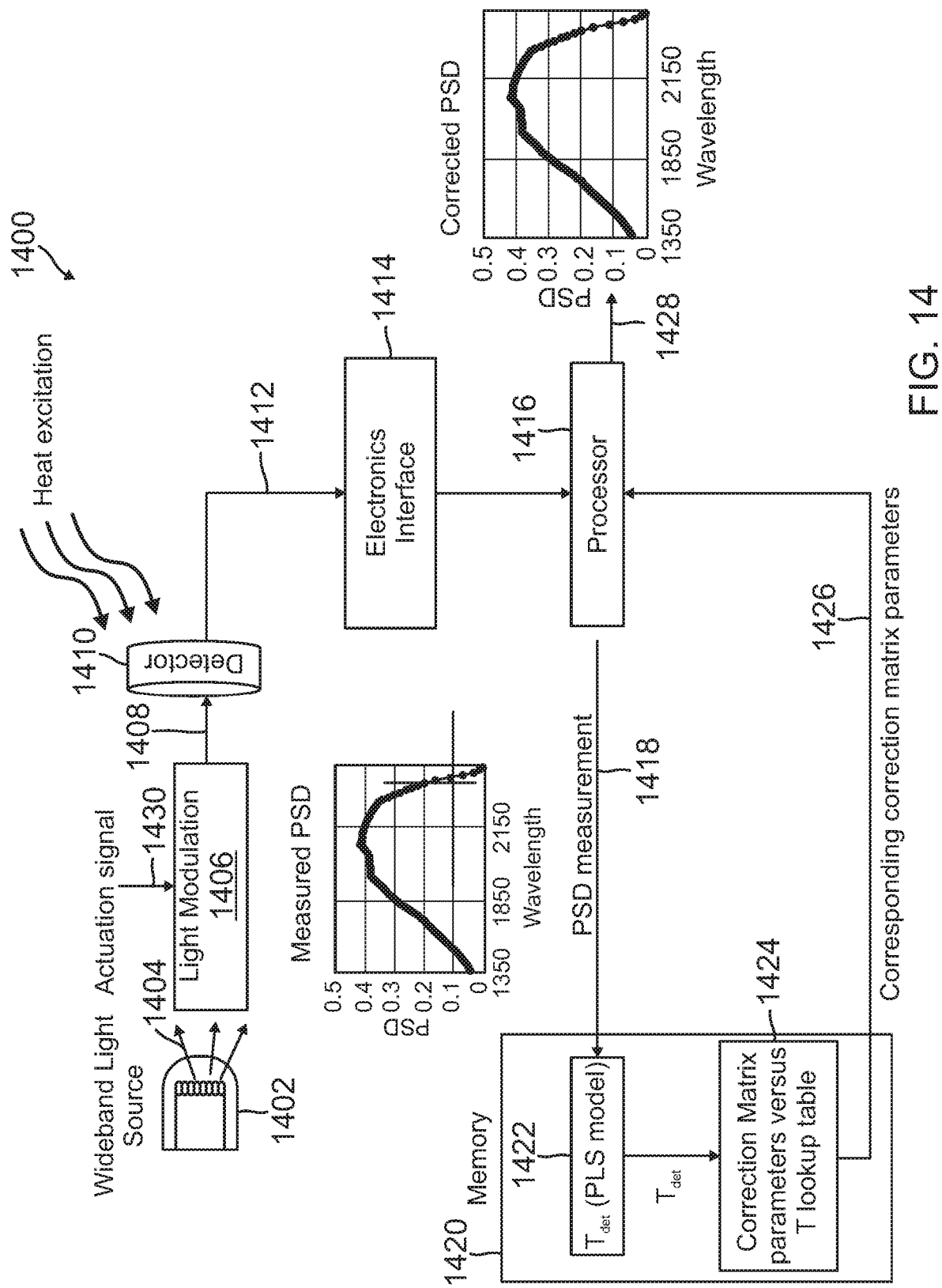
FIG. 14 is a diagram illustrating another spectrometer employing the detector as a temperature sensor to be used for the correction of thermal drift according to some aspects.

FIG. 14 is a diagram illustrating another spectrometer 1400 employing the detector as a temperature sensor to be used for the correction of thermal drift according to some aspects. The spectrometer 1400 includes a light source 1402 (e.g., a wideband light source), a light modulator 1406, a detector 1410, an electronics interface 1414, a processor 1416 and a memory 1420. The light modulator 1406 may use a spectroscopic technique, including, but not limited to, direct absorption spectroscopy, indirect absorption spectroscopy, such as photo-acoustic spectroscopy, photo-thermal spectroscopy, or Raman spectroscopy. In some examples, the light modulator 1406 may include a diffraction element, a Michelson interferometer, a Fabry-Perot cavity, a spatial light modulator, or a birefringent device. For example, the light modulator may include a MEMS interference device. The detector 1410 may correspond to, for example, to a photodetector. The memory 1420 may further store a correction matrix 1424. The correction matrix 1424 may include a look up table of sets of correction parameters (e.g., correction functions) verses temperature (T).

Again, by using a wideband light source 1402 to direct input light 1404 to the light modulator 1406 and applying a normal actuation signal 1430 to the light modulator 1406 to produce modulated light 1408 based on the input light 1404, a PSD 1418 can be generated by the processor 1416 from the detector output 1412 versus wavelength. In the example shown in FIG. 14, the temperature can be extracted from PSD measurement 1418 with the aid of a PLS method or other similar method. By generating a model that correlates temperature values with the measured PSDs of a specific sample, the temperature 1422 can be calculated from any PSD 1418 for the same sample without the need for calculating the detector-cut-off wavelength. Based on the temperature 1422, the processor 1416 can select the set of correction parameters 1426 from the correction matrix 1424 (e.g., from a look-up table), which is fed back to the processor 1416. The processor 1416 can then use the previously obtained PSD and the set of correction parameters 1426 to obtain a new PSD 1428 that is corrected from the temperature drift.

FTIR spectrometers may include a temperature sensor to monitor the temperature of the spectrometer and shut it down if the temperature exceeds a specified value. Temperature sensor readings can be also used to extract the temperature of one of the spectrometer components, where:

$$T_{spectrometer} = a * T_{sensor} + b \quad (12)$$

Other relations of higher orders or different functions can be used as well. In most of the cases, the relation is found to be approximately linear, while the y-axis crossing point, the b parameter, may change from one spectrometer unit another spectrometer unit depending on the offset calibration (or bias) of the temperature sensor used. In some cases, the gain/slope parameter a may also change from one spectrometer to another. Therefore, the change in temperature T can be extracted from the temperature sensor reading directly, while the absolute value may not be needed, and thus changes in the parameter b may not be significant. For example, the change in detector temperature $\Delta T_{det}$ can be calculated from the change in the sensor temperature reading $a\Delta T_{sensor}$.

Figure 15:
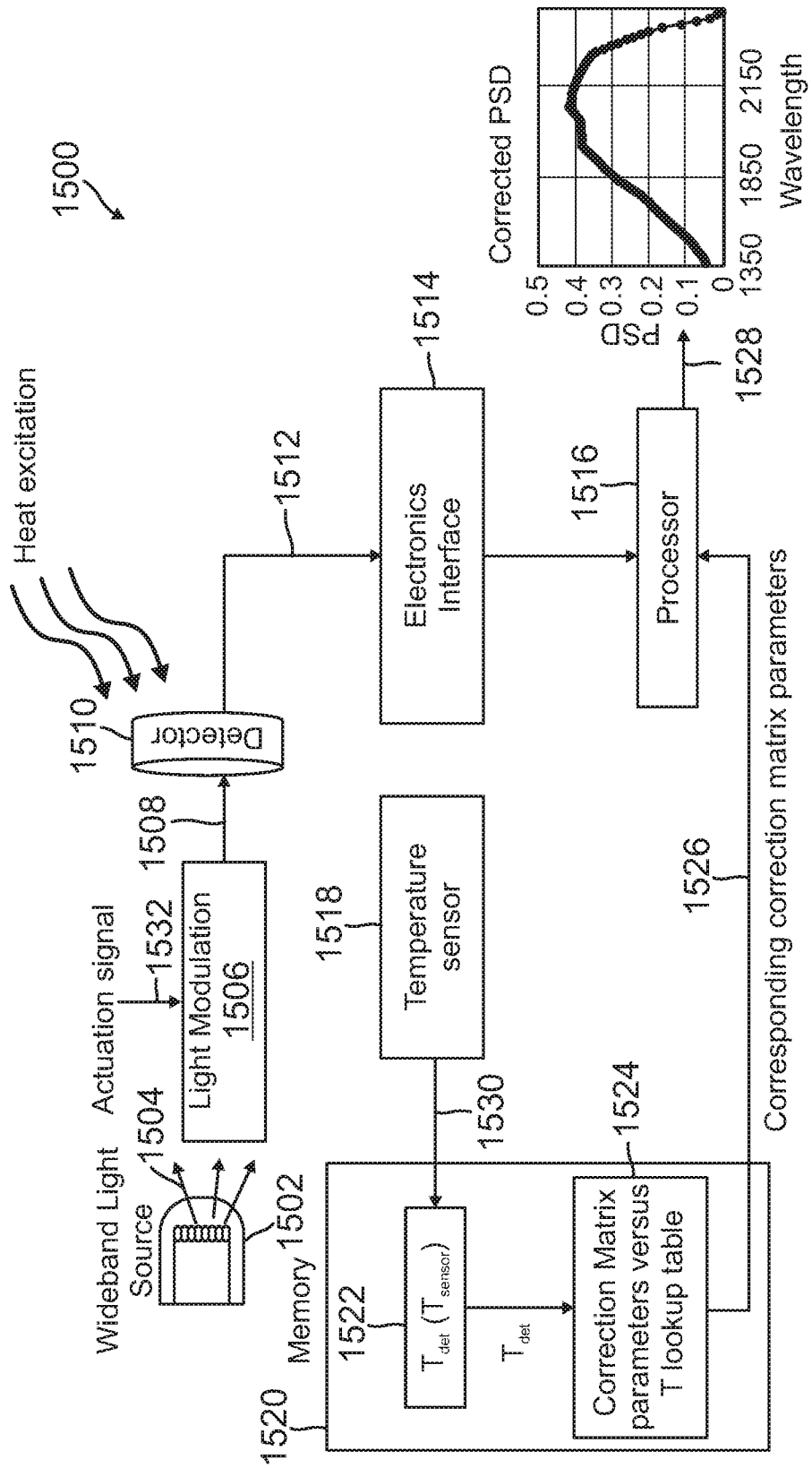
FIG. 15 is a diagram illustrating an example of a spectrometer employing a dedicated temperature sensor to be used for the correction of thermal drift according to some aspects.

FIG. 15 is a diagram illustrating an example of a spectrometer 1500 employing a dedicated temperature sensor to be used for the correction of thermal drift according to some aspects. The spectrometer 1500 includes a light source 1502 (e.g., a wideband light source), a light modulator 1506, a detector 1510, an electronics interface 1514, a processor 1516 and a memory 1520. The light modulator 1506 may use a spectroscopic technique, including, but not limited to, direct absorption spectroscopy, indirect absorption spectroscopy, such as photo-acoustic spectroscopy, photo-thermal spectroscopy, or Raman spectroscopy. In some examples, the light modulator 1506 may include a diffraction element, a Michelson interferometer, a Fabry-Perot cavity, a spatial light modulator, or a birefringent device. For example, the light modulator may include a MEMS interference device. The detector 1510 may correspond to, for example, to a photodetector. The memory 1520 may further store a correction matrix 1524. The correction matrix 1524 may include a look up table of sets of correction parameters (e.g., correction functions) verses temperature (T).

By using a wideband light source 1502 to direct input light 1504 to the light modulator 1506 and applying a normal actuation signal 1532 to the light modulator 1506 to produce modulated light 1508 based on the input light 1504, a PSD can be generated by the processor 1516 from the detector output 1512 versus wavelength. In the example shown in FIG. 15, a temperature sensor 1518 is configured to measure a temperature value 1530 (e.g., change in temperature value) of the detector 1510 (or other component of the spectrometer 1500). The measured temperature value 1530 ($T_{sensor}$) may be fed to the memory 1520. Based on the stored relation between the temperature sensor value ($T_{sensor}$) and the detector temperature ($T_{det}$), as mentioned before, the processor 1516 can extract the detector temperature 1522 and feed the detector temperature 1522 to the correction matrix 1524 stored in the memory 1520. Based on the detector temperature 1522, the processor 1516 can select the set of correction parameters 1526 from the correction matrix 1524 (e.g., from a look-up table), which is fed back to the processor 1516. The processor 1516 can then use the previously obtained PSD and the set of correction parameters 1526 to obtain a new PSD 1528 that is corrected from the temperature drift.

In some examples, calibration of the temperature sensor 1518 can be carried out by a few measurements to enable the electronics and spectrometer to heat up, while monitoring the temperature of the spectrometer 1500 using a calibrated temperature sensor (not shown) and comparing it to the reading of the temperature sensor 1518.

In some examples, the temperature sensor 1518 may be a thermistor or a thermocouple to measure the spectrometer temperature. However, these type of temperature sensors typically utilize a specific electronic interface that consumes power and needs a hosting package that consumes area too. Therefore, this configuration may be costly, but does provide the flexibility to choose the location of the temperature sensor in the optimal location minimizing the error between the actual temperature of the component of interest and the predicted temperature from the sensor reading.

Figure 16:
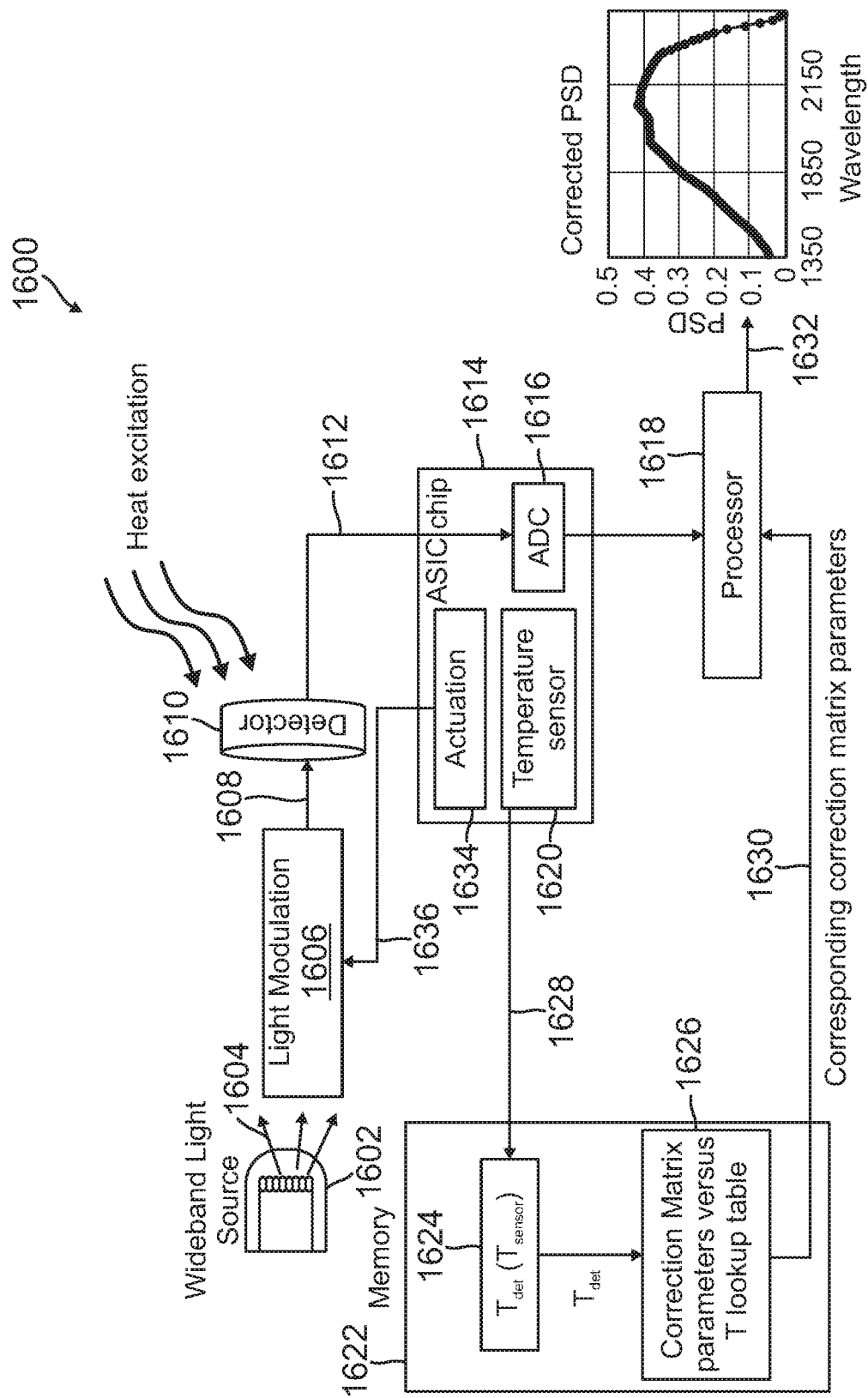
FIG. 16 is a diagram illustrating another example of a spectrometer employing a dedicated temperature sensor to be used for the correction of thermal drift according to some aspects.

FIG. 16 is a diagram illustrating another example of a spectrometer 1600 employing a dedicated temperature sensor to be used for the correction of thermal drift according to some aspects. The spectrometer 1600 includes a light source 1602 (e.g., a wideband light source), a light modulator 1606, a detector 1610, an electronics interface 1614 (e.g., an ASIC chip), a processor 1618, and a memory 1622. The light modulator 1606 may use a spectroscopic technique, including, but not limited to, direct absorption spectroscopy, indirect absorption spectroscopy, such as photo-acoustic spectroscopy, photo-thermal spectroscopy, or Raman spectroscopy. In some examples, the light modulator 1606 may include a diffraction element, a Michelson interferometer, a Fabry-Perot cavity, a spatial light modulator, or a birefringent device. For example, the light modulator may include a MEMS interference device. The detector 1610 may correspond to, for example, to a photodetector. The memory 1622 may further store a correction matrix 1626. The correction matrix 1626 may include a look up table of sets of correction parameters (e.g., correction functions) verses temperature (T).

By using a wideband light source 1602 to direct input light 1604 to the light modulator 1606 and applying a normal actuation signal 1636 to the light modulator 1606 from actuation circuitry 1634 within the electronics interface 1614 to produce modulated light 1608 based on the input light 1604, a PSD can be generated by the processor 1618 from the detector output 1612 versus wavelength. In the example shown in FIG. 16, a temperature sensor 1620 configured to measure a temperature value 1628 (e.g., change in temperature value) of the spectrometer 1600 is not a separate chip, but rather a sensor that is embedded in the electronics interface 1614. Here, the electronics interface 1614 is a central chip including an ADC 1616 for converting the output 1612 of the detector 1610 to a digital signal for input to the processor 1618 and the actuation circuitry 1634. In other examples, the temperature sensor 1620 may be embedded in a processing unit chip including the processor 1618 or a separate chip providing the actuation signal 1636.

The measured temperature value 1628 ($T_{sensor}$) may be fed to the memory 1622. Based on the stored relation between the temperature sensor value ($T_{sensor}$) and the detector temperature ($T_{det}$), as mentioned before, the processor 1618 can extract the detector temperature 1624 and feed the detector temperature 1624 to the correction matrix 1626 stored in the memory 1622. Based on the detector temperature 1624, the processor 1618 can select the set of correction parameters 1630 from the correction matrix 1626 (e.g., from a look-up table), which is fed back to the processor 1618. The processor 1618 can then use the previously obtained PSD and the set of correction parameters 1630 to obtain a new PSD 1632 that is corrected from the temperature drift.

Figure 17:
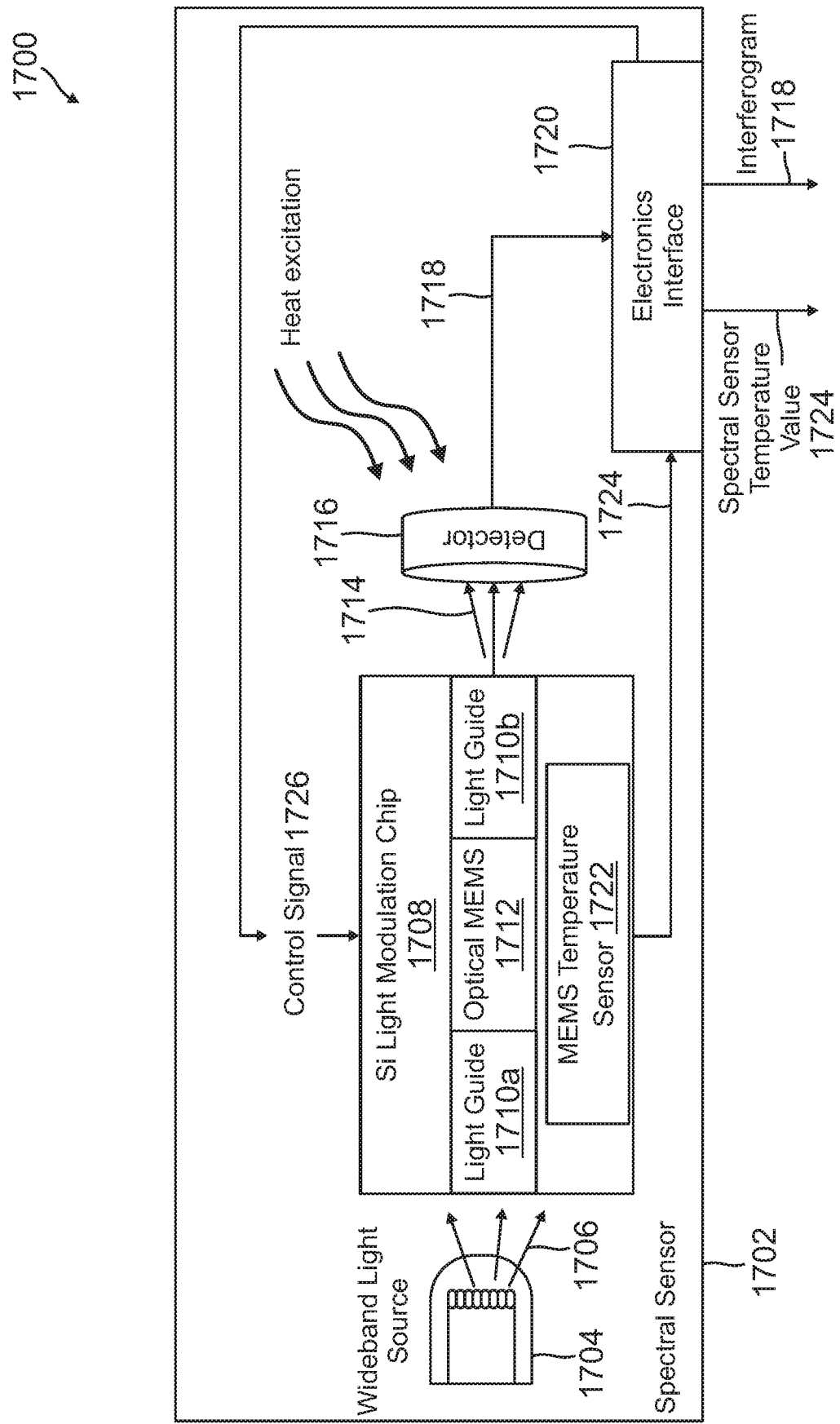
FIG. 17 is a diagram illustrating another example of a spectrometer employing a dedicated temperature sensor to be used for the correction of thermal drift according to some aspects.

FIG. 17 is a diagram illustrating another example of a spectrometer 1700 employing a dedicated temperature sensor to be used for the correction of thermal drift according to some aspects. The spectrometer 1700 includes a spectral sensor 1702 including a light source 1704 (e.g., a wideband light source), a light modulator 1708 (e.g., a silicon (Si) light modulation chip), a detector 1716 and an electronics interface 1720. In the example shown in FIG. 17, the light modulator 1708 includes an optical MEMS device 1712 (e.g., an FT-IR MEMS-based interferometer) and light guides (e.g., optical fibers) 1710a and 1710b for guiding input light 1706 from the light source 1704 into the optical MEMS device 1712 and guiding modulated light 1714 (e.g., interference beams over time with OPDs therebetween) from the optical MEMS device 1712 to the detector 1716. The light modulator 1708 may further be actuated by a control signal 1726 (e.g., actuation signal) supplied by the electronics interface 1720. The detector 1716 may correspond to, for example, to a photodetector. The output 1718 of the detector 1716 (e.g., an interferogram) may be provided to the electronics interface 1720, which may provide the interferogram 1718 (e.g., a digital signal representing the interferogram) to a processor (not shown).

In the example shown in FIG. 17, a temperature sensor 1722 configured to measure a temperature value 1724 (e.g., change in temperature value) of the spectrometer 1700 is fabricated on the light modulation chip 1708. For example, the temperature sensor 1722 may be a piezoresistive temperature sensor fabricated on the same MEMS chip used in the light modulation element. The piezoresistive temperature sensor 1722 can be made of a double-layer cantilever beam, where each layer has a different thermal expansion coefficient. When the temperature changes, the cantilever beam will bend up or down based on the sign of the temperature change. This bending will cause strain. Hence, by placing a piezoresistive element at the maximum strain position near the fixed end of the cantilever, the resistance of the piezoresistive element will change and, hence, the temperature can be measured. The piezoresistive element can be made on the crystalline silicon of the silicon wafer of the light modulation chip 1708 using, for example, ion implantation of p-type impurities. In some examples, four piezoresistive elements can be used to form a Wheatstone bridge for better resistance change sensing. By placing the temperature sensor 1722 on the light modulation chip 1708, the resulting temperature value 1722 reflects the actual temperature value of the light modulator 1708. In addition, fabrication of a piezoresistive temperature sensor is compatible with light modulation element fabrication, as it requires a few simple surface micromachining steps.

Each photodetector has a shunt resistance. Shunt resistance decreases with temperature increase. If this resistance is calculated and calibrated with temperature values, it can be used to calculate the temperature. However, it may not be practical to measure the shunt resistance of the detector while being in operation. It is also known that the thermal noise of the detector is proportional to shunt resistance.

Therefore, calculating the noise level can be used as a calibration for shunt resistance, and hence, a calibration for temperature. In order to calculate the root mean square (RMS) noise level, and consequently extracting the corresponding temperature, a dark measurement is obtained by the photodetector.

FIGS. 18A and 18B are diagrams illustrating another example of of a spectrometer 1800 employing the detector as a temperature sensor to be used for the correction of thermal drift according to some aspects. The spectrometer 1800 includes a light source 1806 (e.g., a wideband light source), a light modulator 1808, a detector 1810, an electronics interface 1822, and a DSP Unit 1826 (e.g., a processor).

As shown in FIG. 18A, the relation between dark measurements and temperature may be calibrated using a temperature sensor 1830 embedded in or coupled to the spectrometer 1800. For each dark measurement 1812 (e.g., without illumination by the light source 1806) obtained by the spectrometer 1800, a temperature reading 1814 is obtained by the temperature sensor 1830. Based on the dark measurement, the RMS noise level may be calculated (e.g., by the processor/DSP unit 1826) and both the RMS noise level and corresponding temperature reading may be stored in a matrix 1816. The matrix 1816 may then be fed into a regression module 1818 to extract the relation 1820 between the RMS noise level and temperature. The relation 1820 may be stored, for example, within a memory of the spectrometer 1800 to be used during on-line compensation of illuminated spectral measurements.

For example, as shown in FIG. 18B, a spectral sensor 1802 including a light modulation module 1832 including, for example, at least the light modulator 1808 and the detector 1810, may be configured to obtain a dark interferogram 1812 that is provided by the electronics interface 1822 to the DSP unit 1826. The dark interferogram 1812 may be obtained, for example, immediately prior to obtaining an illuminated interferogram 1824 of a sample under test. Based on the stored relation 1820 between the RMS noise level of the dark interferogram 1812 and the temperature, as mentioned before, the DSP unit 1826 can extract the temperature 1814 and feed the temperature 1814 to a correction matrix (not shown) to select a set of correction parameters therefrom. The DSP unit 1826 can then use the illuminated interferogram 1824 (e.g., the PSD obtained from the illuminated interferogram) and the set of correction parameters to obtain a new PSD 1828 that is corrected from the temperature drift.

In some examples, the application of the set of correction parameters (e.g., a correction signal) may include three steps. The first step includes measuring the spectrometer temperature using any of the aforementioned mechanisms. In the second step, the temperature value can be delivered as a feedback to tailor the correction matrix that corresponds to the spectrometer temperature. In the third step, the tailored correction matrix is applied to the original PSD to produce the corrected PSD.

For example, the stored correction matrix can be retrieved for any temperature measurement and the temperature drift can then be calculated at all wavelengths for the measured temperature. The thermal drift is additive in absorbance and multiplicative in reflection, transmission and PSD domains. Therefore, the correction can be applied on the PSD itself, and then transformed into the needed response to save processing time. In an example, the correction can be done according to the following equation:

$$PSDc_{orrected} = PSD_{orginal}/((S_{dpa} * \Delta T)) \tag{13}$$

where $S_{apa}$ is the spectrum of drift per degree Celsius.

Figure 19:
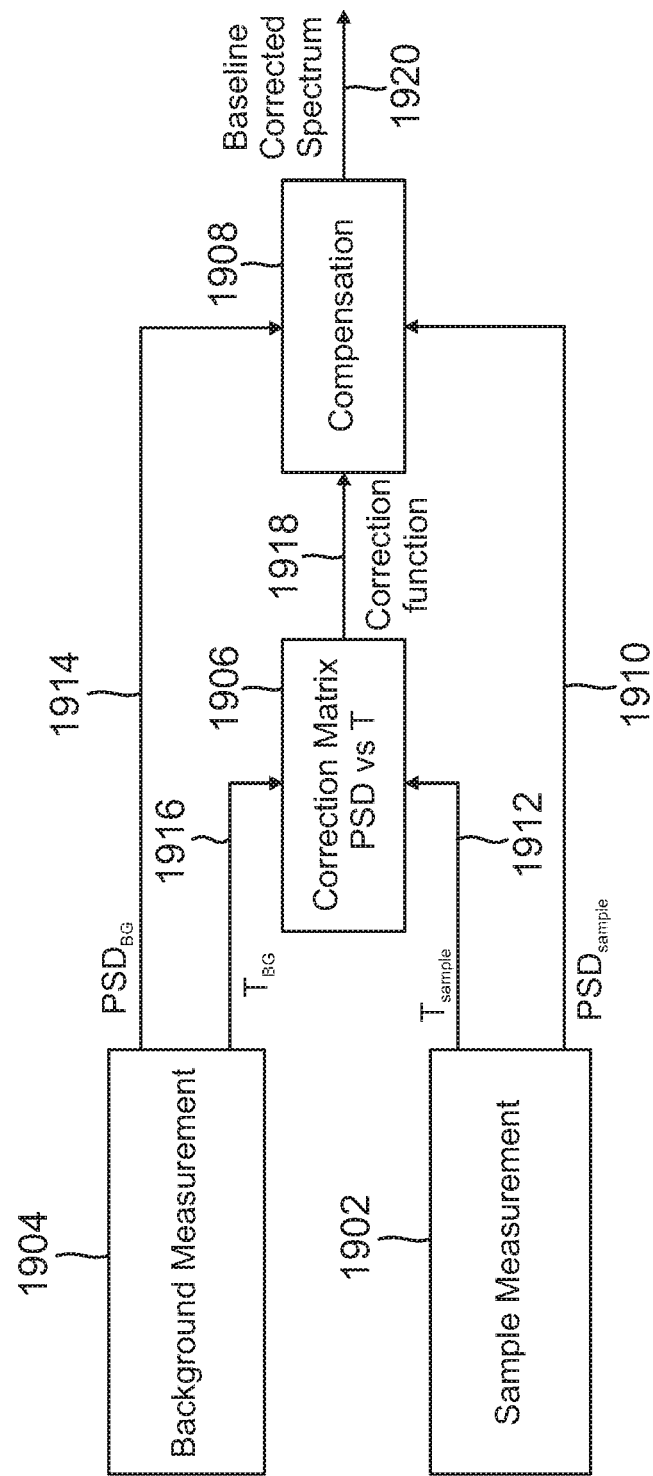
FIG. 19 is a diagram illustrating a thermal drift correction process using a third order polynomial fitting according to some aspects.
Figure 20:
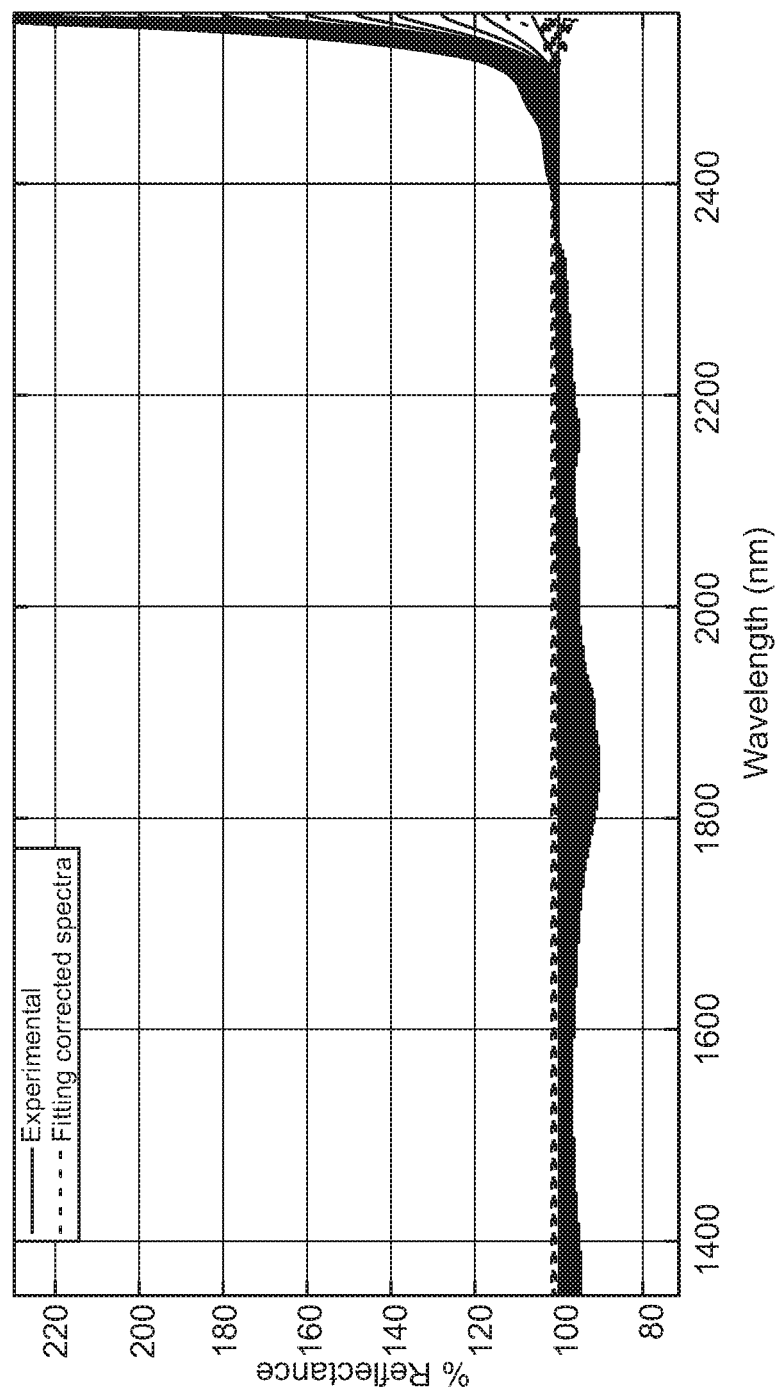
FIG. 20 is a graph illustrating an original response corresponding to the thermal drift taken from a background measurement along with a corrected response according to some aspects.

FIG. 19 is a diagram illustrating a thermal drift correction process using a third order polynomial fitting according to some aspects. In the example shown in FIG. 19, a background measurement 1904 may be taken at, for example, T=25° C. The temperature value $T_{BG}$ 1916 (e.g., T=25° C.) of the background measurement 1904 can be fed into the correction matrix 1906, along with a temperature value 1912 of a sample measurement 1902. Based on the temperature values 1912 and 1916, a set of correction parameters (e.g., a correction function) 1918 may be provided to a compensation unit 1908 (e.g., a processor) configured to correct for the thermal drift in the sample measurement 1902 based on the correction function 1918 and the background measurement 1904. As shown in FIG. 20, an original response (Experimental) corresponding to the thermal drift taken from a background measurement 1904 using a background temperature $T_{BG}$ of 10° C. is illustrated along with a corrected response (Fitting corrected spectra). The corrected response repeated on approximately 100 different spectrometer units showed a flat spectrum with no second order drifts and even the first order drifts were decreased down to 1/10 in all tested units.

Figure 21:
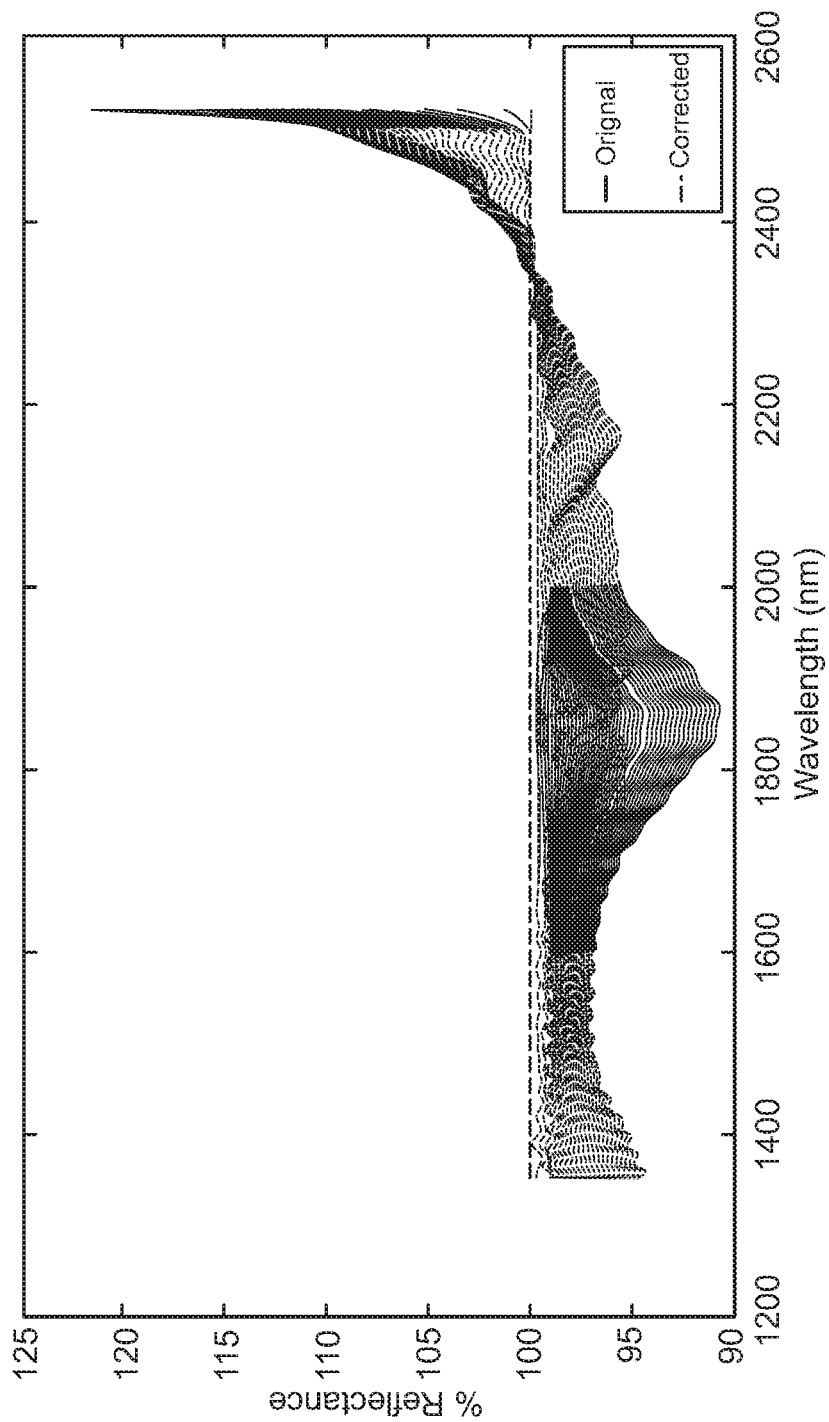
FIG. 21 is another graph illustrating an original response corresponding to the thermal drift taken from a background measurement along with a corrected response according to some aspects.

Referring now to FIG. 21, in some examples, the stored correction matrix can be retrieved and tailored for correction according to the following equation:

$$PSD_{corrected}(\lambda) = PSD_{orginal}(\lambda) / ((S_{dpa}(\lambda - \lambda_{sh1}) * \Delta T) * (a) * \Delta T^b) \quad (14)$$

where a and b are equal to fitting parameters that can be set to unity if not needed. However, they can be used as a tuning factor for better correction to account for the variations from spectrometer unit to spectrometer unit. As the drift as a function of temperature may change from unit to unit, thus, a and b can be used to account for a nonlinear temperature-drift relation. Moreover, the position of the dip changes across units, but it can be determined using a few measurements, then a shift ($\lambda_{sh1}$) in the position of the correction matrix can be performed to produce a global correction matrix. As can be seen in FIG. 21, tuning the value of a and b in the global correction matrix leads to a better correction performance. The global correction matrix was applied on 130 miniaturized near infrared (NIR) spectrometers and the dip drift decreased to less than 15% of its value in most of them.

Figure 22:
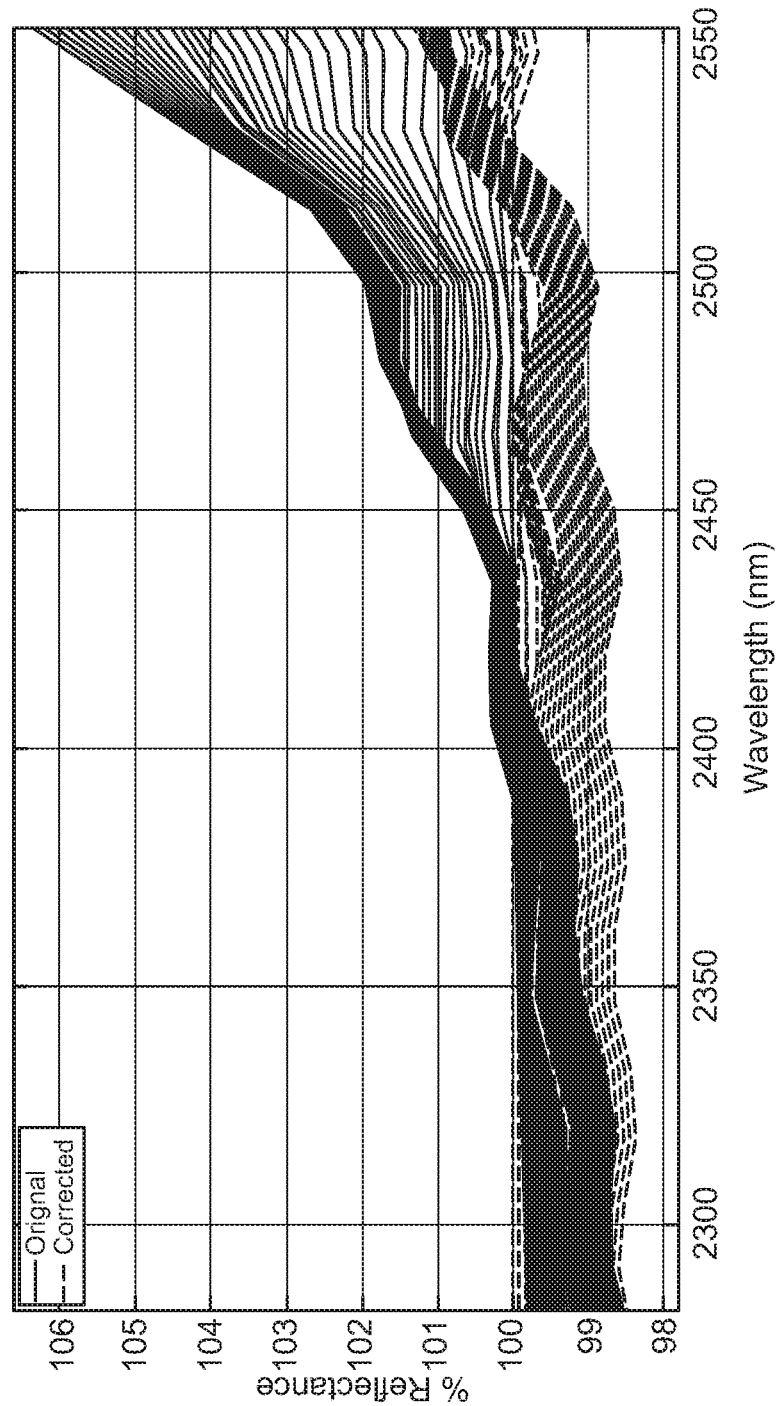
FIG. 22 is another graph illustrating an original response corresponding to the thermal drift taken from a background measurement along with a corrected response according to some aspects.

Referring now to FIG. 22, the detector cut-off shift feature is not linear through the temperature range. Therefore, the temperature range can be divided into regions and a piecewise correction function can be used to cover the whole temperature range and account for the change in detector cut-off shift feature in each region. The correction function can be retrieved according to the temperature value measured by one of the aforementioned mechanisms. For example, temperatures from 20 degrees to 25 degrees can have a specific correction function. Then, correction can be applied according to the following equation:

$$PSD_{corrected}(\lambda) = PSD_{orginal}(\lambda) / (S_{apa}(\lambda - \lambda_{sh2}) * (a) * \Delta T^b) \quad (15)$$

A shift ($\lambda_{sh2}$) in the position of the correction matrix is needed as in the case of dip correction. Moreover, a and b may be used to improve correction, as in the case of dip correction. This correction was applied on 102 units and cut-off drift decreased to less than 15% of its value in most of the miniaturized spectrometers.

Figure 23:
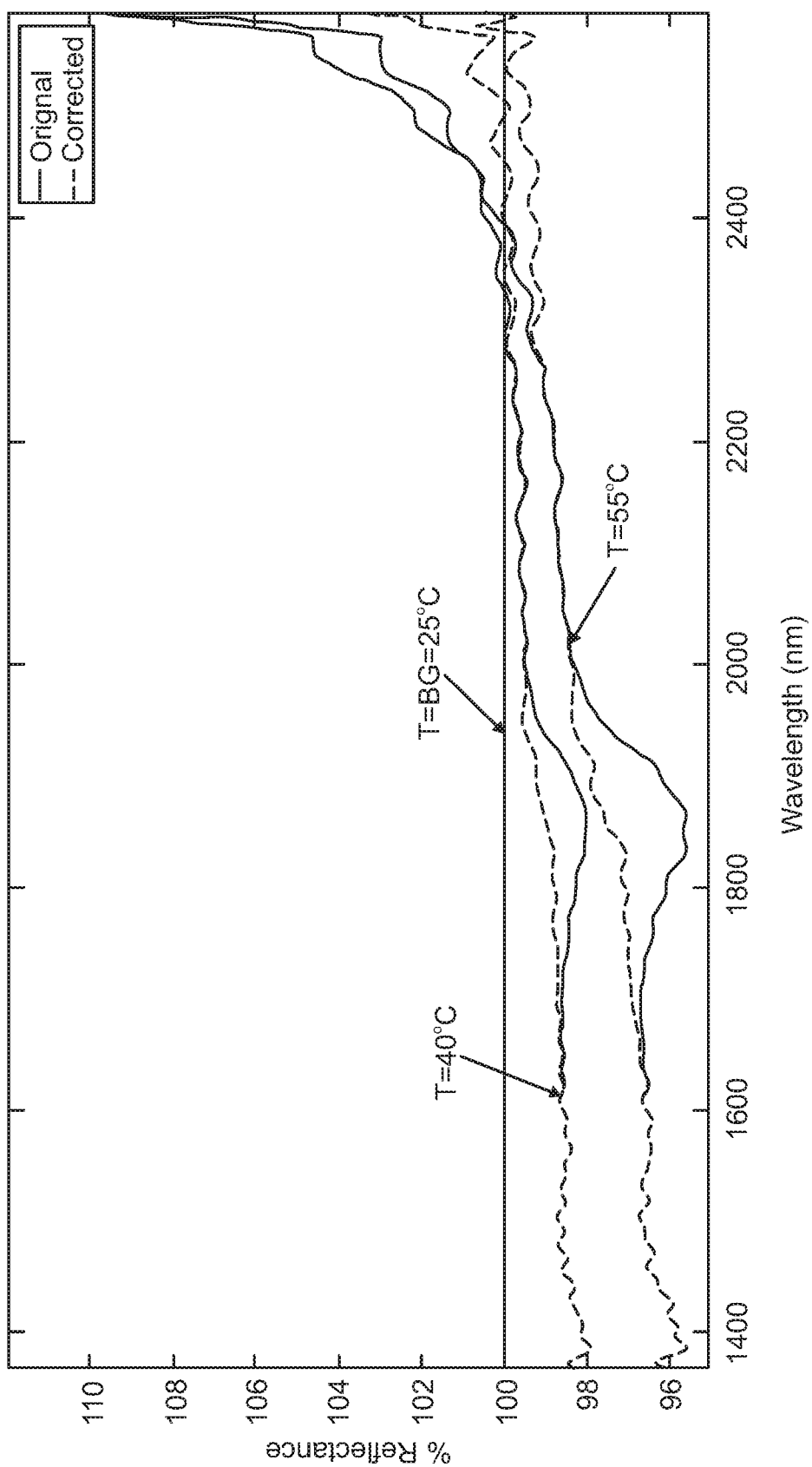
FIG. 23 is a graph illustrating a combination of the two-decomposition corrections shown in FIGS. 21 and 22 at two different values of temperature change according to some aspects.

FIG. 23 is a graph illustrating a combination of the two-decomposition corrections shown in FIGS. 21 and 22 at two different values of $\Delta T$. As can be seen in FIG. 23, the higher order drifts were corrected and the only remaining drift component is a first order baseline drift that can be removed by simple pre-processing before chemometrics analysis.

Background measurements may enable the instrumental response to be removed, thus allowing only the sample response to be measured. Background measurements typically have approximately the same instrumental response as the sample measurements, though as discussed herein, the instrumental response may also change with environmental conditions. In some examples, a background measurement may be taken every certain period of time, e.g., one hour. However, some applications require using the same background measurement for a longer period of time. Hence, a generalized background measurement may be acquired by measuring all the instrumental response drift causes, making models for them and compensating these drifts to restore the same instrumental response of the background measurement.

The main conditions contributing to instrumental response change include, as discussed above, temperature variations, humidity variations, light source efficiency and optical misalignment. For example, humidity can cause some absorption features and photometric errors. Optical misalignment can cause baseline drifts especially in the shorter wavelengths. In some examples, models (e.g., correction matrices) for these other conditions can be generated in the same way used for temperature drift compensation discussed above.

Figure 24:
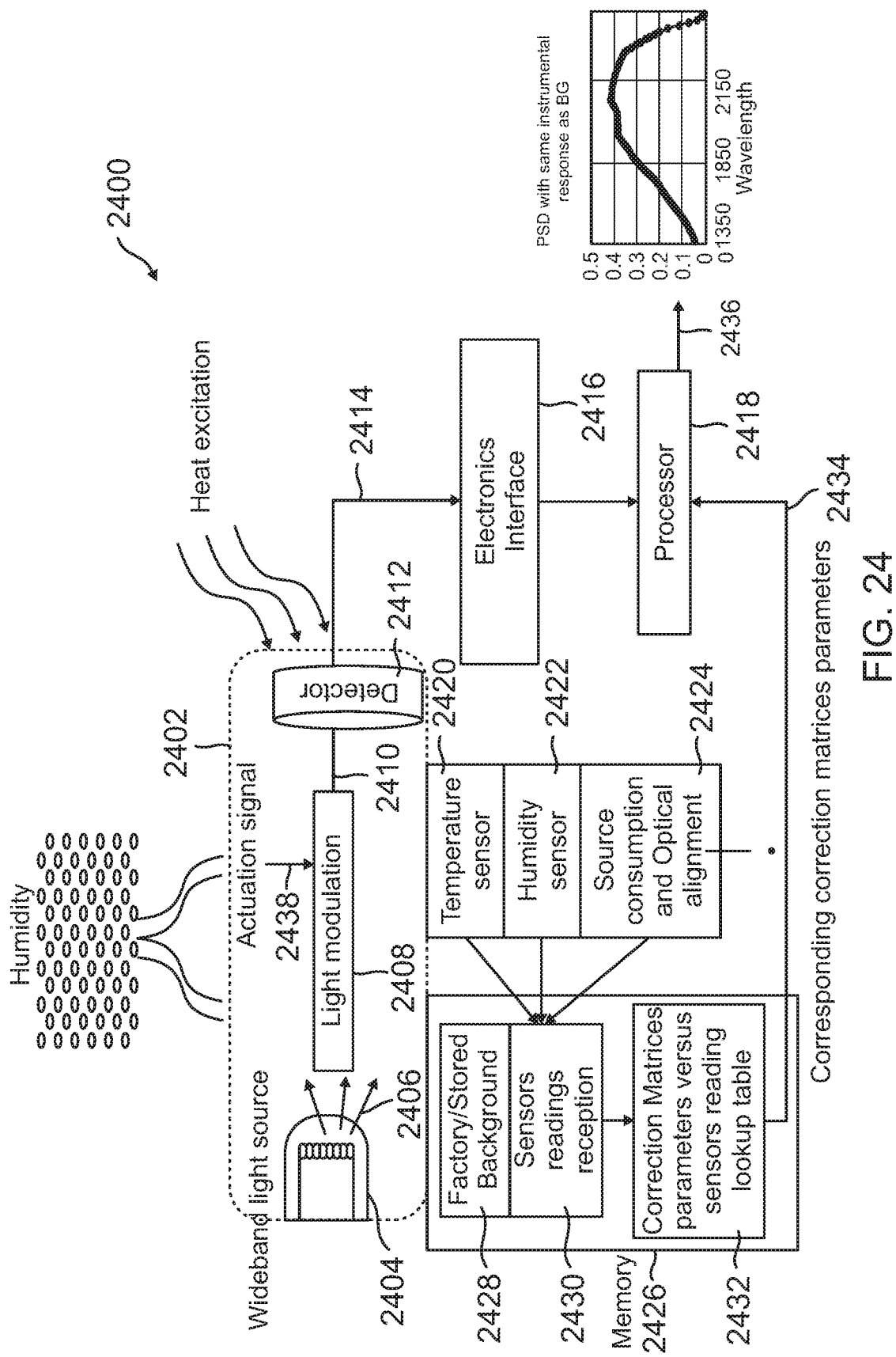
FIG. 24 is a diagram illustrating an example of a spectrometer including a plurality of sensors according to some aspects.

FIG. 24 is a diagram illustrating an example of a spectrometer 2400 including a plurality of sensors according to some aspects. The spectrometer 2400 includes a spectral sensor 2402, an electronics interface 2416, a processor 2418, a plurality of sensors 2420, 2422, and 2424, and a memory 2426. The plurality of sensors include different sensors 2420, 2422, and 2424 for temperature, humidity, and source consumption and optical alignment (e.g., light source efficiency and misalignment), respectively. The memory 2426 may store a correction matrix 2432 including, for example, a lookup table of correction parameters mapped to sensor readings. In addition, the memory 2426 may further store a factory-saved background measurement 2428 of a stored background measurement. In some examples, the stored background measurement 2428 may be modified to include current variations with respect to stored background conditions.

The spectral sensor 2402 includes a light source 2404 (e.g., a wideband light source), a light modulator 2408, and a detector 2412. The light source 2404 may be configured to direct input light 2406 to the light modulator 2408. The light modulator 2408 may then produce modulated light 2410 (e.g., interference beams over time with OPDs therebetween) based on the input light 2406 and may further direct the modulated light 2410 to the detector 2412. The light modulator 2408 may further be actuated by an actuation signal 2438 provided by an electronics interface 2416. The detector 2412 may correspond to, for example, to a photodetector. The output 2414 of the detector 2412 (e.g., an interferogram) may be provided to the electronics interface 2416, which may provide the interferogram 2414 (e.g., a digital signal representing the interferogram) to the processor 2418.

The processor 2418 may process the output 244 of the detector 2412 to produce a sample spectrum (e.g., a PSD) of a sample under test (not shown). For example, the processor 2418 may transform the interferogram 2414 provided by the detector 2412 to a PSD using a Fast Fourier transform (FFT). The processor 2418 may further be configured to correct the sample spectrum based on instrumental response drifts in the spectral sensor 2402 and the factory stored background 2428 to produce a corrected spectrum (e.g., corrected optical PSD) 2436. For example, one or more of the sensors 2420, 2422, and/or 2424 may obtain a respective sensor reading (e.g., value), which may be fed to a sensor readings reception algorithm 2430 in the memory 2426. The processor 2418 may be configured to execute the sensor readings reception algorithm 2430 to feed the sensor reading(s) to the correction matrix 2432 stored in the memory 2426. Based on the sensor reading(s), the processor 2418 can select the set(s) of correction parameters 2434 from the correction matrix 2432 (e.g., from a look-up table), which is fed back to the processor 2418. The processor 2418 can then use the previously obtained PSD, the factory-saved background measurement 2428, and the set(s) of correction parameters 2434 to obtain a new PSD 2436 that is corrected from the instrumental drift(s).

Creating the correction matrix involves not only the total measured intensity at the detector output, but also the power spectral density (PSD), at each wavelength. Since the drift may change from spectrometer unit to spectrometer unit, a unique correction matrix can be created for each unit. The correction matrix can be calculated by measuring the instrumental response while sweeping across temperature. The responses can then be stored and processed to obtain a correction function (e.g., indicated by the correction matrix) that relates the thermal drift of the PSD at different wavelengths across temperatures.

Figure 25:
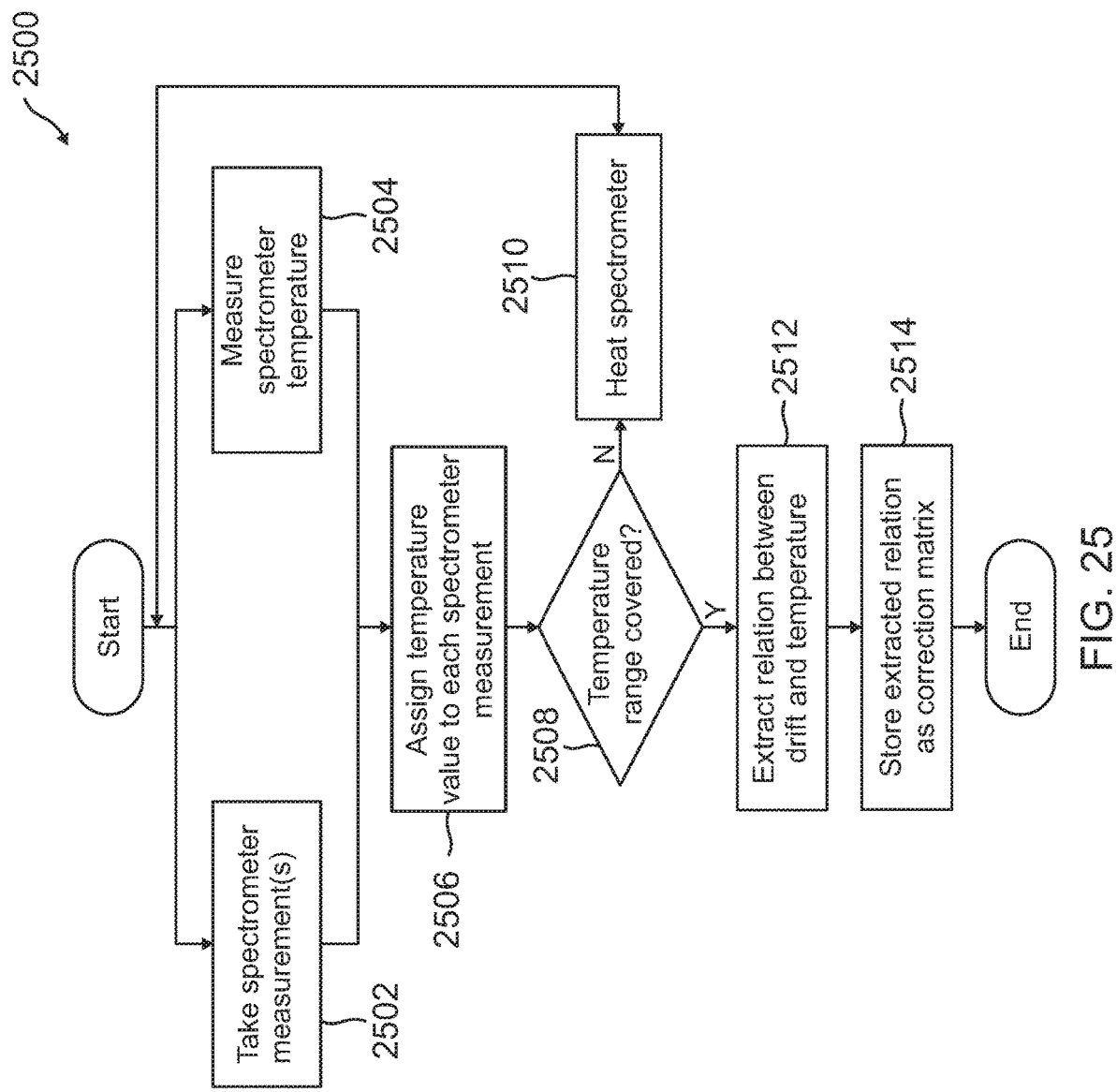
FIG. 25 is a flow chart illustrating a process for generating a correction matrix for on-line compensation of temperature drifts according to some aspects.

FIG. 25 is a flow chart illustrating a process for generating a correction matrix for on-line compensation of temperature drifts according to some aspects. As described below, some or all illustrated features may be omitted in a particular implementation within the scope of the present disclosure, and some illustrated features may not be required for implementation of all examples. In some examples, the process may be performed by a processor, processing unit, or processing system of a spectrometer, or by any suitable means for carrying out the described functions.

At block 2502, the processor may take a spectrometer measurement (e.g., a PSD) of a sample. In addition, at block 2504, the spectrometer temperature may be measured (e.g., by a dedicated temperature sensor within the spectrometer). At block 2506, the temperature value may be assigned to the spectrometer measurement.

At block 2508, the processor may determine whether the temperature range of interest is covered. If the temperature range of interest has not been covered (N branch of block 2508), at block 2510, the spectrometer may be heated and the process repeated to assign a respective temperature value across the range of interest to each spectrometer measurement. Once the temperature range of interest has been covered (Y branch of block 2508), at block 2512, the processor may extract the relation between drift and temperature, and at block 2514, store the extracted relation as the correction matrix.

Figure 26:
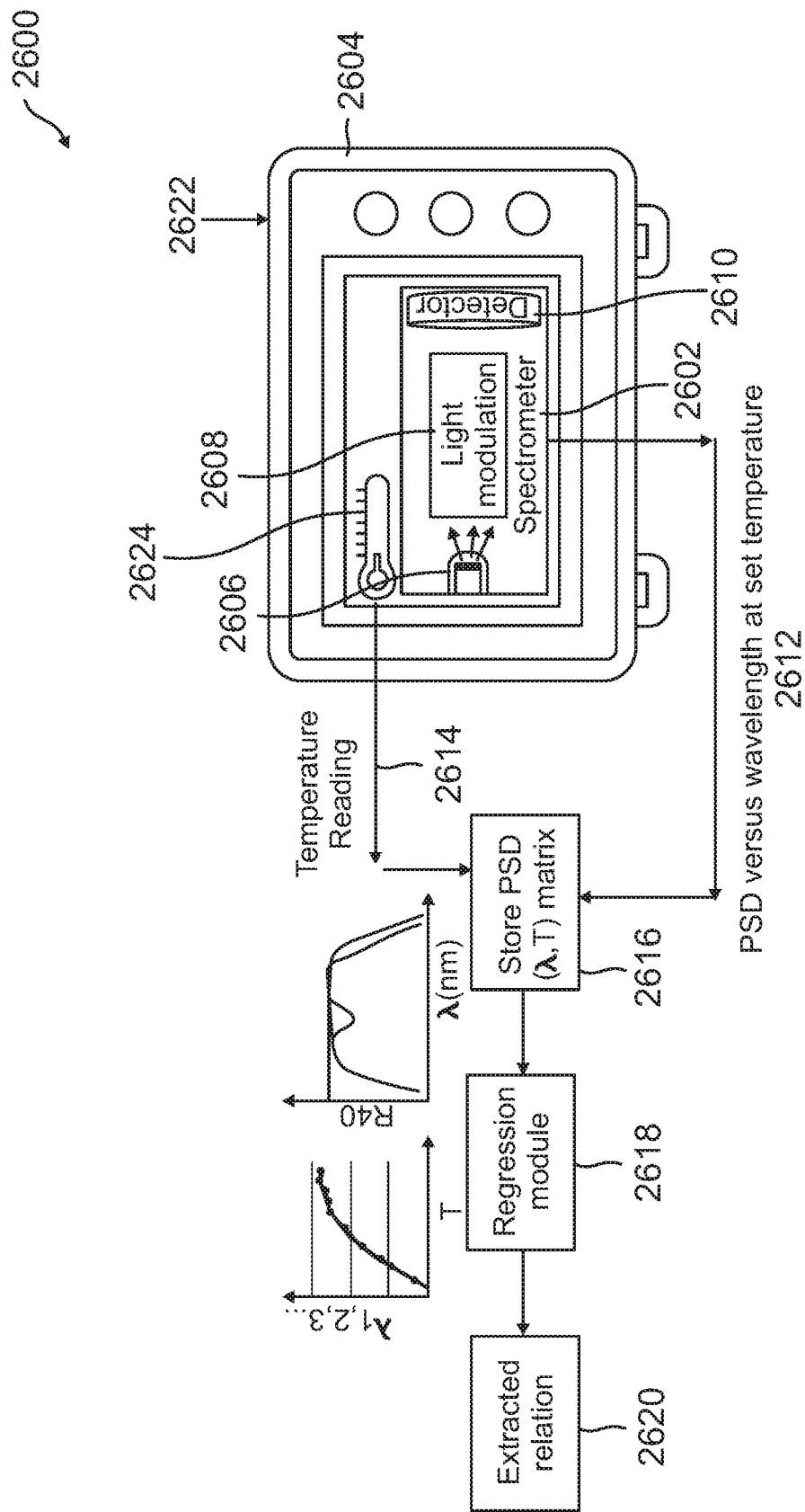
FIG. 26 is a diagram illustrating an example of a system configured to sweep the temperature of a spectrometer to generate a correction matrix according to some aspects.

Sweeping of the temperature to generate the correction matrix can be performed in different ways. FIG. 26 is a diagram illustrating an example of a system 2600 configured to sweep the temperature of a spectrometer 2602 to generate a correction matrix according to some aspects. In the example shown in FIG. 26, the spectrometer 2602 includes a light source 2606, a light modulator 2608, and a detector 2610. The spectrometer 2602 may be inserted into an oven or a temperature chamber 2604 having a controller 2622 configured to control the spectrometer temperature by controlling the chamber temperature. A temperature sensor 2624 in the chamber 2604 (or the spectrometer 2602), the former being illustrated, may be configured to measure a temperature (e.g., obtain a temperature reading 2614) of the chamber 2604/spectrometer 2602 for each spectrometer measurement 2612 (e.g., PSD verses wavelength at that temperature). Both the spectrometer measurement 2612 and the corresponding temperature reading 2614 may be stored in a matrix 2616. To cover all possible temperature conditions, the matrix 2616 may then be fed into a regression module 2618 to extract the relation 2620 between the spectrometer measurement 2612 and temperature 2614. The relation 2620 may be stored, for example, as the correction matrix within a memory of the spectrometer 2602 to be used during on-line compensation.

Figure 27:
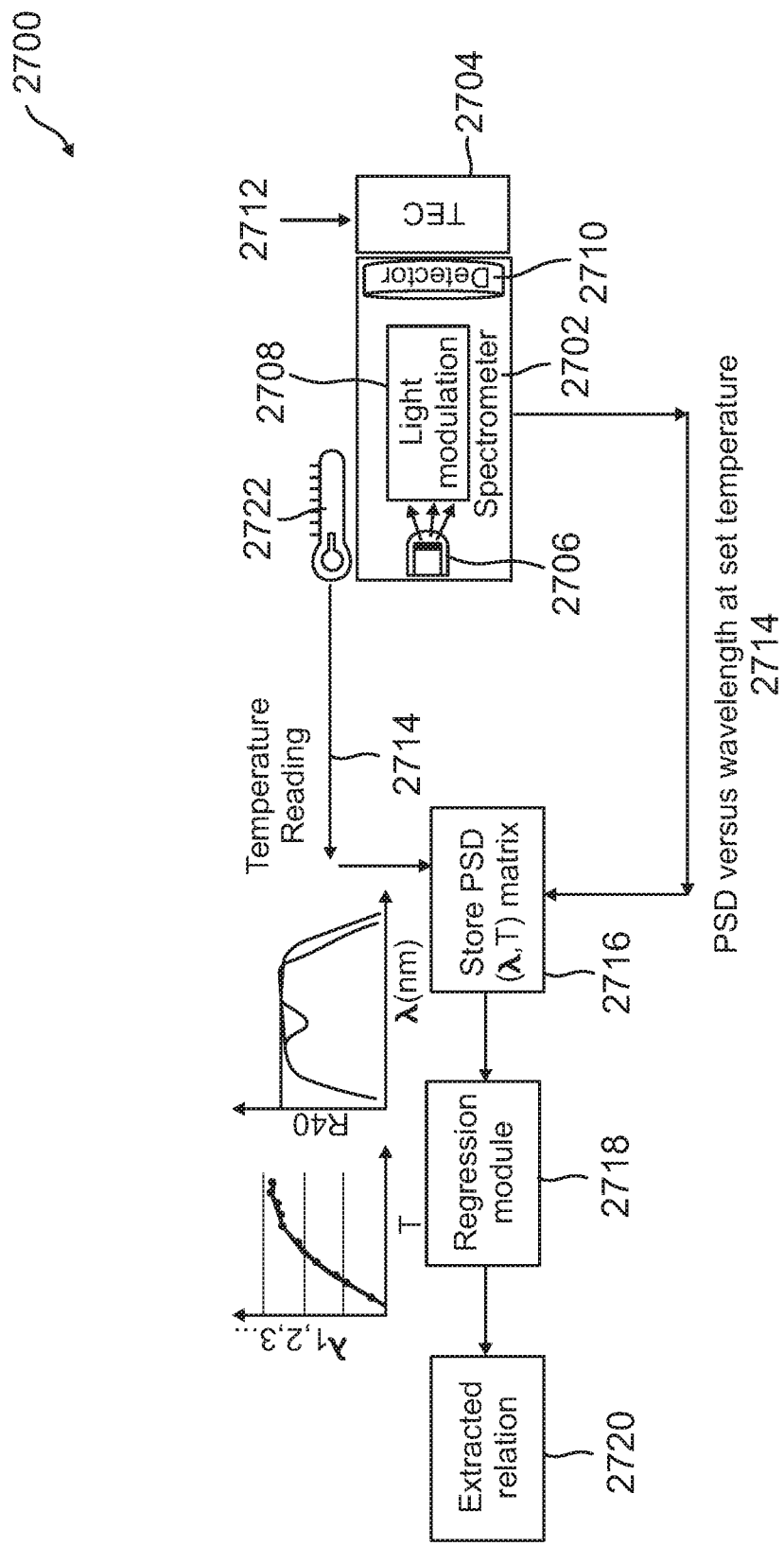
FIG. 27 is a diagram illustrating another example of a system configured to sweep the temperature of a spectrometer to generate a correction matrix according to some aspects.

FIG. 27 is a diagram illustrating another example of a system 2700 configured to sweep the temperature of a spectrometer 2702 to generate a correction matrix according to some aspects. In the example shown in FIG. 27, the spectrometer 2702 includes a light source 2706, a light modulator 2708, and a detector 2710. Instead of inserting the spectrometer 2702 into an oven or a temperature chamber, as shown in FIG. 26, in the example shown in FIG. 27, a Peltier element in a thermos-electric cooler or heater (TEC) 2704 may be attached to the detector 2710 or placed in close proximity thereto. A temperature sensor 2722 attached to or embedded in the spectrometer 2702, the former being illustrated, may be configured to measure a temperature (e.g., obtain a temperature reading 2714) of the spectrometer 2702 for each spectrometer measurement 2712 (e.g., PSD verses wavelength at that temperature). Both the spectrometer measurement 2712 and the corresponding temperature reading 2714 may be stored in a matrix 2716. To cover all possible temperature conditions, the matrix 2716 may then be fed into a regression module 2718 to extract the relation 2720 between the spectrometer measurement 2712 and temperature 2714. The relation 2720 may be stored, for example, as the correction matrix within a memory of the spectrometer 2702 to be used during on-line compensation.

Figure 28A:
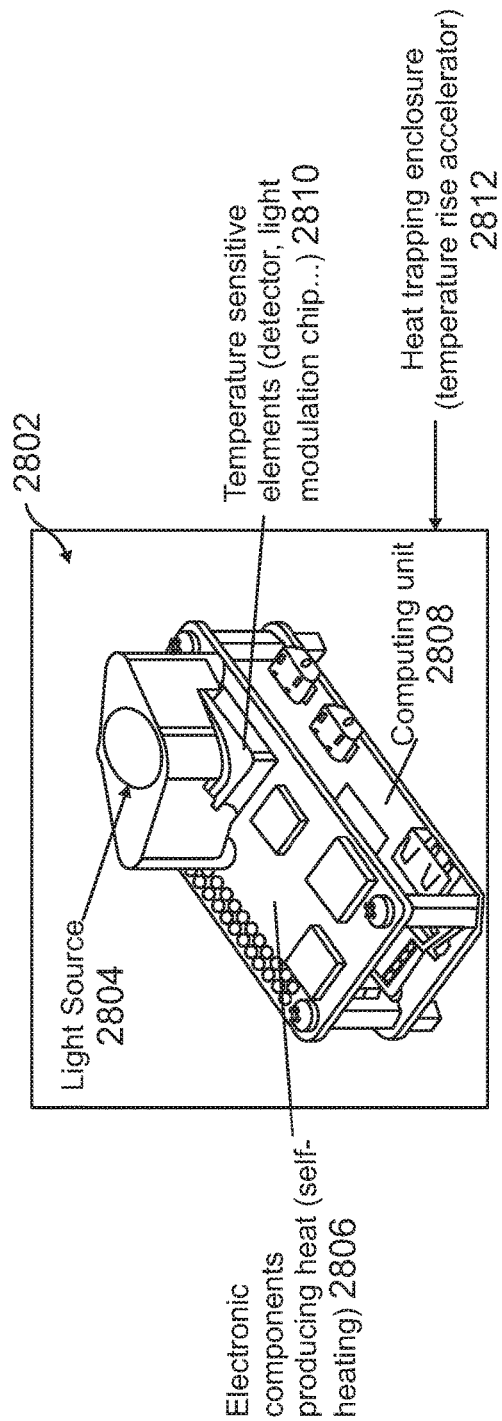
FIGS. 28A and 28B are diagrams illustrating another example of a system configured to sweep the temperature of a spectrometer to generate a correction matrix according to some aspects.
Figure 28B:
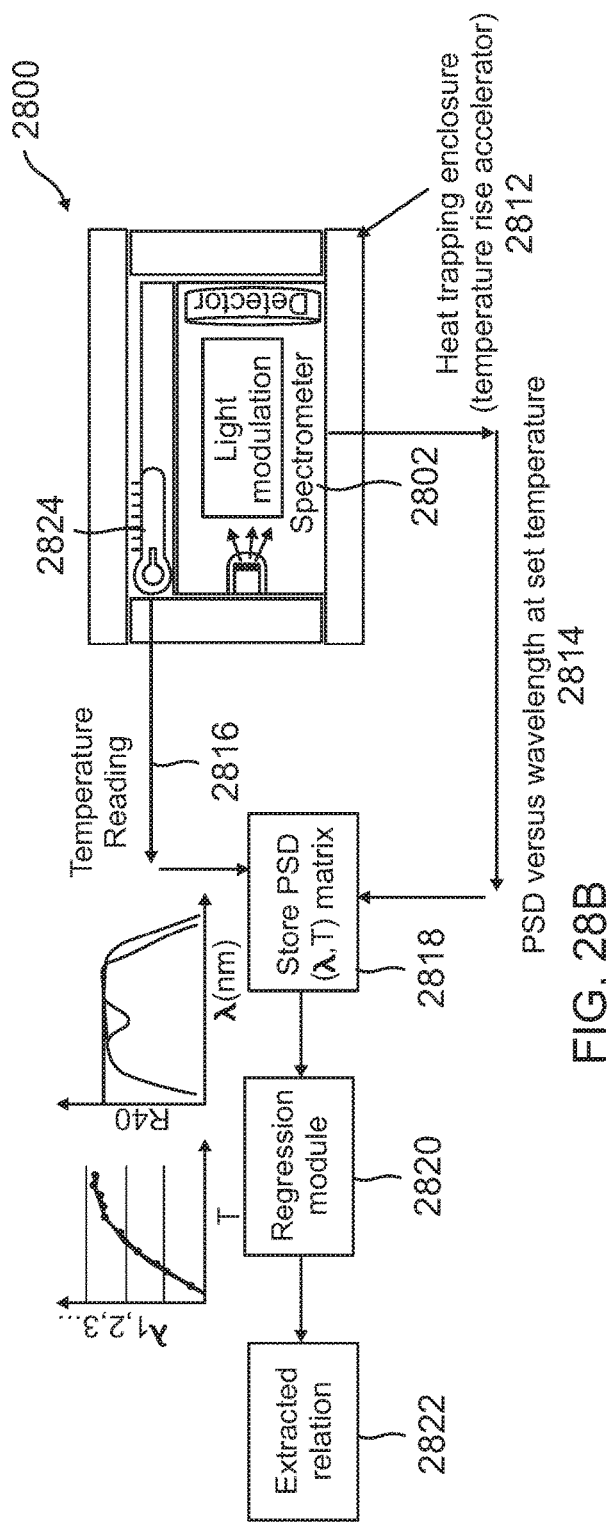

FIGS. 28A and 28B are diagrams illustrating another example of a system 2800 configured to sweep the temperature of a spectrometer 2802 to generate a correction matrix according to some aspects. In the example shown in FIGS. 28A and 28B, the heat energy emerging from electronics (e.g., electronic components 2806 producing heat) and a light source 2804 in the spectrometer 2802 can be exploited to raise the temperature of temperature sensitive elements 2810 in the spectrometer 2802, such as the photodetector or the light modulation/MEMS chip. Heating can further be accelerated by using a thermally insulating enclosure 2812 to prevent heat from escaping outside the spectrometer 2802.

A temperature sensor 2824 within the enclosure 2812 and/or attached to or embedded in the spectrometer 2802 may be configured to measure a temperature (e.g., obtain a temperature reading 2816) of the spectrometer 2802 for each spectrometer measurement 2814 (e.g., PSD verses wavelength at that temperature). Both the spectrometer measurement 2814 and the corresponding temperature reading 2816 may be stored in a matrix 2818. To cover all possible temperature conditions, the matrix 2818 may then be fed into a regression module 2820 to extract the relation 2822 between the spectrometer measurement 2814 and temperature 2816. The relation 2822 may be stored, for example, as the correction matrix within a memory of the spectrometer 2802 to be used during on-line compensation.

In some examples, the correction matrix can include coefficients of fitted functions that relate the PSD change of each wavelength/wavenumber point with temperature. These fitted functions can be polynomial, exponential, or others, depending on the thermal drift characteristics of the instrument.

Figure 29:
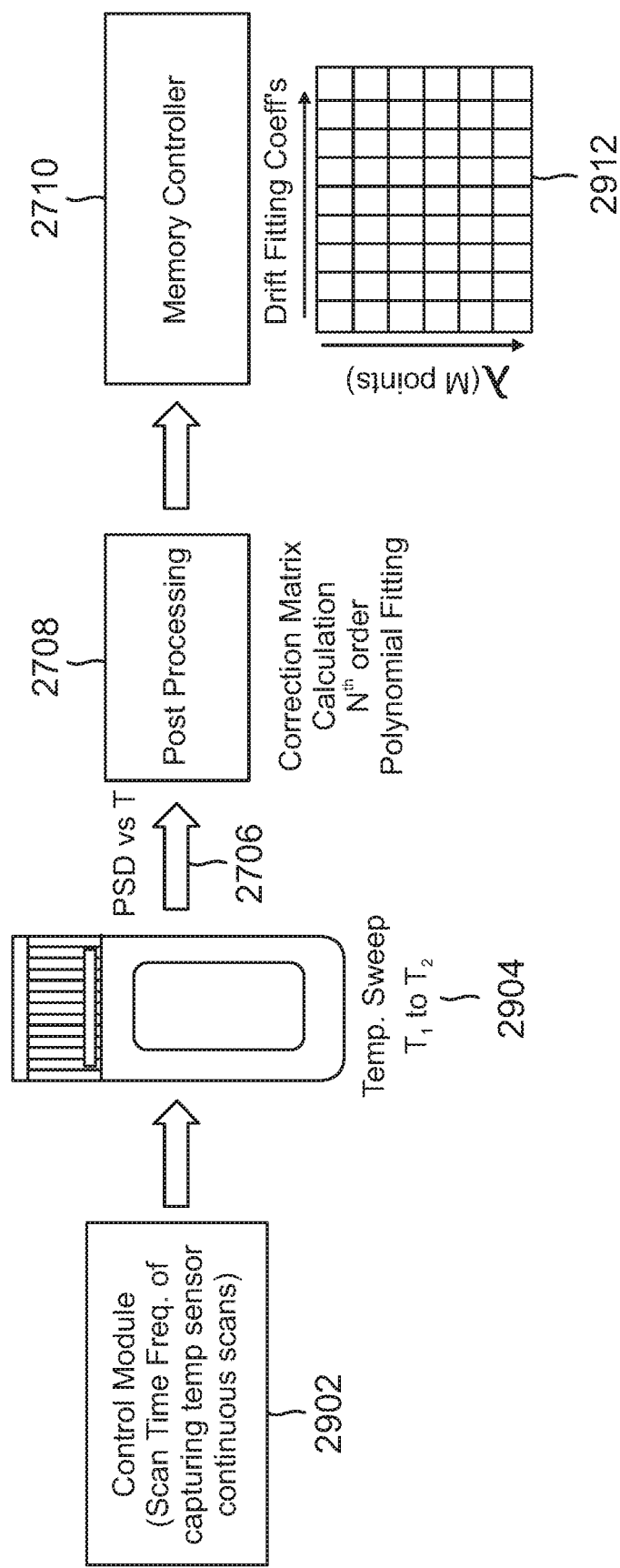
FIG. 29 is a diagram illustrating an example flow for generating the correction matrix including coefficients of fitted functions as the correction parameters, according to some aspects.

FIG. 29 is a diagram illustrating an example process flow for generating the correction matrix including coefficients of fitted functions as the correction parameters, according to some aspects. In the example shown in FIG. 29, a control module 2902 (e.g., a controller) may be configured to control a temperature sweep of a spectrometer 2904 (e.g., from T1 to T2). For example, the control module 2902 may be configured to control a scan time or frequency of capturing spectrometer measurements and corresponding temperature values. In some examples, the control module 2902 may be configured to perform continuous or periodic multiple scans of the spectrometer 2904. The spectrometer measurements (e.g., PSD) verses temperature (T) 2906 may be output by the spectrometer 2904 and provided to a post processing unit 2908 configured to calculate the correction matrix using an $N^{th}$ order polynomial fitting. The correction matrix 2912 may then be output by the post processing unit 2908 and stored in a memory (not shown) of the spectrometer 2904 by a memory controller 2910. For example, the correction matrix 2912 may include the drift fitting coefficients for each wavelength point as a function of temperature (e.g., based on a polynomial fitting relation).

Figure 30:
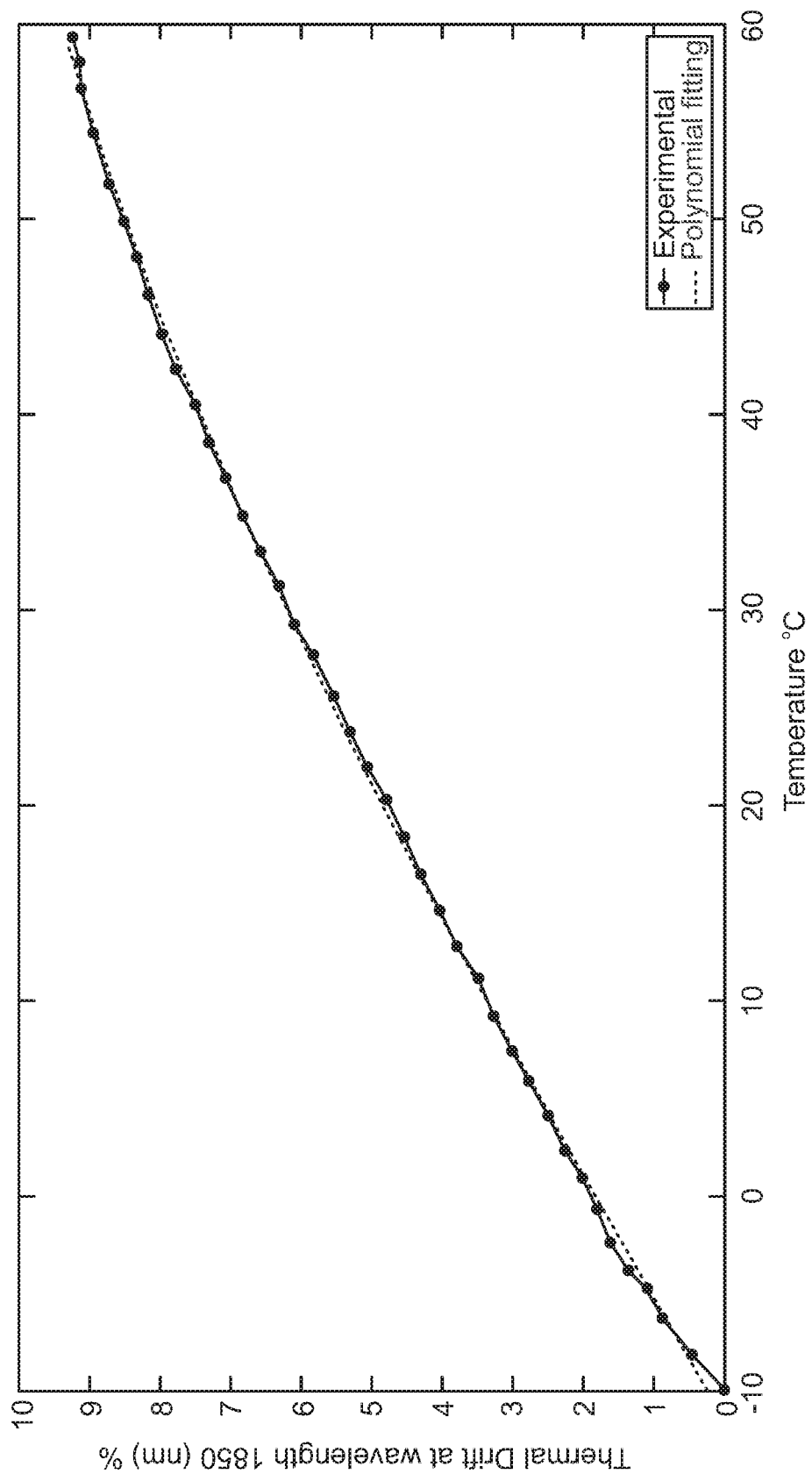
FIG. 30 is a graph illustrating an example of a third-order polynomial fitting for the thermal drift at the 1850 nm wavelength point of an NIR spectrometer according to some aspects.

FIG. 30 is a graph illustrating an example of a third-order polynomial fitting for the thermal drift at the 1850 nm wavelength point of an NIR spectrometer according to some aspects. In the example shown in FIG. 30, the minimum temperature of −10 degrees cis taken as a reference.

Although generating a unique correction matrix for each spectrometer unit may be accurate, this process may not be practical in some cases as it requires a relatively long testing time, which may slow down the production line of the spectrometer units. Therefore, in some examples a general (global) correction matrix can be calculated for the common or mean behaviour of the spectrometer units and production line testing of each spectrometer unit may focus on the variation between spectrometer units that can be extracted in a relatively short time. The general correction matrix and the features that vary from spectrometer unit to spectrometer unit may be extracted with a machine learning algorithm, which may use less extensive and less time-consuming testing to extract the non-common features that are unique to each unit.

Figure 31:
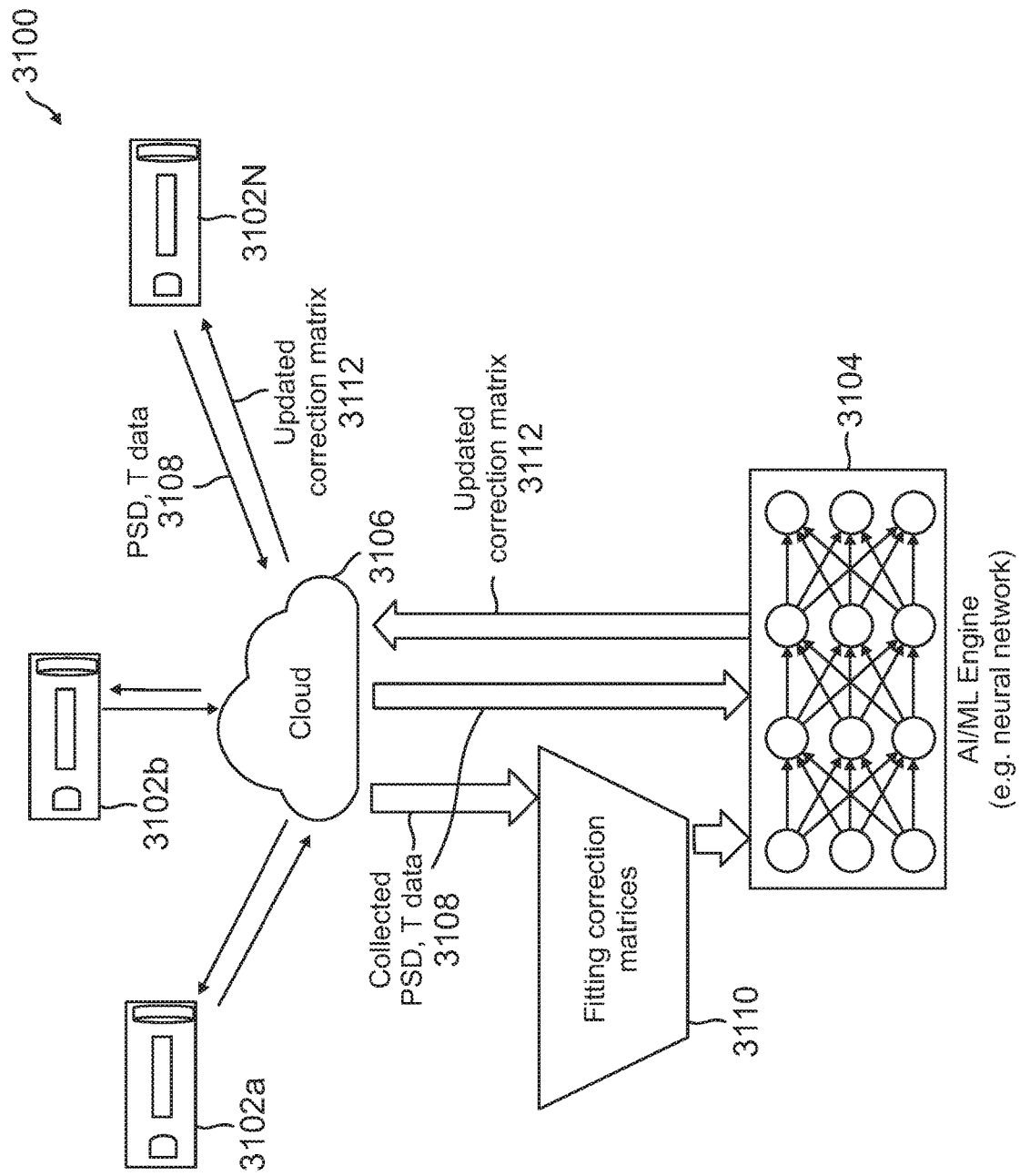
FIG. 31 is a diagram illustrating an example of a system configured to generate a global correction matrix according to some aspects.

FIG. 31 is a diagram illustrating an example of a system 3100 configured to generate a global correction matrix according to some aspects. In the example shown in FIG. 31, each of a plurality of spectrometer units 3102a, 3102b, . . . , 3102N may obtain spectrometer measurement/temperature data 3108 (e.g., PSD verses temperature) and transmit the spectrometer measurement/temperature data 3108 over a network (e.g., via cloud 3106) to an AI/ML engine 3104 (e.g., a neural network). The AI/ML engine 3104 may be configured to fit a respective correction matrix for each spectrometer unit 3102a, 3102b, . . . , 3102N to produce fitting correction matrices 3110 that may be used to build a ML model to produce a global correction matrix. The AI/ML engine 3104 can further be configured to modify the global correction matrix for each spectrometer unit 3102a, 3102b, . . . , 3102N using minimal spectrometer measurement/temperature data 3108 from each spectrometer unit 3102a, 3102b, . . . , 3102N to produce respective updated correction matrices 3112 for each spectrometer unit 3102a, 3102b, . . . , 3102N.

Figure 32:
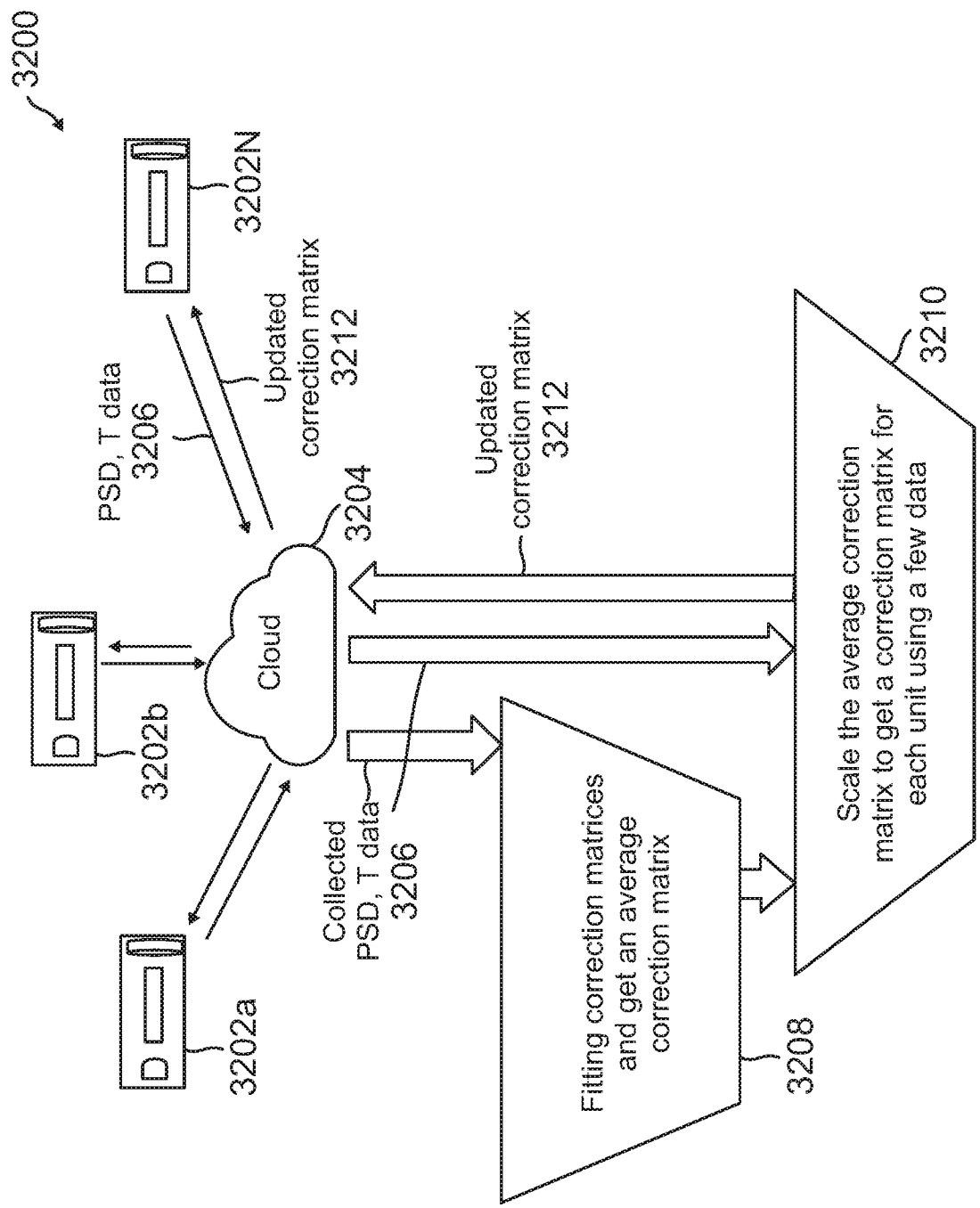
FIG. 32 is a diagram illustrating another example of a system configured to generate a global correction matrix according to some aspects.

FIG. 32 is a diagram illustrating another example of a system 3200 configured to generate a global correction matrix according to some aspects. In the example shown in FIG. 32, each of a plurality of spectrometer units 3202a, 3202b, . . . , 3202N may obtain spectrometer measurement/temperature data 3206 (e.g., PSD verses temperature) and transmit the spectrometer measurement/temperature data 3206 over a network (e.g., via cloud 3205) to an AI/ML engine (e.g., a neural network), represented by boxes 3208 and 3210. The AI/ML engine at box 3208 may be configured to fit a respective correction matrix for each spectrometer unit 3202a, 3202b, . . . , 3202N and produce an average correction matrix (e.g., a global correction matrix) based on the respective correction matrices. The AI/ML engine at box 3210 can further be configured to adaptively scale the average correction matrix using two spectrometer measurements at two different temperatures for each spectrometer unit 3202a, 3202b, . . . , 3202N and compare the drift at each wavelength point with the expected drift from the average correction matrix. Then, the ratio between the actual and expected drifts can be used to scale the average correction matrix to produce a respective updated correction matrix 3212 for each of the spectrometer units 3202a, 3202b, . . . 3202N. In some examples, an average correction matrix can be calculated for each production lot to account for the differences in drifts from lot to lot, hence, decreasing the error in correction. In some examples, this may decrease the testing time per unit as fewer measurements may be needed to spot the drift variations for each spectrometer unit.

The thermal drift of spectrometers includes different superimposed components. Some of these components are approximately constant for all units, for example the detector drift features, while others vary from one spectrometer to another, for example the MEMS drift features in miniaturized spectrometers. It is possible to decompose the drift components using wavelet transform, polynomial fitting, morphological weighted penalized least squares, adaptive iterative reweight penalized least squares, automatic iterative moving average, asymmetric least squares or any another decomposition method. The example below is based on an adaptive iteratively reweighted penalized least squares (AirPLS) algorithm.

The PLS algorithm has a roughness term:

$$R = \sum_{i=2}^{m}(z_i - z_{i-1})^2 \quad (16)$$

In addition, the PLS algorithm has a fidelity term:

$$F = \sum_{i=1}^{m} w_i(x_i - z_i)^2 \quad (17)$$

where x is the vector of the measured spectrum, z is the fitted vector, and w is the fidelity weight. A balanced combination of fidelity and roughness is given by Q=F+IR, where l is a user defined parameter that controls the roughness of the fitted curve. Taking a partial derivative of Q with respect to z and setting the derivative to zero gets (W+l D'D)$_z$=Wx. A traditional PLS algorithm solves the last equation to get the fitted curve z and by changing/it can be used as a smoothing method. However, if W can be tuned to detect the maximas and prevent the fitted curve from following them, PLS can be used as a baseline extraction method. Although many methods exist to detect the optimal W automatically for each curve, AirPLS is the simplest and most effective in that AirPLS uses an iterative algorithm to adaptively change the value of W in the following equation:

$$Q^t = \sum_{i=1}^{m} w_i^t |x_i - z_i^t| + l \sum_{j=2}^{m} |z_j^t - z_{j-1}^t|^2 \qquad (18)$$

where W is defined according to the following iteration equation:

$$w_i^t = \begin{cases} 0 & x_i \geq z_i^{t-1} \\ e^{\frac{t(x_i - z_i^{t-1})}{|d^t|}} & x_i < z_i^{t-1} \end{cases} \qquad (19)$$

Using an AirPLS method, a correction matrix for only the high order global features can be built. After applying this correction matrix and removing the global features, only a linear baseline drift may be left in the response. Linear baseline drift can be easily corrected using any simple pre-processing before chemometrics analysis of the spectral data.

Figure 33:
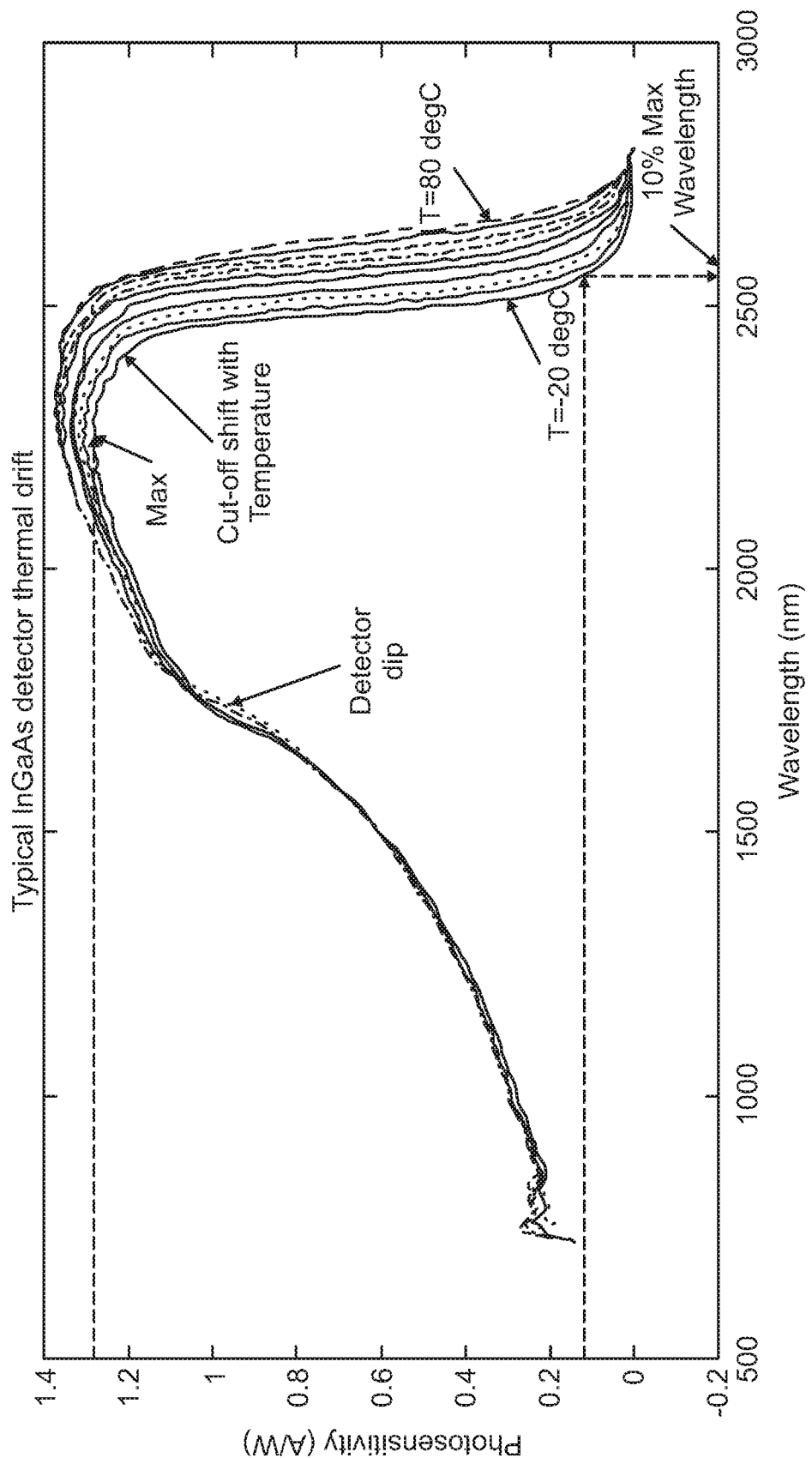
FIG. 33 is a graph illustrating the thermal drift of a typical InGaAs PIN detector responsivity according to some aspects.

In extended InGaAs NIR detectors, a feature appears in the middle of the spectrum when the temperature varies, as shown in FIG. 33, which illustrates the thermal drift of a typical InGaAs PIN detector responsivity. This feature represents a reduction in responsivity with the temperature at a specific position. This dip feature represents a second-order drift that is not easily recognized as a baseline drift in chemometrics analysis. In some examples, the AirPLS method can also be exploited to extract a correction matrix for this feature.

For example, the ratio between the measured PSD at room temperature and a higher temperature by ΔT=25° C. can be calculated as $$\% \ S = \frac{PSD_{T_0 + \Delta T}}{PSD_{T_o}} \times 100 \qquad (20)$$

Ideally % S should be 100% corresponding to the 100% line. Then, denoising of S can be performed by smoothing of the spectrum using the AirPLS method. After that, the drifted 100% line can be converted to absorbance according to:

$$A = 2 - \log_{10}(\% \ S) \qquad (21)$$

Figure 34A:
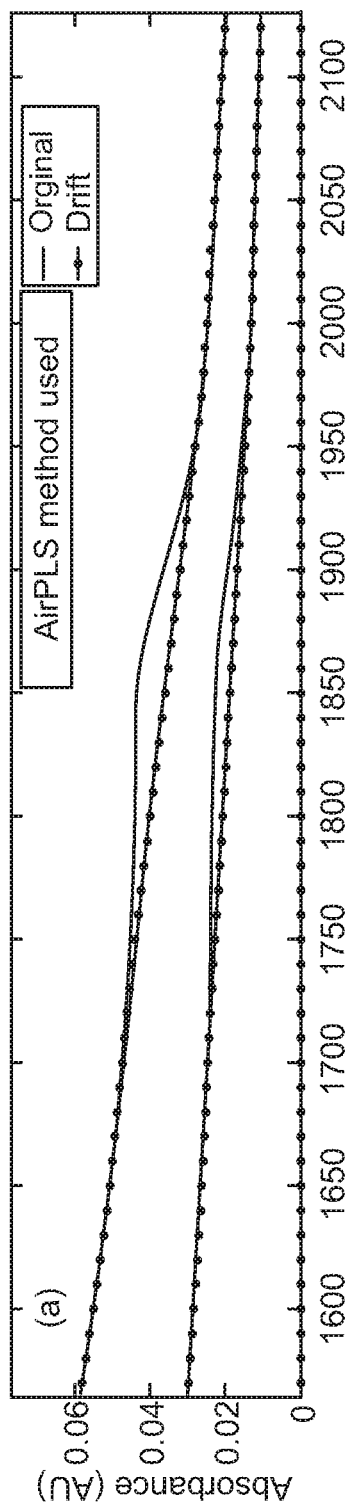
FIGS. 34A and 34B are graphs illustrating an AirPLS method used to separate the baseline first order drift from the dip higher order drift according to some aspects.
Figure 34B:
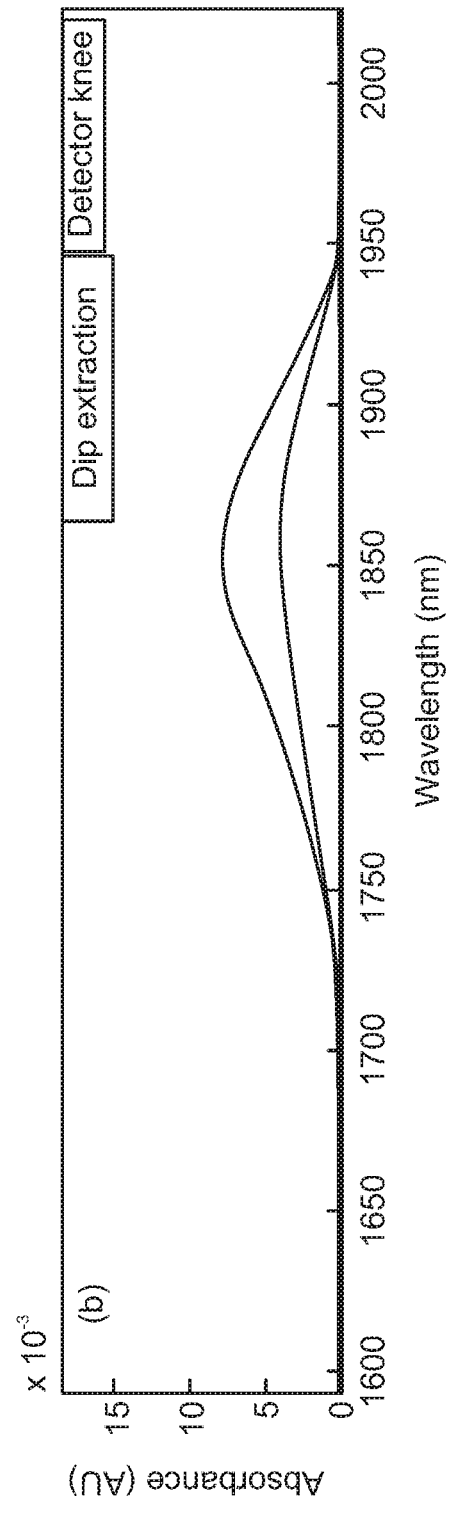

Then, the AirPLS method is used, as shown in FIGS. 34A and 34B, to separate the baseline first order drift from the dip higher order drift. In FIG. 34A, the dotted lines represent the first-order baseline drift in the absorbance domain, while the solid line represents the original drift. FIG. 34B illustrates the result of subtracting the baseline first-order drift from the original drift and represents the dip feature of the detector near the responsivity knee around 1850 nm.

Clipping of the undesired range of wavelengths can then be carried out, and the 100% line can then be converted back to percentage according to:

$$S_d = 10^{2 - A_{drift}} \qquad (22)$$

The drift function per degree can then be calculated according to:

$$S_{dpd} = 1 - \frac{\frac{100 - S_d}{\Delta T}}{100} \qquad (23)$$

Figure 35:
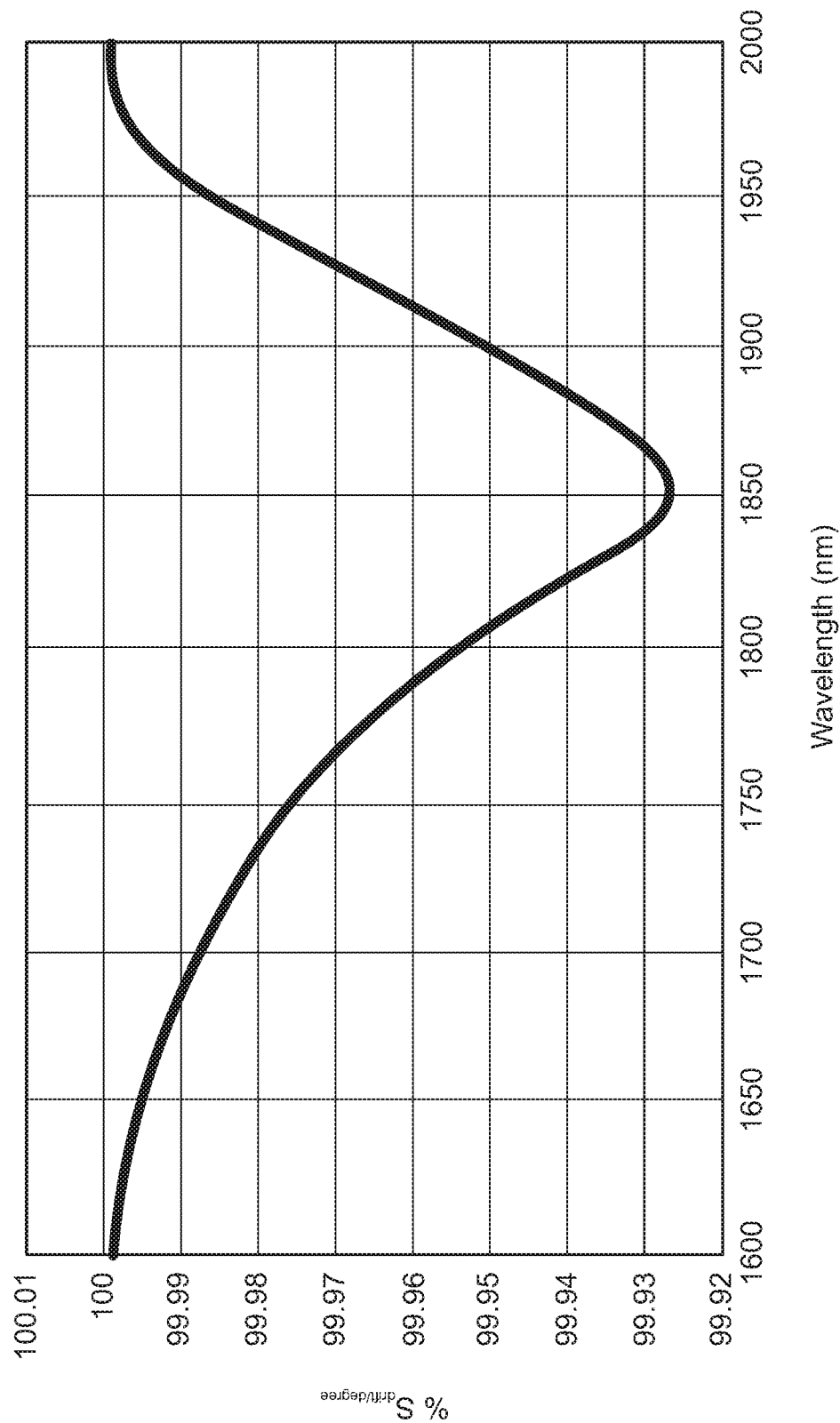
FIG. 35 is a graph illustrating the common (average) correction matrix for the dip drift per degree Celsius according to some aspects.

By repeating this algorithm on a number of different spectrometer units, the average correction matrix can be extracted for the common drift response, as shown in FIG. 35. For example, FIG. 35 is a graph illustrating the common (average) correction matrix for the dip drift per degree Celsius according to some aspects.

Figure 36:
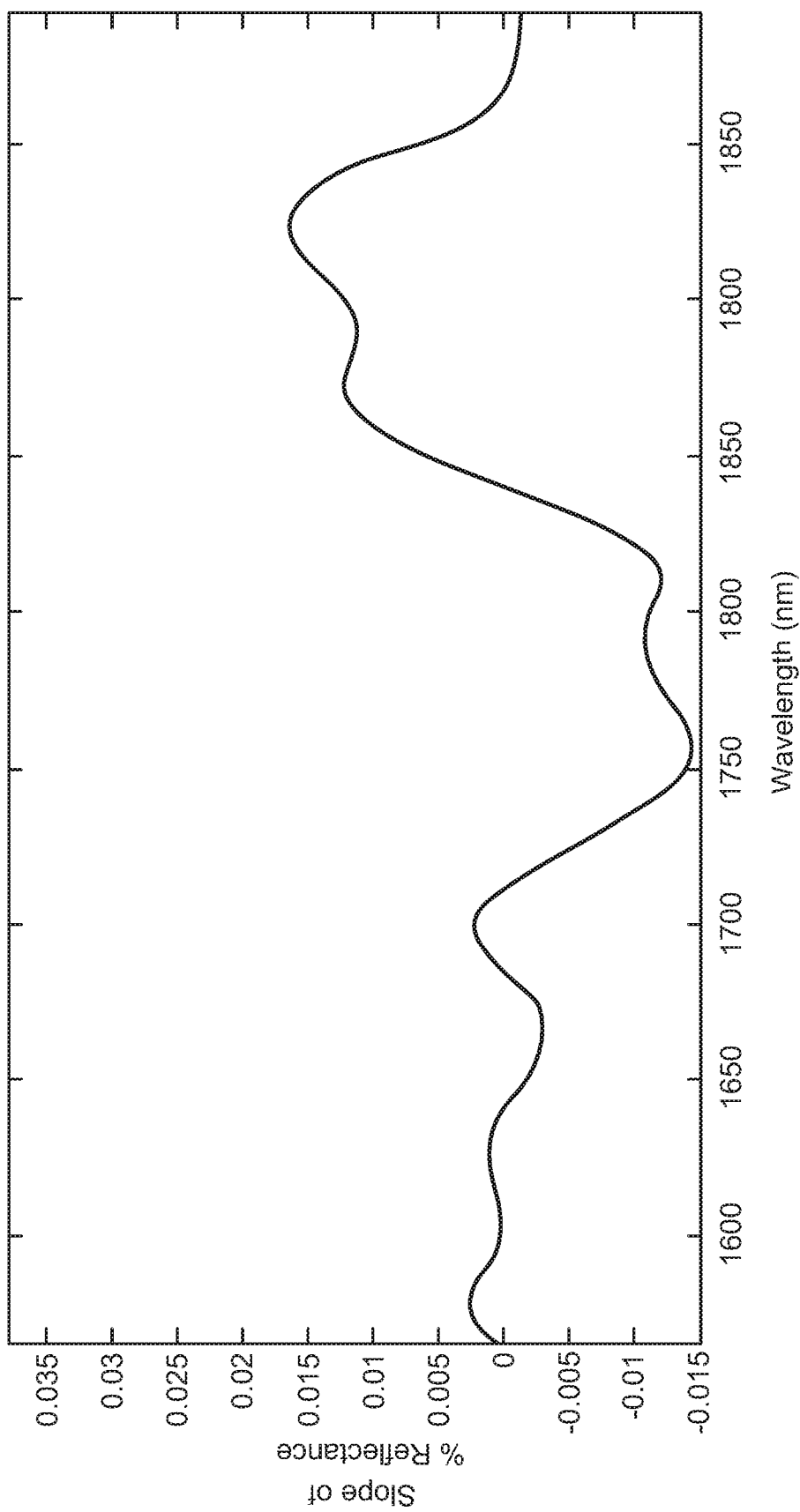
FIG. 36 is a graph illustrating a mechanism for finding the detector feature position using the slope of the detector drift according to some aspects.

The position of the detector feature may change from spectrometer unit to spectrometer unit. Therefore, the position of the detector dip feature can be detected and then the correction function can be repositioned based on that. This can be performed using two measurements at two different temperatures of a standard reference sample, such as using a 95% diffuse reflection standard in case of reflection-mode spectrometers. The position can be defined by applying the dip feature extraction algorithm on two or more measurements. Then, the slope of the dip feature $$\frac{\partial S_d}{\partial \lambda}$$

can be calculated and the wavelength that corresponds to the value of zero slope in a range of wavelengths (for example 1750 nm to 1900 nm) can correspond to the feature minima, as shown in FIG. 36. For example, FIG. 36 is a graph illustrating a mechanism for finding the detector feature position using the slope of the detector drift according to some aspects.

Figure 37:
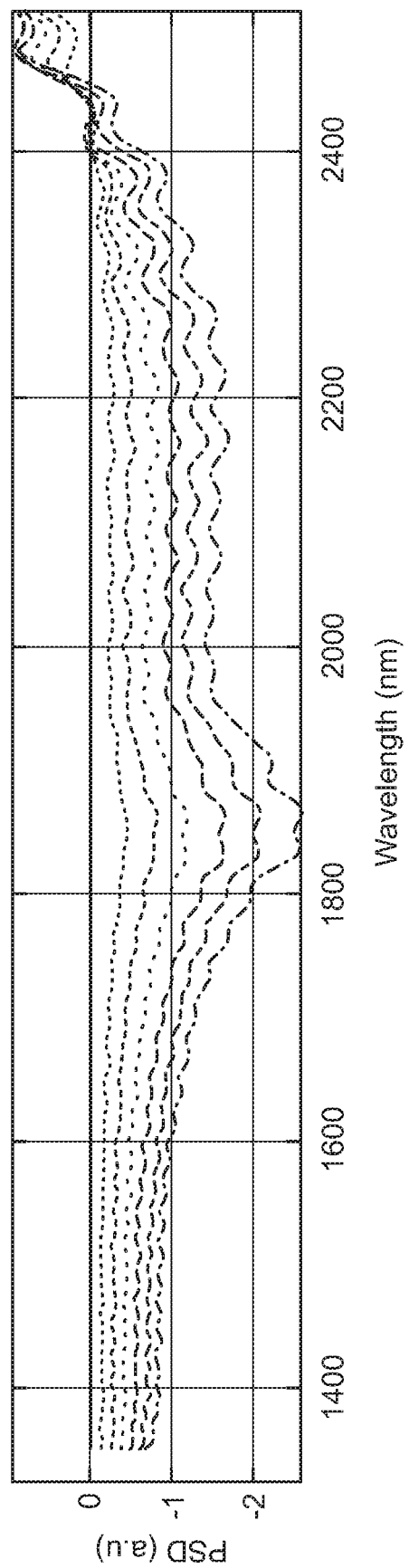
FIG. 37 is a graph illustrating a detector dip feature position according to some aspects.

The detector dip feature position may be also determined by subtracting the measurement with higher temperature from the background. The feature minimum is at the minimum value of the resulted spectrum, as shown in FIG. 37. This position value can then be used to shift the correction file to the correct position. In some examples, this process may be performed only one time for each lot, as the position of the detector dip feature does not change dramatically in the same lot.

In most PIN photodiode IR detectors, responsivity increases with temperature at longer wavelengths, which causes a shift in the cut-off wavelength of the detector. This positive temperature coefficient at longer wavelengths is caused by the heat-assisted generation of carriers in the depletion region of the PIN diode, or can be explained by the reduction in the band gap with temperature. As a result, photocurrent corresponding to the longer wavelength photons increases. To extract a correction matrix for the responsivity cut-off shift, the following equation may be used:

$$S = \frac{PSD_{T=high}}{PSD_{T=low}} \qquad (24)$$

Figure 38A:
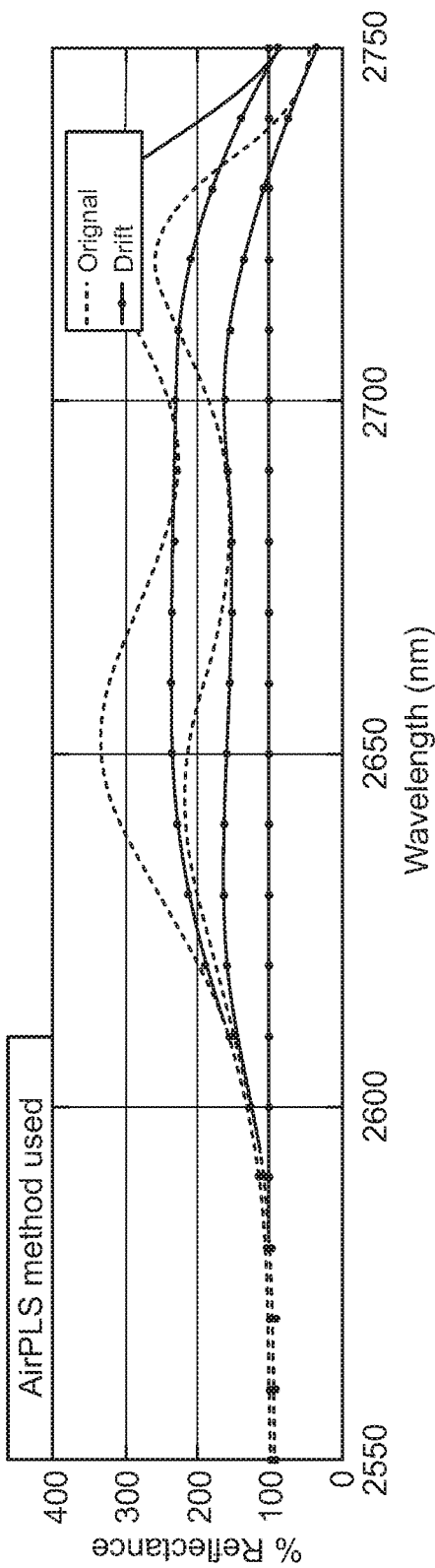
FIGS. 38A and 38B are graphs illustrating the extraction of detector higher-order thermal drift caused by cut-off shift with the temperature at different temperatures according to some aspects.
Figure 38B:
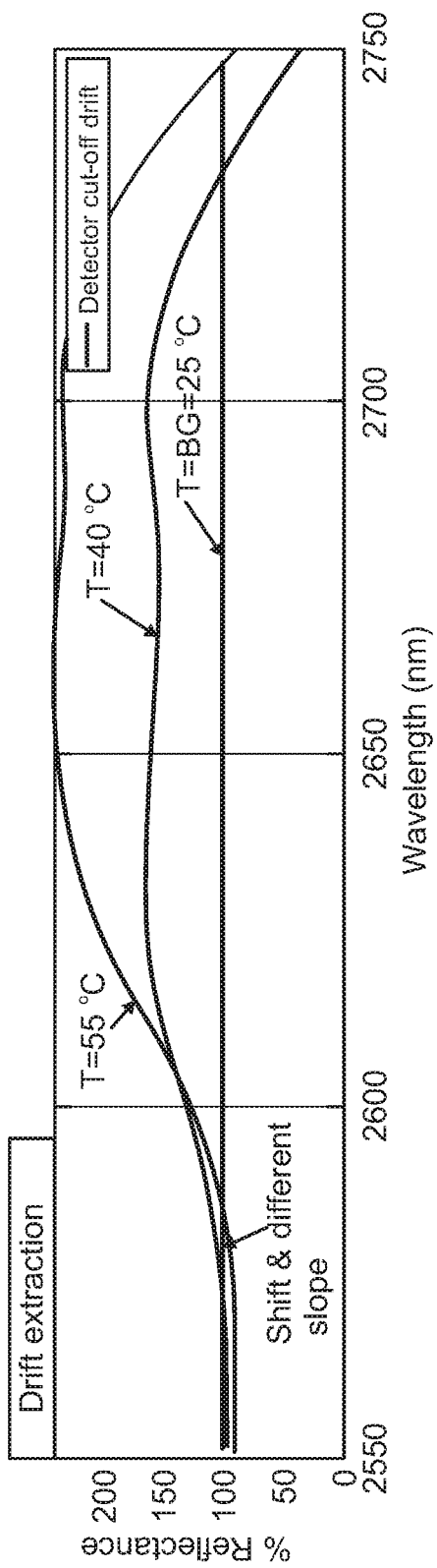

With dT=25° C. between the background measurement and the spectrometer measurement and smoothing of this spectrum using the AirPLS method, the position of cut off drift feature shifts with temperature is shown in FIGS. 38A and 38B. FIGS. 38A and 38B are graphs illustrating the extraction of detector higher-order thermal drift caused by cut-off shift with the temperature at different temperatures according to some aspects. In FIG. 38A, the dotted lines represent the cut-off drift in the reflectance domain after removing the features that change from spectrometer unit to spectrometer unit, while the solid line is the original cut-off drift. In FIG. 38B, the same dotted line as in FIG. 38A is shown; however, FIG. 38B illustrates the feature of the cut-off drift and how its slope changes and its position shifts at different temperatures.

A correction matrix can be extracted for multiple temperature points with a certain temperature change/step (for example 5 degrees). This algorithm can be repeated on certain number of different spectrometer units (for example 10 units) and the average correction matrix can be saved.

Figure 39:
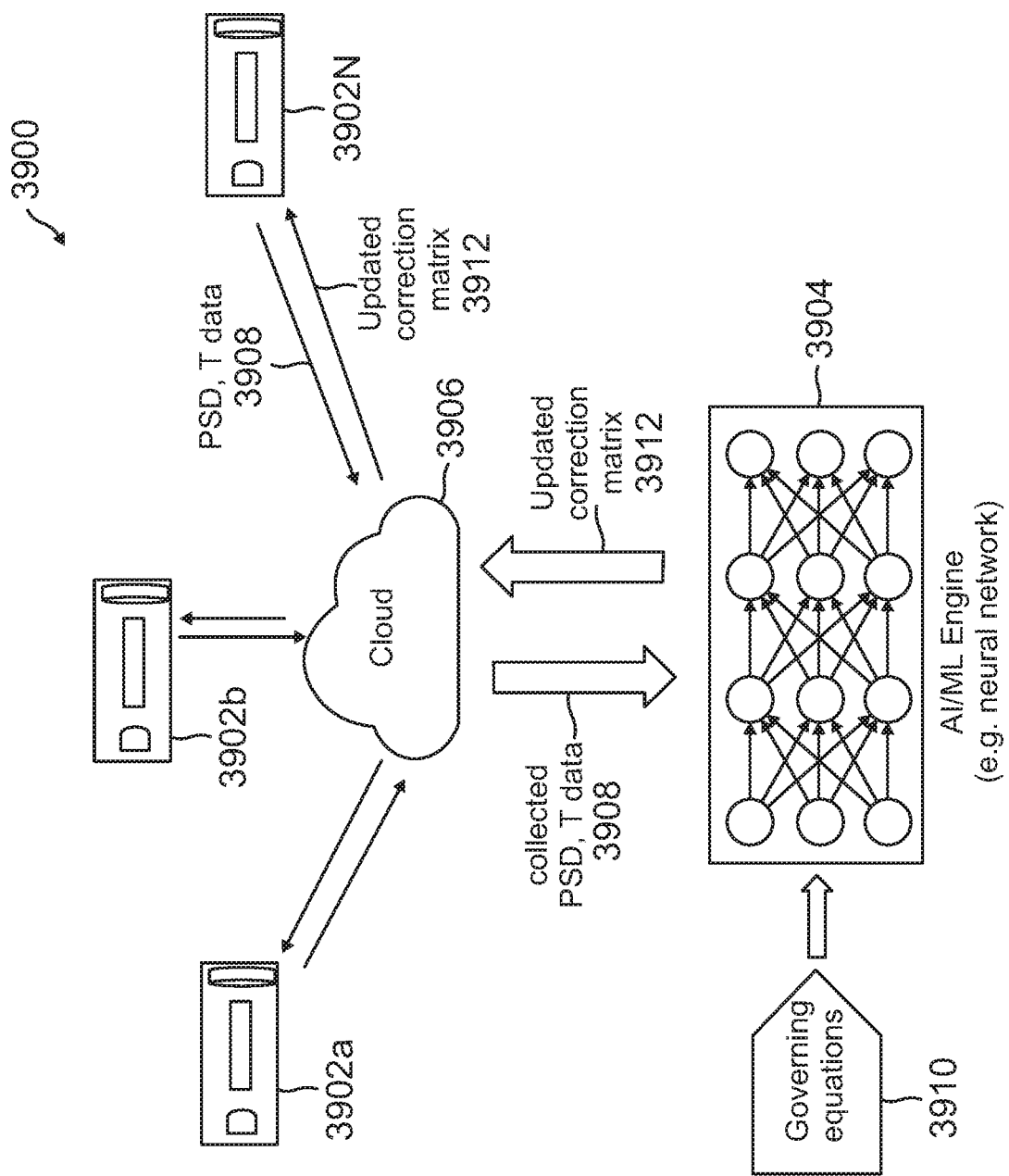
FIG. 39 is a diagram illustrating another example of a system configured to generate a global correction matrix according to some aspects.

FIG. 39 is a diagram illustrating another example of a system 3900 configured to generate a global correction matrix according to some aspects. In the example shown in FIG. 39, with the aid of physical equations (governing equations) 3910 that govern the thermal drift in spectrometers' photodetectors and other components, an AI/ML engine (e.g., a neural network) 3904 can create a guided machine learning (ML) algorithm to generate the thermal drift model with a few successive measurements. The ML algorithm can be trained by feeding an enough amount of spectrometry data linked to temperature values (e.g., PDS, T data) 3908. The data 3908 can be collected from the production line or from a plurality of spectrometer units 3902a, 3902b, ... , 3902N by connecting the units 3902a, 3902b, ... , 3902N to the cloud 3906 and sending their temperature states and the measured power spectral density in the presence of a reference sample, the latter being illustrated in FIG. 39. In addition, the ordinary performance tests, whether production line or calibration at spectrometers, which are done on any spectrometer may be valuable for the ML training process. This data may be stored in an online cloud for future usage.

As indicated above, the ML algorithm training can be enhanced and take less time if provided with the governing equations 3910 of thermal drift in the spectrometer. With the aid of these equations 3910, the ML training process is only looking for the fitting parameters in the equations with the least provided data. Based on the updated ML model that is online, a feedback to the cloud 3906 can be optionally used to improve the on-line compensation for instrumental drifts at the user side (e.g., during operation of the spectrometer units 3902a, 3902b, ... , 3902N). For example, instrumental response may change with the aging of the spectrometer, which may decrease the performance of the thermal drift correction algorithm. With the aid of the ML algorithm on the cloud, each spectrometer unit 3902a, 3902b, ... , 3902N may be recalibrated. For example, the AI/ML engine 3904 can be configured to use a few measurements with corresponding temperatures of each spectrometer unit to provide respective updated correction matrices 3912 for each spectrometer unit 3902a, 3902b, ... , 3902N.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-39 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-39 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:
1. A spectrometer, comprising:
    a light modulator optically coupled to receive input light and to produce modulated light based on the input light;
    a detector optically coupled to detect the modulated light in presence of a sample and to produce an output based on the modulated light;

a sensor configured to obtain a value of a condition contributing to instrumental drifts in the spectrometer;

a memory configured to store a correction matrix associating a plurality of sets of correction parameters with sensor values; and a processor coupled to the detector and configured to extract a set of correction parameters of the plurality of sets of correction parameters from the correction matrix based on the value, the processor further configured to calculate a drift percentage resulting from the instrumental drifts from the set of correction parameters and to divide the output of the detector by the calculated drift percentage to correct the instrumental drifts across all components of the spectrometer including the detector and the light modulator to produce a corrected spectrum of the sample.

2. The spectrometer of claim 1, wherein the value comprises a temperature value.

3. The spectrometer of claim 2, wherein the memory is further configured to store a mapping between temperature values and detector cut-off wavelengths, wherein the sensor comprises the detector and the processor, the processor being further configured to:

generate a power spectral density (PSD) from the output of the detector versus wavelength and to extract a detector cut-off wavelength from the PSD;

extract the temperature value from the memory based on the mapping; and obtain a new PSD corresponding to the corrected spectrum based on the set of correction parameters associated with the temperature value.

4. The spectrometer of claim 2, wherein the memory is further configured to store a mapping between temperature values and power spectral densities (PSDs) of a sample, wherein the sensor comprises the detector and the processor, the processor being further configured to:

generate a power spectral density (PSD) from the output of the detector versus wavelength;

extract the temperature value from the memory based on the mapping; and obtain a new PSD corresponding to the corrected spectrum based on the set of correction parameters associated with the temperature value.

5. The spectrometer of claim 2, wherein the sensor comprises a temperature sensor configured to obtain the temperature value.

6. The spectrometer of claim 5, wherein the temperature value corresponds to a first change in detector temperature calculated from a second change in sensor temperature reading of the temperature sensor.

7. The spectrometer of claim 5, wherein the temperature sensor comprises a thermistor or thermocouple configured to measure the temperature value of the spectrometer.

8. The spectrometer of claim 5, wherein the temperature sensor is embedded in a processing unit chip comprising the processor or a control chip of the spectrometer configured to control at least the light modulator.

9. The spectrometer of claim 5, wherein the temperature sensor comprises a piezoresistive temperature sensor fabricated on a micro-electro-mechanical systems (MEMS) chip comprising the light modulator.

10. The spectrometer of claim 2, wherein the memory is further configured to store a mapping between root mean square (RMS) noise levels proportional to shunt resistance values of the detector and temperature values, wherein the sensor comprises the detector and the processor, the detector configured to produce a dark interferogram in an absence of light, the processor being further configured to:

process the dark interferogram to calculate an RMS noise level;

extract the temperature value based on the mapping; and obtain an optical power spectral density (PSD) corresponding to the corrected spectrum based on the output of the detector and the set of correction parameters associated with the temperature value.

11. The spectrometer of claim 2, wherein the processor is configured to generate a power spectral density (PSD) based on the output of the detector and to transform the PSD to produce a corrected PSD corresponding to the corrected spectrum based on the set of correction parameters.

12. The spectrometer of claim 11, wherein the detector is further configured to produce a background measurement at a fixed temperature and the processor is further configured to transform the PSD to produce the corrected PSD based on the background measurement.

13. The spectrometer of claim 11, wherein the correction matrix comprises a global correction matrix applicable to a plurality of spectrometers, and the processor is further configured to apply the set of correction parameters to the PSD based on a wavelength shift applied to the correction matrix to account for operation of the spectrometer and one or more fitting parameters configured to account for variations between the plurality of spectrometers.

14. The spectrometer of claim 2, wherein the processor is further configured to generate the correction matrix, wherein the correction matrix indicates respective thermal drift of power spectral density (PSD) at a plurality of wavelengths across a plurality of temperatures.

15. The spectrometer of claim 14, further comprising:

a temperature chamber comprising the spectrometer or a Peltier element in a thermos-electric cooler or heater (TEC) proximal to the detector configured to sweep a spectrometer temperature to produce the correction matrix.

16. The spectrometer of claim 14, further comprising:

a heat trapping enclosure surrounding the spectrometer configured to trap heat from heat generating components in the spectrometer to heat the spectrometer to produce the correction matrix.

17. The spectrometer of claim 14, wherein the correction matrix comprises coefficients of fitted functions that relate a change in PSD of each wavelength with temperature, the fitted functions comprising polynomial or exponential fitted functions.

18. The spectrometer of claim 2, wherein the correction matrix comprises a scaled global correction matrix scaled based on power spectral density (PSD) measurements across a plurality of wavelengths obtained at a subset of a plurality of temperatures, the scaled global correction matrix being based on a machine learning correction matrix generated based on data collected from a plurality of spectrometers.

19. The spectrometer of claim 18, wherein the plurality of spectrometers associated with the global correction matrix are within a same production lot.

20. The spectrometer of claim 1, wherein each of the plurality of sets of correction parameters comprises a correction function extracted from a direct fitting algorithm or a decomposition algorithm.

21. The spectrometer of claim 1, wherein the correction matrix comprises a machine learning correction matrix generated based on data collected from a plurality of spectrometers.

22. The spectrometer of claim 1, wherein the sensor comprises a humidity sensor, a light source efficiency sensor or an optical misalignment sensor.

23. The spectrometer of claim 1, wherein the detector is further configured to produce a background measurement and the processor is further configured to:
   correct the background measurement based on the set of correction parameters to produce a corrected background measurement; and
   produce the corrected spectrum based on the corrected background measurement.

* * * * *